United States Patent
Zhong et al.

(10) Patent No.: US 12,524,875 B2
(45) Date of Patent: Jan. 13, 2026

(54) SYSTEMS AND METHODS FOR IMAGE PROCESSING

(71) Applicant: SHANGHAI UNITED IMAGING HEALTHCARE CO., LTD., Shanghai (CN)

(72) Inventors: Jian Zhong, Shanghai (CN); Chunhua Jiang, Shanghai (CN); Juan Feng, Shanghai (CN); Junchao Sun, Shanghai (CN); Wanli Teng, Shanghai (CN); Lulu Han, Shanghai (CN); Dianlin Hu, Shanghai (CN); Yang Chen, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 401 days.

(21) Appl. No.: 18/178,495

(22) Filed: Mar. 4, 2023

(65) Prior Publication Data

US 2023/0206441 A1 Jun. 29, 2023

Related U.S. Application Data

(63) Continuation of application No. PCT/CN2021/116795, filed on Sep. 6, 2021.

(30) Foreign Application Priority Data

Sep. 4, 2020 (CN) .......................... 202010922088.8
Sep. 23, 2020 (CN) .......................... 202011011229.7
(Continued)

(51) Int. Cl.
*G06T 7/11* (2017.01)
*G06T 7/00* (2017.01)
*G06T 7/70* (2017.01)

(52) U.S. Cl.
CPC .............. *G06T 7/0012* (2013.01); *G06T 7/11* (2017.01); *G06T 7/70* (2017.01);
(Continued)

(58) Field of Classification Search
CPC . G06T 2207/20081; G06T 2207/20084; G06T 7/11; G06T 7/0012;
(Continued)

(56) References Cited

U.S. PATENT DOCUMENTS 6,532,380 B1 * 3/2003 Close ..................... A61B 6/481
600/407
7,876,937 B2 * 1/2011 Schildkraut .......... G06T 7/0012
600/407
(Continued)

FOREIGN PATENT DOCUMENTS

CA 2986227 A1 11/2016
CN 108053434 A 5/2018
(Continued)

OTHER PUBLICATIONS

First Office Action in Chinese Application No. 202010922088.8 mailed on Jun. 29, 2023, 12 pages.
(Continued)

*Primary Examiner* — Tsung Yin Tsai
(74) *Attorney, Agent, or Firm* — METIS IP LLC

(57) ABSTRACT

Systems and methods for image processing are provided. The method may include obtain an image sequence. The method may also include determine one or more sets of images from the image sequence, wherein each of the one or more sets of images includes one image or a plurality of consecutive images from the image sequence. The method may further include perform an image processing operation on at least one set of the one or more sets of images. The one or more image processing operation may include one or
(Continued)

more of image segmentation, visualization, and image enhancement.

20 Claims, 24 Drawing Sheets

(30) Foreign Application Priority Data

Oct. 22, 2020 (CN) .......................... 202011137995.8
Oct. 22, 2020 (CN) .......................... 202011139628.1

(52) U.S. Cl.
CPC .............. *G06T 2207/20081* (2013.01); *G06T 2207/20084* (2013.01); *G06T 2207/30021* (2013.01); *G06T 2207/30204* (2013.01)

(58) Field of Classification Search
CPC . G06T 2207/20221; G06T 2207/10081; G06T 2207/30021; G06T 3/4038; G06T 2207/10016; G06T 2207/10088; G06T 2207/10104; G06T 2207/30004; G06T 2207/30016; G06T 2207/30096; G06T 2207/30168; G06T 7/136; G06T 7/70; G06T 2207/30101; G06T 2207/30204; G06T 3/4015; G06T 3/4046; G06T 7/33; G06T 1/60; G06T 2207/10024; G06T 2207/10116; G06T 2207/10132; G06T 2207/20021; G06T 2207/20132; G06T 2207/30048; G06T 2207/30084; G06T 2207/30252; G06T 5/50; G06T 5/60; G06T 5/70; G06T 5/73; G06T 5/80; G06T 5/90; G06T 7/0002; G06T 7/12; G06T 7/143; G06T 7/149; G06T 7/62; G06T 11/006; G06T 11/008; G06T 17/00; G06T 2207/10008; G06T 2207/20024; G06T 2207/30052; G06T 2210/41; G06T 7/0014; G06T 2207/10072; G06T 2207/20156; G06T 2207/30012; G06V 2201/03; G06V 10/25; G06V 10/26; G06V 10/764; G06V 10/82; G06V 10/255; G06V 20/49; G06V 2201/034; G06V 10/993; G06V 10/245; G06V 20/40; G06V 20/48; G06V 2201/031; G06V 2201/032; G06V 30/2504; G06V 10/267; G06V 10/806; G06V 2201/033; G16H 30/20; G16H 30/40; G16H 30/00; G16H 50/20; G06N 3/045; G06N 3/08; G06N 3/04; G06N 3/063; G06N 20/00; G06N 3/084; G06N 5/04; H04N 23/80; H04N 23/63; H04N 25/61; A61B 2576/02; A61B 5/0013; A61B 5/055; A61B 5/1073; A61B 5/7425; A61B 5/7435; G06F 18/285

See application file for complete search history.

(56) References Cited

U.S. PATENT DOCUMENTS

| | | | | |
|---|---|---|---|---|
| 8,311,308 | B2 * | 11/2012 | Chen .................... | G06F 18/2148 378/42 |
| 2002/0177770 | A1 * | 11/2002 | Lang ..................... | G01R 33/56 600/410 |
| 2008/0099566 | A1 | 5/2008 | Maus | |
| 2009/0103681 | A1 * | 4/2009 | Kramp .................. | A61B 6/504 378/98.12 |
| 2009/0274358 | A1 | 11/2009 | Flohr et al. | |
| 2010/0161023 | A1 * | 6/2010 | Cohen ................... | G06T 7/246 623/2.11 |
| 2011/0142318 | A1 * | 6/2011 | Chen ..................... | G06V 10/446 382/131 |
| 2011/0144480 | A1 | 6/2011 | Lu et al. | |
| 2013/0094734 | A1 * | 4/2013 | Rauch ................... | G06T 7/38 382/130 |
| 2014/0079308 | A1 | 3/2014 | Chen et al. | |
| 2014/0241599 | A1 | 8/2014 | Chen et al. | |
| 2015/0308970 | A1 | 10/2015 | Massefski, Jr. et al. | |
| 2016/0232703 | A1 * | 8/2016 | Duan .................... | G06T 7/11 |
| 2016/0335766 | A1 | 11/2016 | Ambwani et al. | |
| 2018/0360408 | A1 | 12/2018 | Quan | |
| 2018/0360540 | A1 | 12/2018 | Lilliestrale et al. | |
| 2019/0088361 | A1 | 3/2019 | Ouyang et al. | |
| 2022/0346885 | A1 * | 11/2022 | Kunio .................. | A61B 5/7267 |
| 2022/0409281 | A1 * | 12/2022 | Gormley ............... | A61B 34/25 |

FOREIGN PATENT DOCUMENTS

| | | |
|---|---|---|
| CN | 108090901 A | 5/2018 |
| CN | 108122605 A | 6/2018 |
| CN | 108937978 A | 12/2018 |
| CN | 109064504 A | 12/2018 |
| CN | 109271888 A | 1/2019 |
| CN | 109559285 A | 4/2019 |
| CN | 109658401 A | 4/2019 |
| CN | 109725796 A | 5/2019 |
| CN | 109993726 A | 7/2019 |
| CN | 110136107 A | 8/2019 |
| CN | 110689548 A | 1/2020 |
| CN | 110879995 A | 3/2020 |
| CN | 111192266 A | 5/2020 |
| CN | 111223158 A | 6/2020 |
| CN | 111275721 A | 6/2020 |
| CN | 111402406 A | 7/2020 |
| CN | 111462083 A | 7/2020 |
| CN | 111541943 A | 8/2020 |
| CN | 111681254 A | 9/2020 |
| CN | 111798451 A | 10/2020 |
| CN | 112017175 A | 12/2020 |
| CN | 112102313 A | 12/2020 |
| CN | 112116608 A | 12/2020 |
| CN | 112200022 A | 1/2021 |
| WO | 03043516 A2 | 5/2003 |
| WO | 2016059385 A1 | 4/2016 |
| WO | 2018119718 A1 | 7/2018 |
| WO | 2020201183 A1 | 10/2020 |

OTHER PUBLICATIONS

Wang, Qihong et al., The Application of Endovascular Covered Stents in the Treatment of Cerebrovascular Diseases, Division of Foreign medical Cerebrovascular Diseases, 616-620, 2005.
The Extended European Search Report in European Application No. 21863734.6 mailed on Nov. 20, 2023, 7 pages.
International Search Report in PCT/CN2021/116795 mailed on Dec. 8, 2021, 4 pages.
Written Opinion in PCT/CN2021/116795 mailed on Dec. 8, 2021, 5 pages.
First Office Action in Chinese Application No. 202011137995.8 mailed on Mar. 3, 2022, 13 pages.
First Office Action in Chinese Application No. 202011011229.7 mailed on Jul. 15, 2022, 20 pages.
Artis Pheno, Siemens Healthineers Headquarters, 2018, 32 pages.
Liu, Shiqi, Study of Navigation System for Percutaneous Coronary Intervention, Dissertation for the Master Degree in Engineering, 2019, 63 pages.
Pierre Ambrosini et al., Fully Automatic and Real-Time Catheter Segmentation in X-Ray Fluoroscopy, Springer International Publishing AG, 577-585, 2017.
Sun, Jianguo et al., Digital Intelligent Radiotherapy, Shandong Science and Technology Publishing House, 2019, 14 pages.

* cited by examiner

SYSTEMS AND METHODS FOR IMAGE PROCESSING

CROSS-REFERENCE TO RELATED APPLICATIONS

This application is a Continuation of International Application No. PCT/CN2021/116795, filed on Sep. 6, 2021, which claims priority to Chinese Patent Application No. 202010922088.8 field on Sep. 4, 2020, Chinese Patent Application No. 202011011229.7 field on Sep. 23, 2020, Chinese Patent Application No. 202011137995.8 field on Oct. 22, 2020, and Chinese Patent Application No. 202011139628.1 field on Oct. 22, 2020, the contents of each of which are hereby incorporated by reference.

TECHNICAL FIELD

The present disclosure generally relates to medical imaging, and in particular, to systems and methods for image processing in interventional radiology diagnosis and treatments.

BACKGROUND

Coronary artery stenosis is a form of coronary heart disease in which the passage of blood through a coronary artery becomes at least partially obstructed by the thickening of the coronary artery walls due to the accumulation of, e.g., fatty materials such as cholesterol. If left untreated, coronary artery stenosis can lead to angina, or even death. In medicine, a stent can provide support to open a narrowed lumen which is needed in diagnosis or treatment of some diseases such as the coronary artery stenosis. Proper placement of the stent needs accurate visualization of the stent and corresponding devices (e.g., a guidewire) for placing them as they are moved through the arteries of a patient. Therefore, it is desirable to provide systems and methods for image processing in interventional radiology, thereby improving the accuracy and efficiency of diagnosis and treatment.

SUMMARY

According to an aspect of the present disclosure, a system for image processing is provided. The system may include one or more storage devices and at least one processor configured to communicate with the one or more storage devices. The one or more storage devices may include a set of instructions. When the at least one processor executing the set of instructions, the at least one processor may be directed to perform one or more of the following operations. The at least one processor may obtain an image sequence. One or more sets of images may be determined by the at least one processor from the image sequence, wherein each of the one or more sets of images includes one image or a plurality of consecutive images from the image sequence. The at least one processor may further perform an image processing operation on at least one set of the one or more sets of images.

In some embodiments, the at least one processor may receive a user input regarding a selection of the one or more sets of images and further determine the one or more sets of images based on the user input.

In some embodiments, the at least one processor may determine a detection result by detecting an object in the image sequence and further determine the one or more sets of images based on the detection result.

In some embodiments, the at least one processor may detect one or more markers corresponding to the object, wherein the one or more markers include a balloon marker pair or a tube marker.

In some embodiments, the image sequence may be acquired by a process includes color-coded digital subtraction angiography in which contrast media is employed. The at least one processor may detect an object by detecting the contrast media in the image sequence.

In some embodiments, the detection result includes at least one first image of the image sequence in which the object is detected. The at least one processor may determine from the image sequence, a first count of images that immediately precede the at least one first image. The at least one processor may also determine from the image sequence, a second count of images that immediately follow the at least one first image. The at least one processor may further determine at least one of the one or more sets of images based on the first count of images, the second count of images, and the at least one first image.

In some embodiments, at least two neighboring sets of the one or more sets of images are separated by at least one image of the image sequence that belongs to none of the one or more sets of images.

In some embodiments, to perform an image processing operation on at least one set of the one or more sets of images, the at least one processor may cause images of the at least one set to be displayed on a loop. The at least one processor may also adjust one or more display parameters for displaying the images of the at least one set, wherein the one or more display parameters includes a frame rate, an image scaling factor, or an image displaying region. The at least one processor may further provide enhanced visualization of one or more images of the at least one set.

In some embodiments, the at least one set of the one or more sets of images includes a guidewire image. To perform an image processing operation on at least one set of the one or more sets of images, the at least one processor may obtain a trained neural network model. The at least one processor may also generate a segmented guidewire image based on the guidewire image using the trained neural network model.

In some embodiments, the at least one processor may pre-process the guidewire image. The at least one processor may further generate the segmented guidewire image by applying the pre-processed guidewire image to the trained neural network model.

In some embodiments, to pre-process the guidewire image, the at least one processor may perform a normalization operation on the guidewire image.

In some embodiments, the trained neural network model may include a U-Net architecture.

In some embodiments, the trained neural network model may be trained based on a loss function corresponding to one or more structural characters of a guidewire.

In some embodiments, the loss function may include a soft Dice loss function.

In some embodiments, the loss function may further include a weight corresponding to the soft Dice loss function, and the weight may relate to a segmenting precision of the segmented guidewire image.

In some embodiments, the loss function may further include a collinearity penalty function.

In some embodiments, the loss function may further include a weight corresponding to the collinearity penalty function, and the weight may relate to a segmenting continuity of the segmented guidewire image.

In some embodiments, the trained neural network model may be trained based on an Adam optimization algorithm.

In some embodiments, the at least one set of the one or more sets of images may include an image corresponding to an object. To perform an image processing operation on at least one set of the one or more sets of images, the at least one processor may determine a coarsely segmented image based on the image. The at least one processor may further determine a finely segmented image from the coarsely segmented image.

In some embodiments, the at least one processor may perform a registration operation between the finely segmented image and a standard image of the object.

In some embodiments, before determining the coarsely segmented image based on the image, the at least one processor may detect an existence of the object in the image.

In some embodiments, before determining the finely segmented image from the coarsely segmented image, the at least one processor may pre-process the coarsely segmented image.

In some embodiments, the at least one processor may determine location information of the object in the image. The at least one processor may further determine the coarsely segmented image based on the location information of the object.

In some embodiments, to determine location information of the object in the image, the at least one processor may determine location information of the object based on a trained object detection model.

In some embodiments, the trained object detection model includes a Det-Net architecture.

In some embodiments, to determine location information of the object in the image, the at least one processor may detect a balloon marker pair in the image and determine location information of the object based on the balloon marker pair.

In some embodiments, to determine a finely segmented image from the coarsely segmented image, the at least one processor may determine the finely segmented image based on a trained segmentation model.

In some embodiments, the trained segmentation model may include a U-Net architecture.

In some embodiments, the one or more sets of images may include a first set of images. To perform the image processing operation on at least one set of the one or more sets of images, the at least one processor may determine one or more individual balloon marker candidates in the first set of images and determine one or more balloon marker pairs based on the one or more individual balloon marker candidates. For each pair of the one or more balloon marker pairs, the at least one processor may determine an occurrence frequency of the balloon marker pair in the first set of images. The at least one processor may further determine a target balloon marker pair from the one or more balloon marker pairs based on the occurrence frequency of each pair of the one or more balloon marker pairs.

In some embodiments, the at least one processor may determine reliability of the occurrence frequency of each pair of the one or more balloon marker pairs. To determine the reliability, the at least one processor may obtain a first reference value, wherein the first reference value is determined based on a count of images included in the first set of images. The at least one processor may also determine whether an occurrence frequency of the target balloon marker pair is below the first reference value. In response to determining that the occurrence frequency of the target balloon marker pair is below the first reference value, the at least one processor may determine that the target balloon marker pair is unreliable.

In some embodiments, the at least one processor may determine whether a count of high-frequency balloon marker pairs, each of which has an occurrence frequency exceeding a second reference value, is higher than a third reference value. In response to determining that the count of high-frequency balloon marker pairs is higher than the third reference value, the at least one processor may determine that the target balloon marker pair is unreliable.

In some embodiments, to determine one or more individual balloon marker candidates in the first set of images, the at least one processor may determine a set of candidate points by performing an image filtering operation on each image of the first set of images. The at least one processor may further determine a sub-set of candidate points by excluding, based on one or more balloon marker characters, one or more candidate points from the set of candidate points.

In some embodiments, the at least one processor may further determine the or more individual balloon marker candidates from the sub-set of candidate points based on a non-maximum suppression operation.

In some embodiments, the one or more balloon marker characters may include at least one of a degree of roundness of the balloon marker, a size of the balloon marker, or a balloon marker response value.

In some embodiments, to exclude, based on one or more balloon marker characters, the one or more candidate points from the set of candidate points, the at least one processor may determine a degree of roundness of a candidate point of the set of candidate points, and exclude the candidate point from the set of candidate points if the degree of roundness of the candidate point is lower than a threshold degree of roundness.

In some embodiments, to exclude, based on one or more balloon marker characters, the one or more candidate points from the set of candidate points, the at least one processor may determine determining a size of a candidate point of the set of candidate points, and exclude the candidate point from the set of candidate points if the size of the candidate point is larger than a size threshold.

In some embodiments, to exclude, based on one or more balloon marker characters, the one or more candidate points from the set of candidate points, the at least one processor may determine a balloon marker response value of a candidate point of the set of candidate points, and exclude the candidate point from the set of candidate points if the balloon marker response value of the candidate point is lower than a response value threshold.

In some embodiments, to perform an image filtering operation on the image, the at least one processor may determine a first filtered image by removing, using a top-hat transform, background information in the image.

In some embodiments, to perform an image filtering operation on the image, the at least one processor may determine, based on the first filtered image, a second filtered image by using a Laplacian of Gaussian (LOG) filtering algorithm.

According to another aspect of the present disclosure, a method for image processing, implemented on at least one machine each of which has at least one processor and at least one storage device is provided. The method may include obtaining an image sequence. The method may include determining one or more sets of images from the image sequence, wherein each of the one or more sets of images includes one image or a plurality of consecutive images from the image sequence. The method may further include performing an image processing operation on at least one set of the one or more sets of images.

According to yet another aspect of the present disclosure, a system for image processing may include an obtaining module configured to obtain an image sequence. The system may also include a selection module configured to determine one or more sets of images from the image sequence, wherein each of the one or more sets of images includes one image or a plurality of consecutive images from the image sequence. The system may further include a processing engine configured to perform an image processing operation on at least one set of the one or more sets of images.

According to yet another aspect of the present disclosure, a non-transitory computer readable medium may comprise at least one set of instructions. The at least one set of instructions may be executed by at least one processor of a computer server. The at least one processor may obtain an image sequence. The at least one processor may determine one or more sets of images from the image sequence, wherein each of the one or more sets of images includes one image or a plurality of consecutive images from the image sequence. The at least one processor may perform an image processing operation on at least one set of the one or more sets of images.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "unit," "module," and/or "block" used herein are one method to distinguish different components, elements, parts, section or assembly of different level in ascending order. However, the terms may be displaced by another expression if they achieve the same purpose.

Figure 2:
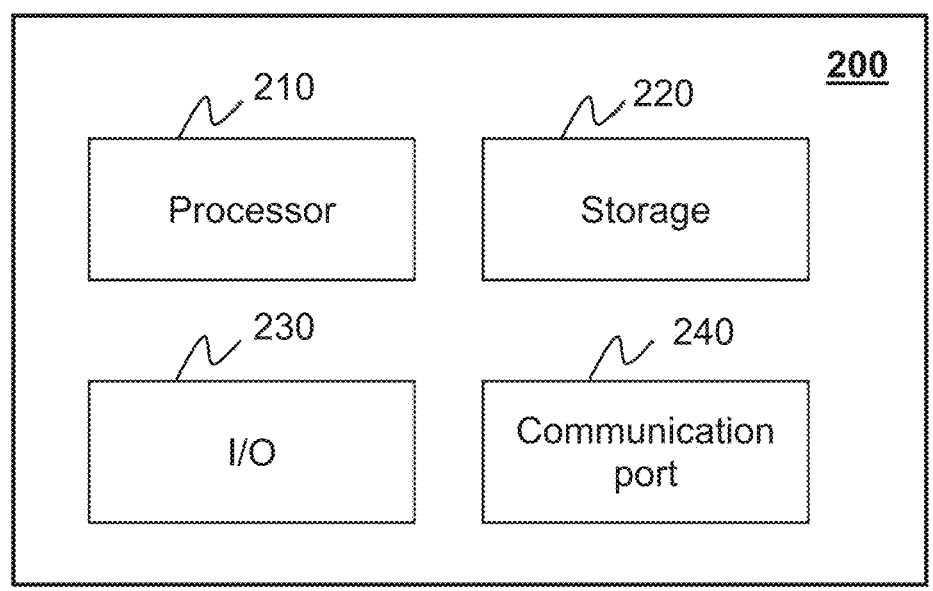
FIG. 2 is a schematic diagram illustrating exemplary hardware and/or software components of a computing device on which the processing device may be implemented according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 as illustrated in FIG. 2) may be provided on a computer readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included of connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

Provided herein are systems and components for medical imaging and/or medical treatment. In some embodiments, the medical system may include an imaging system. The imaging system may include a single modality imaging system and/or a multi-modality imaging system. The single modality imaging system may include, for example, a magnetic resonance imaging (MRI) system. Exemplary MRI systems may include a superconducting magnetic resonance imaging system, a non-superconducting magnetic resonance imaging system, etc. The multi-modality imaging system may include, for example, a computed tomography-magnetic resonance imaging (MM-CT) system, a positron emission tomography-magnetic resonance imaging (PET-MRI) system, a single photon emission computed tomography-magnetic resonance imaging (SPECT-MRI) system, a digital subtraction angiography-magnetic resonance imaging (DSA-MRI) system, etc. In some embodiments, the medical system may include a treatment system. The treatment system may include a treatment plan system (TPS), image-guide radiotherapy (IGRT), etc. The image-guide radiotherapy (IGRT) may include a treatment device and an imaging device. The treatment device may include a linear accelerator, a cyclotron, a synchrotron, etc., configured to perform a radio therapy on a subject. The treatment device may include an accelerator of species of particles including, for example, photons, electrons, protons, or heavy ions. The imaging device may include an MM scanner, a CT scanner (e.g., cone beam computed tomography (CBCT) scanner), a digital radiology (DR) scanner, an electronic portal imaging device (EPID), etc.

It should be noted that, in the present disclosure, an image, or a portion thereof (e.g., a region in the image) corresponding to an object (e.g., tissue, an organ, a tumor, a stent, a guidewire, a balloon, etc.) may be referred to as an image, or a portion of thereof (e.g., a region) of or including the object, or the object itself. For instance, a region in an image that corresponds to or represents a stent may be described as that the region includes a stent. As another example, an image of or including a stent may be referred to a stent image, or simply stent. For brevity, that a portion of an image corresponding to or representing an object is processed (e.g., extracted, segmented, etc.) may be described as the object is processed. For instance, that a portion of an image corresponding to a stent is segmented from the rest of the image may be described as that the stent is segmented from the image. Generally, the word "image" as used herein, refers to any type of representation or likeness of an object made visible, such as a frame, a reconstructed image, a photo, or the like.

An aspect of the present disclosure relates to systems and methods for determining one or more sets of images from an image sequence, wherein each of the one or more sets of images may include a plurality of consecutive images from the image sequence. An image processing operation may be performed on at least one set of the one or more images sets of images. In the present disclosure, the one or more sets of images may be determined based on a user selection or be determined by an automatic process. By dividing the images included in the image sequence into one or more sets of images, a portion of the images included in the image sequence not the whole image sequence may be processed. Processing images included in the at least one set of the one or more sets, but not all the images included in the image sequence, can not only improve an efficiency of image processing of the imaging system 100, but also precision and quality of an object visualization.

Another aspect of the present disclosure relates to system and methods for image segmentation. A trained neural network (e.g., a trained guidewire segmentation model) with a U-Net architecture may be applied to determine a segmented image of an object based on an object image that includes a representation of the object. Based on structural characters of the object, a loss function including multiple coefficients and their corresponding weights may be designed. Such multiple coefficients may assess different features or aspects of image segmentation. Their weights may be used to modulate influences of such coefficients, and accordingly their corresponding features or aspects to the image segmentation. For instance, such multiple coefficients may include a soft Dice coefficient and its corresponding weight and a collinearity penalty coefficient and its corresponding weight. The soft Dice coefficient and its corresponding weight may determine segmenting precision of the segmented image. The collinearity penalty coefficient and its corresponding weight may determine continuity of the segmented image. In order to improve the quality of the image segmentation, the system and methods for image segmentation may also include pre-processing the guidewire image with a normalization operation. For illustration purposes, the systems and methods for image segmentation are described with reference to the segmentation of a guidewire in a guidewire image. A loss function including a soft Dice coefficient and a collinearity penalty coefficient, and their respective weights, may be designed. The soft Dice coefficient and its corresponding weight may determine segmenting precision of the segmented guidewire image. The collinearity penalty coefficient and its corresponding weight may determine continuity of the segmented guidewire image. In order to improve the quality of the image segmentation, the system and methods for segmenting the guidewire may also include pre-processing the guidewire image with a normalization operation.

A further aspect of the present disclosure relates to system and methods for segmenting a stent in a stent image. In an original stent image, the stent may only represent a small portion of the original stent image. If the original stent image is directly used as a source for stent segmenting, the result may highly depend on the segmentation algorithm used. The system and methods of the present disclosure provide a stent segmenting process based on a coarse-to-fine segmentation approach. The coarse-to-fine segmentation approach may determine a coarsely segmented stent image based on the stent image and then a finely segmented image may be determined based on the coarsely segmented stent image. By applying such an approach, influence of redundancy information in stent segmenting can be reduced and stent segmentation precision and quality may be improved.

A still further aspect of the present disclosure relates to system and methods for segmenting a stent in a stent image. The stent may be located in a stent image based on one or more target balloon marker pairs in one or more stent images. The detection of the one or more target balloon marker pairs in the corresponding one or more stent images may be performed based on a voting mechanism. Based on the one or more stent images, a first set of images and a second set of images may be determined. Under the voting mechanism, one or more individual balloon marker candidates in a first set of images may be determined. One or more balloon marker pairs may be determined based on the one or more individual balloon marker candidates. For each pair of the one or more balloon marker pairs, an occurrence frequency of the balloon marker pair in the first set of images may be determined. A target balloon marker pair may be determined from the one or more balloon marker pairs based on the occurrence frequency of each pair of the one or more balloon marker pairs. Based on the target balloon marker pair, one or more target balloon marker pairs may be determined in the second set of images. Based on the one or more target balloon marker pairs, enhanced visualization of the stent may be provided. In order to improve the reliability of the voting mechanism, one or more balloon marker characters may be used to determine reliability of an individual balloon marker candidate. The one or more balloon marker characters may include at least one of a degree of roundness, a size, or a balloon marker response value.

Figure 1:
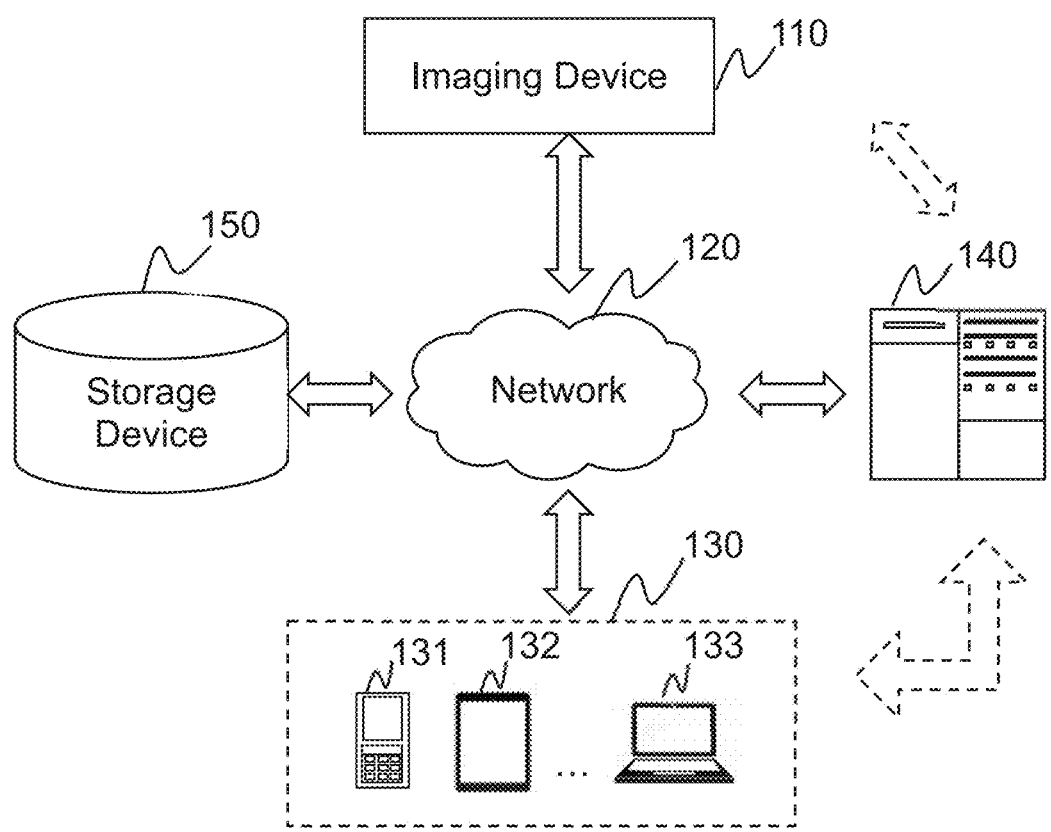
FIG. 1 is a schematic diagram illustrating an exemplary imaging system according to some embodiments of the present disclosure.

FIG. 1 is a schematic diagram illustrating an exemplary imaging system 100 according to some embodiments of the present disclosure. As illustrated, the imaging system 100 may include an imaging device 110, a network 120, a terminal 130, a processing device 140, and a storage device 150. The components of the imaging system 100 may be connected in one or more of various ways. Merely by way of example, as illustrated in FIG. 1, the imaging device 110 may be connected to the processing device 140 through the network 120. As another example, the imaging device 110 may be connected to the processing device 140 directly (as indicated by the bi-directional arrow in dotted lines linking the imaging device 110 and the processing device 140). As a further example, the storage device 150 may be connected to the processing device 140 directly or through the network 120. As still a further example, a terminal device (e.g., 131, 132, 133, etc.) may be connected to the processing device 140 directly (as indicated by the bi-directional arrow in dotted lines linking the terminal 130 and the processing device 140) or through the network 120.

The imaging device 110 may be used to scan a subject located within its detection region and generate a plurality of scan data (e.g., digital signals) used to generate one or more images relating to the subject. Mere by way of example, the subject may include a patient, a specific portion, organ, and/or tissue of a patient. For example, the subject may include head, brain, neck, body, shoulder, arm, thorax, cardiac, stomach, blood vessel, soft tissue, knee, feet, breast, or the like, or any combination thereof. As a further example, the object may include an implantable or interventional device. For example, the object may include a guidewire, a stent, a balloon, a catheter, a tube, a needle, a sheath, or the like, or any combination thereof.

In some embodiments, the imaging device 110 may be used to perform one or more operations in an interventional radiologist, such as operations corresponding to angioplasty, atherectomy, central venous access, carotid artery angioplasty and stenting, cerebral aneurysm coiling and stenting, chemoembolization, conscious sedation (also known as moderate sedation), cryoablation, drug-eluting stent, embolization, endovascular thrombectomy, feeding support tube, fluoroscopy, irreversible electroporation, PVC filter placement, kyphoplasty, microwave ablation, palliative interventional radiology, percutaneous drainage, prostate artery embolization, radioembolization, Radiofrequency ablation (RFA), radiotherapy, sclerotherapy, stenting, transhepatic balloon dilation, thrombolysis, Transjugular intrahepatic portosystemic, shunt (TIPS), Vein ablation, vertebroplasty, or yttrium-90.

In some embodiments, the imaging device 110 may be used to scan a blood vessel (or vessel for brevity) of the subject (e.g., a patient, a life-form). For example, the imaging device 110 may be an X-ray device. The imaging device 110 may include a patient holder, an X-ray tube, a detector, and a display device. The patient-holder tray may be placed on the top of the detector. The detector may be placed beneath the patient-holder tray. The X-ray tube may emit X-rays going through a specific portion of the patient where the vessel to be observed. The detector may be located opposite to the X-ray tube so as to detect at least a portion of the X-rays that have traversed the patient's specific portion and the patient-holder tray. The detector may transform the light signals of the detected X-rays into digital signals and transmit the digital signals to the processing device 140 for further processing (e.g., generating a reconstructed image). The image may be displayed on the display real-time for guiding a medical diagnosis or treatment. In some embodiments, the imaging device 110 may further include a user interface. Through the user interface, an operator may control the reconstruction and/or display of the image to achieve a desired effect or goal.

The network 120 may include any suitable network that can facilitate the exchange of information and/or data for the imaging system 100. In some embodiments, one or more components of the imaging system 100 (e.g., the imaging device 110, the terminal 130, the processing device 140, or the storage device 150) may communicate information and/or data with one or more other components of the imaging system 100 via the network 120. For example, the processing device 140 may obtain scan data (e.g., digital signals) of a vessel of an object (e.g., a patient) from the imaging device 110 via the network 120. In some embodiments, the network 120 may be any type of wired or wireless network, or a combination thereof. The network 120 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 120 may include a cable network, a wireline network, a fiber-optic network, a telecommunications network, an intranet, a wireless local area network (WLAN), a metropolitan area network (MAN), a public telephone switched network (PSTN), a BLUETOOTH network, a ZIGBEE network, a near field communication (NFC) network, or the like, or any combination thereof. In some embodiments, the network 120 may include one or more network access points. For example, the network 120 may include wired and/or wireless network access points, such as base stations and/or internet exchange points, through which one or more components of the imaging system 100 may be connected to the network 120 to exchange data and/or information.

The terminal 130 include a mobile device 131, a tablet computer 132, a laptop computer 133, or the like, or any combination thereof. In some embodiments, the mobile device 131 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, smart footgear, a pair of smart glasses, a smart helmet, a smart watch, smart clothing, a smart backpack, a smart accessory, or the like, or any combination thereof. In some embodiments, the smart mobile device may include a smartphone, a personal digital assistant (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google™ Glass, an Oculus Rift, a Hololens, a Gear VR, etc. In some embodiments, the terminal 130 may remotely operate the imaging device 110 and/or the processing device 140. In some embodiments, the terminal 130 may operate the imaging device 110 and/or the processing device 140 via a wireless connection. In some embodiments, the terminal 130 may receive information and/or instructions inputted by a user, and send the received information and/or instructions to the imaging device 110 or to the processing device 140 via the network 120. In some embodiments, the terminal 130 may receive data and/or information from the processing device 140. In some embodiments, the terminal 130 may be part of the processing device 140. In some embodiments, the terminal 130 may be omitted.

The processing device 140 may process data and/or information obtained from the imaging device 110, the terminal 130, and/or the storage device 150. For example, the processing device 140 may generate one or more medical images (e.g., stent images, vessel images) by processing scan data (e.g., digital signals) from the imaging device 110. As another example, the processing device 140 may determine one or more scan parameters for scanning a vessel using the imaging device 110. In some embodiments, the processing device 140 may be a single server, or a server group. The server group may be centralized or distributed. In some embodiments, the processing device 140 may be local or remote. For example, the processing device 140 may access information and/or data stored in or acquired by the imaging device 110, the terminal 130, and/or the storage device 150 via the network 120. As another example, the processing device 140 may be directly connected to the imaging device 110 (as illustrated by the bidirectional arrow in dashed lines connecting the processing device 140 and the imaging device 110 in FIG. 1), the terminal 130 (as illustrated by the bidirectional arrow in dashed lines connecting the processing device 140 and the terminal 130 in FIG. 1), and/or the storage device 150 to access stored or acquired information and/or data. In some embodiments, the processing device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 140 may be implemented on a computing device 200 having one or more components illustrated in FIG. 2 in the present disclosure.

The storage device 150 may store data and/or instructions. In some embodiments, the storage device 150 may store data obtained from the imaging device 110, the terminal 130 and/or the processing device 140. For example, the storage device 150 may store medical images (e.g., breast images) generated by the processing device 140. In some embodiments, the storage device 150 may store data and/or instructions that the processing device 140 may execute or use to perform exemplary methods described in the present disclosure. For example, the storage device 150 may store instructions that the processing device 140 may execute to determine one or more scan parameters. In some embodiments, the storage device 150 may include a mass storage device, a removable storage device, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more components of the imaging system 100 (e.g., the imaging device 110, the processing device 140, the terminal 130, etc.). One or more components of the imaging system 100 may access the data or instructions stored in the storage device 150 via the network 120. In some embodiments, the storage device 150 may be directly connected to or communicate with one or more components of the imaging system 100 (e.g., the imaging device 110, the processing device 140, the terminal 130, etc.). In some embodiments, the storage device 150 may be part of the processing device 140.

In some embodiments, the imaging system 100 may further include one or more power supplies (not shown in FIG. 1) connected to one or more components of the imaging system 100 (e.g., the imaging device 110, the processing device 140, the terminal 130, the storage device 150, etc.).

Figure 3:
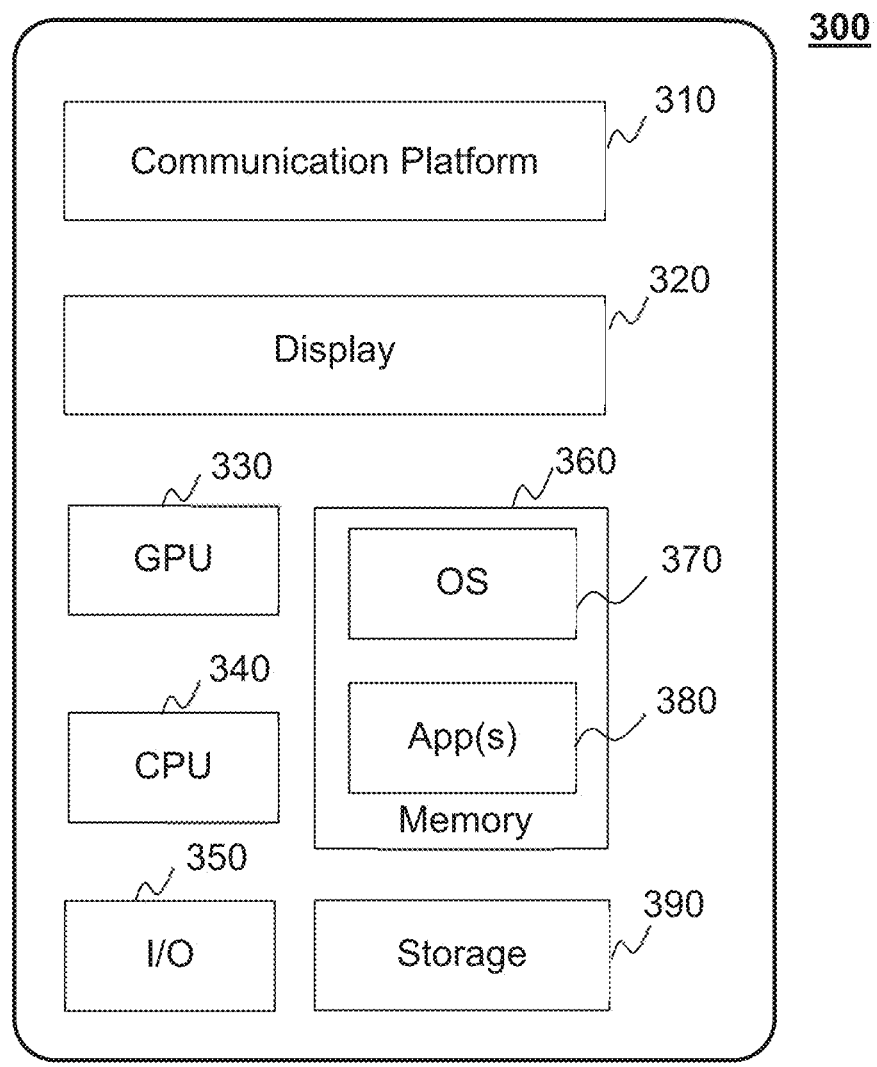
FIG. 3 is a schematic diagram illustrating exemplary hardware and/or software components of a mobile device on which the terminal may be implemented according to some embodiments of the present disclosure.

FIG. 2 is a schematic diagram illustrating exemplary hardware and/or software components of a computing device on which the processing device 140 may be implemented according to some embodiments of the present disclosure. As illustrated in FIG. 3, the computing device 200 may include a processor 210, a storage 220, an input/output (I/O) 230, and a communication port 240.

The processor 210 may execute computer instructions (program code) and perform functions of the processing device 140 in accordance with techniques described herein. The computer instructions may include routines, programs, objects, components, signals, data structures, procedures, modules, and functions, which perform particular functions described herein. For example, the processor 210 may generate one or more medical images (e.g., stent images, guidewire images, vessel images) by processing scan data (e.g., digital signals) from the imaging device 110. As another example, the processor 210 may determine one or more scan parameters for scanning an object using the imaging device 110. In some embodiments, the processor 210 may include a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration purposes, only one processor is described in the computing device 200. However, it should be noted that the computing device 200 in the present disclosure may also include multiple processors, and thus operations of a method that are performed by one processor as described in the present disclosure may also be jointly or separately performed by the multiple processors. For example, if in the present disclosure the processor of the computing device 200 executes both operations A and B, it should be understood that operations A and step B may also be performed by two different processors jointly or separately in the computing device 200 (e.g., a first processor executes operation A and a second processor executes operation B, or the first and second processors jointly execute operations A and B).

The storage 220 may store data/information obtained from the imaging device 110, the terminal 130, the storage device 150, or any other component of the imaging system 100. In some embodiments, the storage 220 may include a mass storage device, a removable storage device, a volatile read-and-write memory, a read-only memory (ROM), or the like, or any combination thereof. For example, the mass storage device may include a magnetic disk, an optical disk, a solid-state drive, etc. The removable storage device may include a flash drive, a floppy disk, an optical disk, a memory card, a zip disk, a magnetic tape, etc. The volatile read-and-write memory may include a random-access memory (RAM). The RAM may include a dynamic RAM (DRAM), a double date rate synchronous dynamic RAM (DDR SDRAM), a static RAM (SRAM), a thyristor RAM (T-RAM, and a zero-capacitor RAM (Z-RAM), etc. The ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure. For example, the storage 220 may store instructions that the processor 210 may execute to determine one or more scan parameters.

The I/O 230 may input or output signals, data, or information. In some embodiments, the I/O 230 may enable user interaction with the processing device 140. In some embodiments, the I/O 230 may include an input device and an output device. Exemplary input devices may include a keyboard, a mouse, a touch screen, a microphone, a trackball, or the like, or a combination thereof. Exemplary output devices may include a display device, a loudspeaker, a printer, a projector, or the like, or a combination thereof. Exemplary display devices may include a liquid crystal display (LCD), a light-emitting diode (LED)-based display, a flat panel display, a curved screen, a television device, a cathode ray tube (CRT), or the like, or a combination thereof.

The communication port 240 may be connected to a network (e.g., the network 120) to facilitate data communications. The communication port 240 may establish connections between the processing device 140 and the imaging device 110, the terminal 130, or the storage device 150. The connection may be a wired connection, a wireless connection, or a combination of both that enables data transmission and reception. The wired connection may include an electrical cable, an optical cable, a telephone wire, or the like, or any combination thereof. The wireless connection may include Bluetooth, Wi-Fi, WiMax, WLAN, ZigBee, mobile network (e.g., 3G, 4G, 5G, etc.), or the like, or a combination thereof. In some embodiments, the communication port 240 may be a standardized communication port, such as RS232, RS485, etc. In some embodiments, the communication port 240 may be a specially designed communication port. For example, the communication port 240 may be designed in accordance with the digital imaging and communications in medicine (DICOM) protocol.

FIG. 3 is a schematic diagram illustrating exemplary hardware and/or software components of a mobile device on which the terminal 130 may be implemented according to some embodiments of the present disclosure. As illustrated in FIG. 3, the mobile device 300 may include a communication platform 310, a display 320, a graphics processing unit (GPU) 330, a central processing unit (CPU) 340, an I/O 350, a memory 360, and storage 390. In some embodiments, any other suitable component, including but not limited to a system bus or a controller (not shown), may also be included in the mobile device 300. In some embodiments, a mobile operating system 370 (e.g., iOS, Android, Windows Phone, etc.) and one or more applications 380 may be loaded into the memory 360 from the storage 390 in order to be executed by the CPU 340. The applications 380 may include a browser or any other suitable mobile apps for receiving and rendering information relating to image processing or other information from the processing device 140. User interactions with the information stream may be achieved via the I/O 350 and provided to the processing device 140 and/or other components of the imaging system 100 via the network 120.

To implement various modules, units, and their functionalities described in the present disclosure, computer hardware platforms may be used as the hardware platform (s) for one or more of the elements described herein. The hardware elements, operating systems and programming languages of such computers are conventional in nature, and it is presumed that those skilled in the art are adequately familiar therewith to adapt those technologies to the blood pressure monitoring as described herein. A computer with user interface elements may be used to implement a personal computer (PC) or another type of work station or terminal device, although a computer may also act as a server if appropriately programmed. It is believed that those skilled in the art are familiar with the structure, programming and general operation of such computer equipment and as a result the drawings should be self-explanatory.

Figure 4:
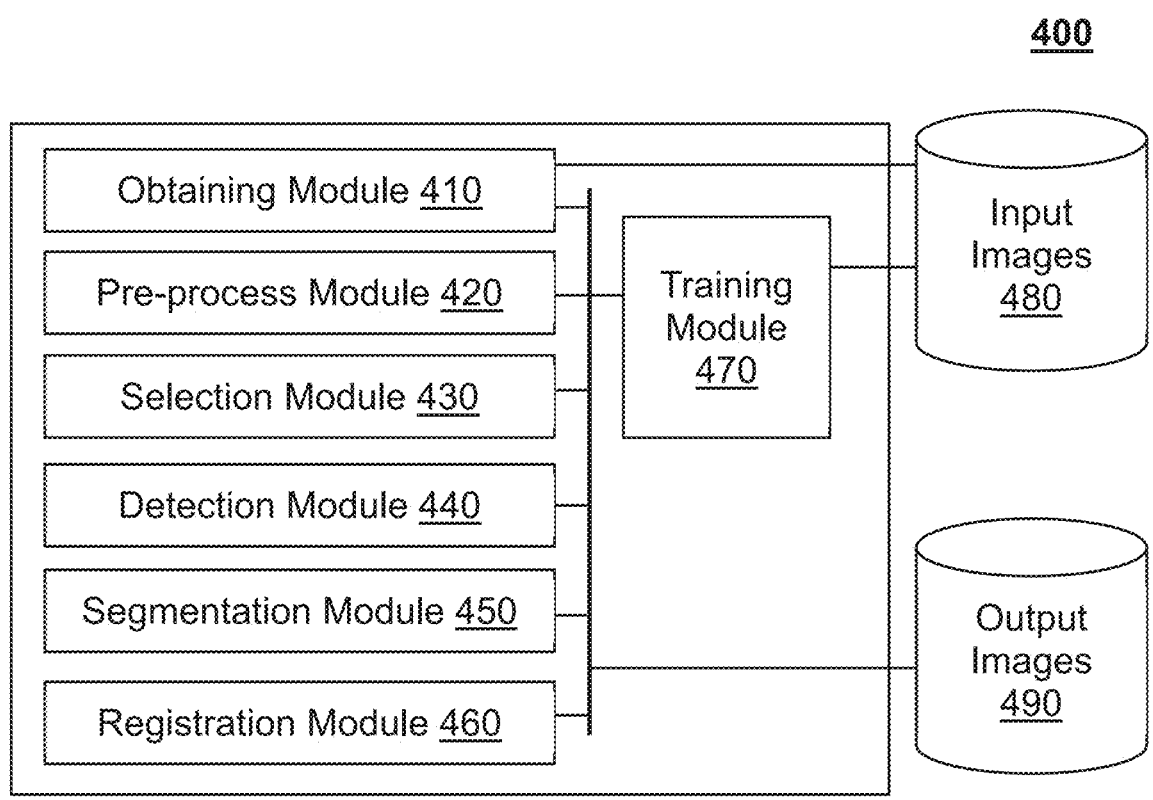
FIG. 4 is a schematic block diagram illustrating an exemplary processing device 400 according to some embodiments of the present disclosure.

FIG. 4 is a schematic block diagram illustrating an exemplary processing device 400 according to some embodiments of the present disclosure. The processing device 400 may be configured to include an obtaining module 410, a pre-process module 420, a selection module 430, a detection module 440, a segmentation module 450, a registration module 460, and a training module 470. The processing device 400 obtain input images 480 and generate one or more output images.

Figure 21:
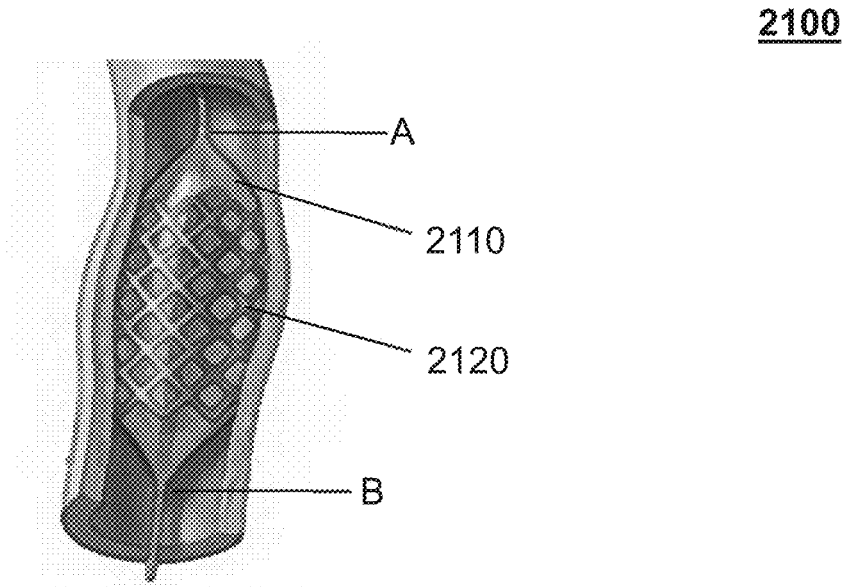
FIG. 21 is a schematic diagram illustrating an exemplary balloon according to some embodiments of the present disclosure.

The obtaining module 410 may be configured to obtain one or more images (e.g., the input images 480). The one or more images may include a stent image, a guidewire image, or the like, or any combination thereof. In some embodiments, a single image included in the one or more images may correspond to more than one interventional device (e.g., a guidewire, a stent, a balloon). For example, the image 2200 as illustrated in FIG. 21 may include a representation of a balloon 2110 and a representation of a stent 2120. In some embodiments, the one or more images may be acquired by the imaging device 110.

As used herein, a representation of a subject (e.g., a patient, or a portion thereof) in an image may be referred to as the subject for brevity. For instance, a representation of an organ or tissue (e.g., the heart, the liver, a lung, etc., of a patient) in an image may be referred to as the organ or tissue for brevity. An image including a representation of a subject may be referred to as an image of the subject or an image including the subject for brevity. As used herein, an operation on a representation of a subject in an image may be referred to as an operation on the subject for brevity. For instance, a segmentation of a portion of an image including a representation of an organ or tissue (e.g., the heart, the liver, a lung, etc., of a patient) may be referred to as a segmentation of the organ or tissue for brevity. An image obtained in such a segmentation may be referred to as a segmented image. For instance, an image obtained by a segmentation of a stent from a stent image may be referred to as a segmented stent image.

In some embodiments, the one or more images may include real-time images. For example, the one or more images may be images acquired in an interventional process (e.g., a stent implant). Based on further image processing performed by the processing device 400, one or more objects (e.g., a vessel, a stent) in the interventional process may be displayed on a device. In some embodiments, the processing device 400 may obtain raw data from the imaging device 110. In such a situation, image reconstruction and further processing (e.g., segmentation, enhancement, visualization) may both be performed by the processing device 400.

Meanwhile, the processing device 400 may generate the output images 490 in real-time. In some embodiments, the speed of real-time processing of images performed by the processing device 400 may ranges within a speed range. In some embodiments, an upper threshold of the speed range may be 400 frames per second (fps), 300 fps, 150 fps, 100 fps, 50 fps, 20 fps, or the like. In some embodiments, a lower threshold of the speed range may be 200 fps, 180 fps, 150 fps, 120 fps, 100 fps, 50 fps, 30 fps, 20 fps, 10 fps, 5 fps, 3 fps. For example, an average speed of real-time processing of images may be 15 fps, 30 fps, 100 fps, 120 fps, or the like. The speed range may be determined based on sizes of images to be processed. For example, the speed range may range from 60 fps for pediatric patients to 3.75 fps on gastrointestinal images. High-quality real-time imaging may enable an increased use of minimally invasive techniques to reduce the duration of examinations, shorten patient recovery time, and improve clinical outcomes. In some embodiments, the output images may be displayed on a device as described in process 600C of FIG. 6C.

In some embodiments, the one or more images may include one or more prior images. For example, the one or more images may include a plurality of labeled images for performing a neural network training. As another example, the one or more images may include reference images for image registration. As a further example, the one or more images may include control images of a region of interest (ROI) of a patient acquired in a particular time before an interventional process.

In some embodiments, the obtaining module 410 may obtain the one or more images from different sources. For example, in a process of imaging coronary arteries, mask images may be taken prior to a prefusion of a contrast media and coronary arteries are not visible in them. The mask images may be stored in a storage device (e.g., a storage device 150) and be obtained by the obtaining module 410 from a first source (i.e., the storage device 150). While live images may be taken by the imaging device 110 during the contrast media passing through the coronary arteries. The live images may be obtained by the obtaining module 410 from a second source (i.e., the imaging device 110).

The pre-process module 420 may be configured to perform one or more image pre-processing operations. In some embodiments, the one or more image pre-processing operations may include noise reduction, image restoration, image compression, image enhancement, image normalization, or the like, or any combination thereof.

The selection module 430 may be configured to determine one or more images from a plurality of images, or determine one or more sets of images from a plurality of image sets. The selection of the images or image sets may be performed manually or automatically. For example, the selection module 430 may select one or more images based on a user input of a series of IDs of the one or more images. As another example, the selection module 430 may divide a plurality of images into one or more sets based on whether an object is detected in each of the plurality of images. The selection module 430 may perform image selection based on one or more criterions. The one or more criterions may include an image ID, image quality, image sharpness, image contrast, an object detected in an image, an image size, or the like, or any combination thereof.

The detection module 440 may be configured to detect an existence of one or more objects in an image. The existence of the one or more objects in the image may be confirmed based on one or more characters corresponding to the one or more objects. For example, the detection module 440 may be configured to detect the stent 2120 based on the balloon marker A and balloon marker B as illustrated in image 2100 of FIG. 21. In some embodiments, the detection module may be configured to detect location information of one or more objects.

The detection module 440 may perform an object detection based on a neural network-based approach or a non-neural network approach (e.g., a feature descriptor-based approach). Exemplary neural network-based approaches may include a Viola-Jones object detection framework based on Haar features, a Scale-invariant feature transform (SIFT) algorithm, Histogram of oriented gradients (HOG) features, or the like. Exemplary non-neural network approaches may include Region Proposals (e.g., R-CNN, Fast R-CNN, Faster R-CNN, cascade R-CNN), Single Shot MultiBox Detector (SSD), You Only Look Once (YOLO), Single-Shot Refinement Neural Network for Object Detection (RefineDet), Retina-Net, Deformable convolutional networks, Feature Pyramid Network (FPD), Deterministic Network (DetNet), or the like.

The segmentation module 450 may be configured to segment an image. In some embodiments, the image segmentation may include a location information-based approach. For example, a stent may be located based on a target balloon marker pair 2230 and a box (not shown in FIG. 22C) as illustrated in image 2200C; a region determined based on the box may be segmented. In some embodiments, the image segmentation may be performed based on a model-based approach. The model may include an end-to-end neural network. For example, a guidewire image segmentation model with a U-Net architecture may be employed to determine a segmented guidewire image based on a guidewire image. As another example, a stent segmentation model with a U-Net architecture may be employed to determine a segmented stent image based on a stent image.

In some embodiments, the segmentation module 450 may include a coarsely segmentation unit and/or a finely segmentation unit (not shown). The coarsely segmentation unit may be configured to segment an image to determine a region including an object. The region may be configured to determining a bounding box enclosing the object in the image. The region may be of a specific shape, such as a rectangle, a trapezoid, a triangle, or the like. The finely segmentation unit may be configured to segment an image based on contour information of the object. Compared with a coarsely segmented image, a finely segmented image may include less redundancy information. As used herein, redundancy information with respect to an object in an image refers to information of a region of the image that is outside the contour of the representation of the object in the image.

The registration module 460 may be configured to perform an image registration operation by establishing geometrical correspondences between two images. In some embodiments, after two images of an object are registered, the correspondence between elements (e.g., pixels, voxels) of the two images are identified such that an element in one of the two images and a corresponding element in the other of the two images represent a same physical point of the object or a same physical point in space. The image registration operation may be performed based on information detected in different images corresponding to the same object, for example a target balloon marker pair, a stent, a guidewire, or the like, or any combination thereof. The image registration operation may include an intensity-based registration or a landmark based registration. The landmark may include a balloon (e.g., a balloon marker A, a balloon marker B, a target balloon marker pair 2230), a tube (e.g., a tube marker 710, a tube marker 720), a guidewire, a stent, or the like, or any combination thereof.

The training module 470 may be configured to train a neural network model. The trained neural network model may be configured to detect an existence of an object, detect location information of an object, segment an image, or the like. In some embodiments, the training module 470 may be configured to train a guidewire segmentation model for segmenting a guidewire image as described in FIG. 10. In some embodiments, the training module 470 may be configured to train object detection model and/or stent image segmentation model as employed in FIG. 13.

Figure 10:
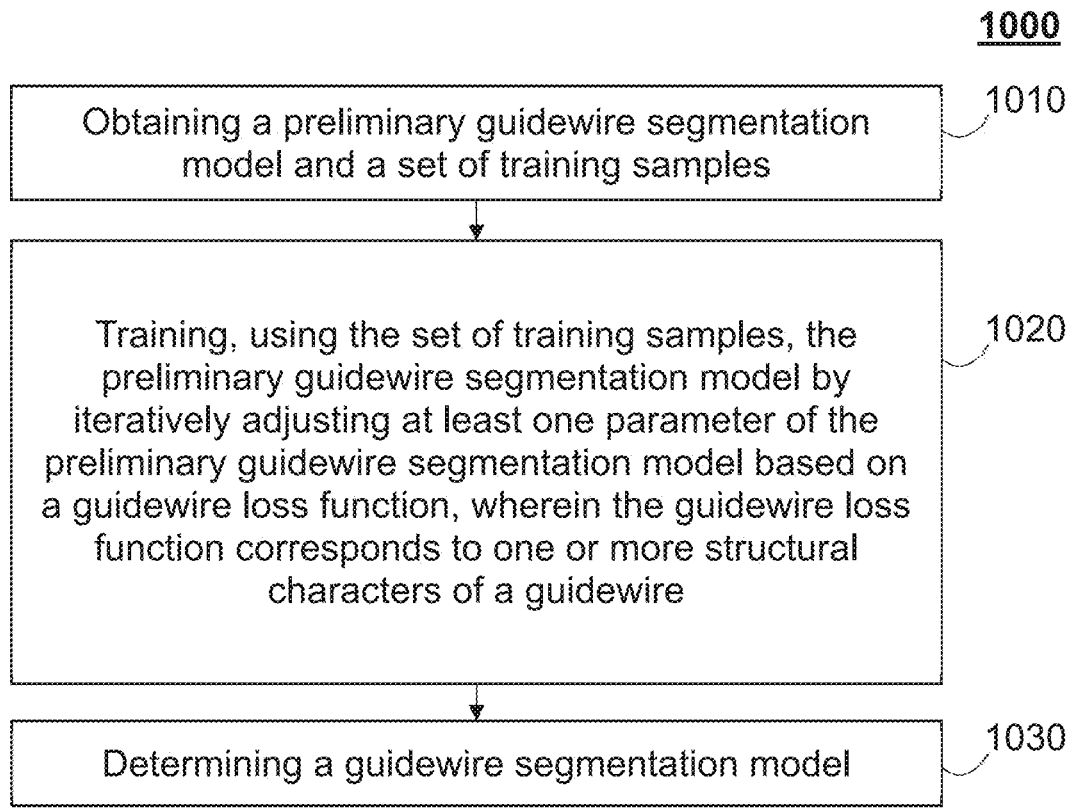
FIG. 10 is a flowchart illustrating an exemplary process for training a guidewire segmentation model according to some embodiments of the present disclosure.

In some embodiments, the training module 470 may train neural network models for a same task (e.g., guidewire image segmentation) with a same architecture (e.g., a U-Net architecture) for different effects. For example, more than one guidewire segmentation model of U-Net architecture may be trained with more than one loss function-weight pairs (i.e., ($\lambda 1$, $\lambda 2$)) as illustrated in FIG. 10. The more than one guidewire segmentation model may segment a guidewire image with different combinations of precision and continuity levels (e.g., combination A including precision level A and continuity level A, combination B including precision level B and continuity level B.

In some embodiments, the training module 470 may train neural network models with the same architecture for different tasks. For example, a trained guidewire segmentation model employed in process 1100 and a trained stent segmentation model employed in process 1500 may both include a U-Net architecture but the trained guidewire segmentation model may be used for guidewire image segmentation and the trained stent segmentation model may be used or stent segmentation.

The modules in the processing device 400 may be connected to or communicate with each other via a wired connection or a wireless connection. Available connections may refer to the connections described relating to the communication port 240.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the processing device 400 may further include a storage module (not shown in FIG. 4). The storage module may be configured to store data generated during any process performed by any component of in the processing device 400. As another example, each of the components of the processing device 400 may include a storage device. Additionally or alternatively, the components of the processing device 400 may share a common storage device. As still another example, the pre-process module 420 may be omitted. As a further example, the training module 470 may be implemented on a different processing device than the processing device 400 such that the model training may be performed offline and pre-installed or retrievable by the processing device 400 for online image processing or analysis.

Figure 5:
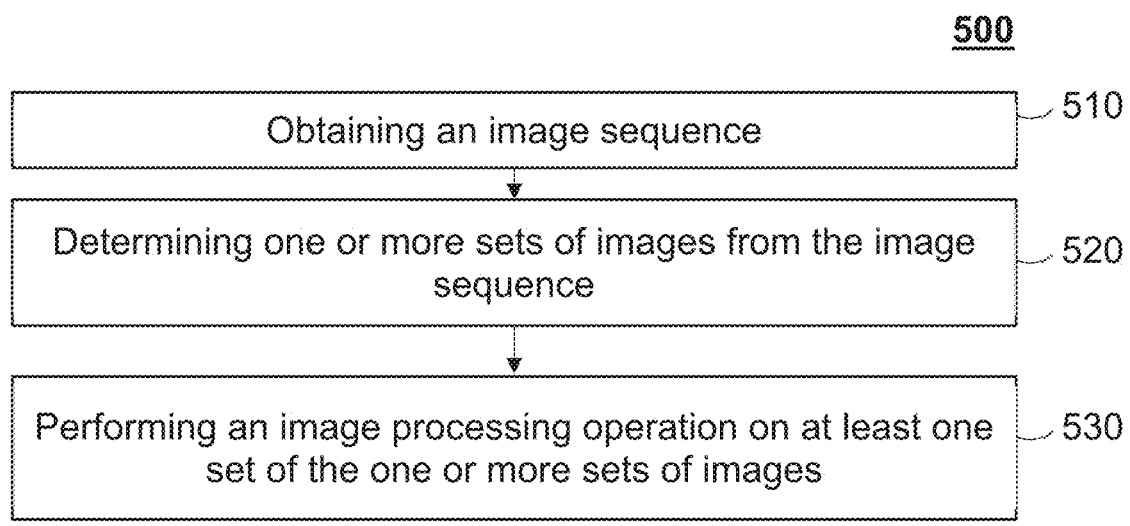
FIG. 5 is a flowchart illustrating an exemplary process for processing a plurality of images according to some embodiments of the present disclosure.

FIG. 5 is a flowchart illustrating an exemplary process for processing a plurality of images according to some embodiments of the present disclosure. In some embodiments, the process 500 may be implemented in the imaging system 100 illustrated in FIG. 1. For example, the process 500 may be stored in a storage medium (e.g., the storage device 150, or the storage 220 of the processing device 140, the storage 390 of the terminal 130, the memory 360 of the terminal 130) as a form of instructions, and can be invoked and/or executed by the processing device 140 or the terminal 130 (e.g., the processor 210 of the processing device 140, the CPU 340 and/or the GPU 330 of the terminal 130, or one or more modules in the processing device 140 illustrated in FIG. 4). The operations of the illustrated process 500 presented below are intended to be illustrative. In some embodiments, the process 500 may be accomplished with one or more additional operations not described, and/or without one or more of the operations discussed. Additionally, the order in which the operations of the process 500 as illustrated in FIG. 5 and described below is not intended to be limiting. In some embodiments, image sequence obtained in operation 510 of the process 500A may be acquired based on the process 600A. In some embodiments, operation 520 of the process 500A may be performed based on the process 600B. In some embodiments, operation 530 of the process 500A may be performed based on the process 600C, 1100, 1300, 1600, and/or 1700.

In 510, the obtaining module 410 may obtain an image sequence. The image sequence may be acquired by the imaging device 110 for scanning a target portion of a subject. The target portion of a subject may be a portion where an object (e.g., interventional device) exits or is predicted or expected to exit. In some embodiments, the target portion of the subject may include a blood vessel (e.g., femoral vein, subclavian vein) where a guidewire passes through, or a coronary artery of stenosis or occlusion. The guidewire may include a moveable device used to guide another device (e.g., a stent, a tube, a balloon, a catheter) into place during a vessel interventional procedure. For example, a guidewire with a deflated balloon may extend out of a catheter in a narrowed artery. The balloon may be then inflated to open the narrowed artery and a stent expands around the balloon. The balloon may be removed and the stent is left in place to keep the artery open.

In some embodiments, the image sequence may include a plurality of images. The plurality of images may be organized based on the time when an implantable or interventional device is put in a patient. In some embodiments, the plurality of images may include one or more sub-sequences. Each of the sub-sequences may be obtained by the imaging device 110 according to a corresponding parameter set. Parameters included in the parameter set may include a scanning portion of the patient, a radiation dosage of an X-ray device, a scanning time duration, an image acquisition rate, a scanning angle, or the like, or any combination thereof. For example, the image sequence may correspond to a stent and include a first sub-sequence taken in a first time period and a second sub-sequence taken in a second time period.

In some embodiments, the image sequence may correspond to a heart of a patient. The image sequence may record one or more cardiac cycles. For example, the image sequence may include 2 sub-sequences. Each sub-sequence may record images of two cardiac cycles (e.g., apical 4-chamber long-axis thoracic 2D-echo images) at a rate of, e.g., 30 fps. The two cardiac cycles recorded in an image sub-sequence may be consecutive or nonconsecutive. As another example, the image sequence may include a plurality of sub-sequences acquired in a plurality of cardiac cycles.

In some embodiments, the image sequence may include an X-ray angiography (XRA) image sequence, a fluoroscopic sequence (e.g., a digital subtraction angiography sequence), an angiogram sequence, or the like, or any combination thereof. For example, the image sequence may be acquired by a process including color-coded digital subtraction angiography in which contrast media is employed. By detecting the contrast media in the image sequence, an object (e.g., a stent) may be detected.

In 520, the selection module 430 may determine one or more sets of images from the image sequence. The one or more sets of images may include one image or a plurality of consecutive images from the image sequence.

In some embodiments, the one or more sets of images may be determined based on a user selection. The user selection may be obtained through interfaces 800B and 800C as illustrated in FIGS. 8B and 8C. For example, information of the image sequence may be provided to a user in interfaces 800B and 800C. The information of the image sequence may include a visualization of one or more images in the image sequence, an image count of images included in the image sequence (i.e., number indicator 835), an evaluation of one or more images in the image sequence, a sequence number of each image in the image sequence, or the like. The information of the image sequence may provide the user with reference information to facilitate the user to provide an instruction for an image selection.

In some embodiments, the one or more sets of images may be determined by an automated process. The automated process may classify images included in the image sequence into one ore more sets based on the existence of an object in an image, image quality, or the like, or any combination thereof. For example, a stent may be detected in one or more images in the image sequence. The one or more images may constitute a stent image set. As another example, each image included in the image sequence may be evaluated to determine an image quality value. One or more images with the image quality value in a range (e.g., higher than a threshold) may be assigned to an image set.

In some embodiments, an image set may be determined based on at least one image and one or more images in the neighborhood of the at least one images in an image sequence. A first count of images that immediately precede the at least one image and a second count of images that immediately follow the at least one image may be identified. The image set may be determined based on the first count of images, the second count of images, and the at least one image. The first count and the second count may be the same or different. The first count and/or the second count may be inputted by a user or determined based on a pre-setting value. For example, assuming the first count and the second count are both 10, after the at least one images in the image sequence in determined, 10 images on a left side of the at least one image (preceding the at least one image) in the image sequence and 10 images on a right side of at least one image (following the at least one image) in the image sequence may be determined as a new set of images. As another example, the at least one first image includes a first image of the image sequence, a second image subsequent to the first image of the image sequence, and any image(s) between the first image and the second image in the image sequence. A first count of images that immediately precede the first image and a second count of images that immediately follow the second image may be identified. The image set may be determined to include the first count of images, the second count of images, the first image, the second image, and any image(s) between the first image and the second image in the image sequence.

In some embodiments, images included in the one or more sets of images may not overlap each other. That is to say, an image in the image sequence may only belong to one set. In some embodiments, one or more images may be omitted and assigned to none of the one or more sets of images. For example, two neighboring sets of the one or more sets of images are separated by at least one image of the image sequence that belongs to none of the one or more sets of images. Such neighboring sets may be referred to as interval sets. As used herein, two image sets are considered neighboring sets if there are no other image set between the two image sets. In some embodiments, at least two image sets have one or more overlapping images such that the one or more images concurrently belong to the at least two image sets. For example, one or more images may be assigned to both set A and set B, while the set A includes at least one image which does not belong to the set B.

In 530, the processing device 400 may perform an image processing operation on at least one set of the one or more sets of images. The image processing operation may include image segmentation, image enhancement, image registration, image displaying, object visualization (e.g., enhanced stent visualization), object detection, or the like, or any combination thereof. In some embodiments, the at least one image set may include two neighboring sets. In some embodiments, the at least one image set may include two interval sets.

Figure 7:
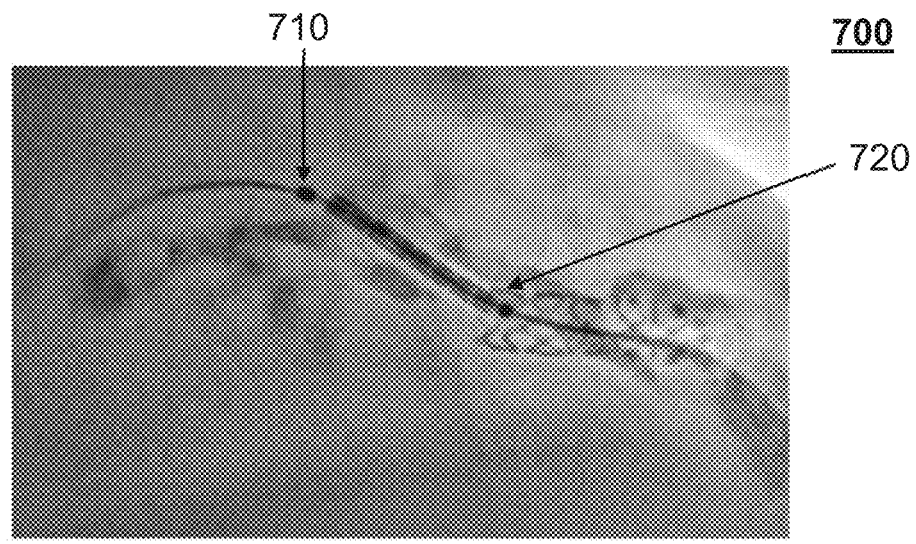
FIG. 7 illustrates an exemplary tube image according to some embodiments of the present disclosure.

In some embodiments, the image processing may include a landmark based object visualization. For example, a tube marker 710 and a tube marker 720 as illustrated in FIG. 7 may be detected based on the at least one set of the one or more sets of images. A stent may be located between the tube marker 710 and the tube marker 720. An enhanced stent visualization (ESV) may be performed based on the detection of the tube markers in the at least one set of the one or more sets of images. As another example, a plurality of target balloon marker pairs may be identified in a plurality of images included in the at least one set. Further image segmentation and stent visualization may be performed based on the plurality of target balloon marker pairs as illustrated in process 1600 and process 1700. In some embodiments, the stent visualization may be employed in a coronary intervention for tracking a stent. The stent visualization may be utilized either along with or in substitution for intracoronary imaging techniques during stent implantation, to assess, e.g., stent expansion, superimposing, and integrity.

In some embodiments, the image processing may include image segmentation. For example, the at least one set may include a guidewire image, and it may be segmented based on a trained guidewire image segmentation model as illustrated in process 1100. As another example, the at least one set may include a stent image and it may be segmented based on a coarse-to-fine segmentation approach as illustrated in process 1300.

In some embodiments, the image processing may include image displaying. For example, one or more images included in the at least one set may be displayed as illustrated in process 600C.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, 520 may be skipped, which means the plurality of images may be transmitted to the processing device 400. However, the legal protection scope will be defined by the description of claims.

Figure 6A:
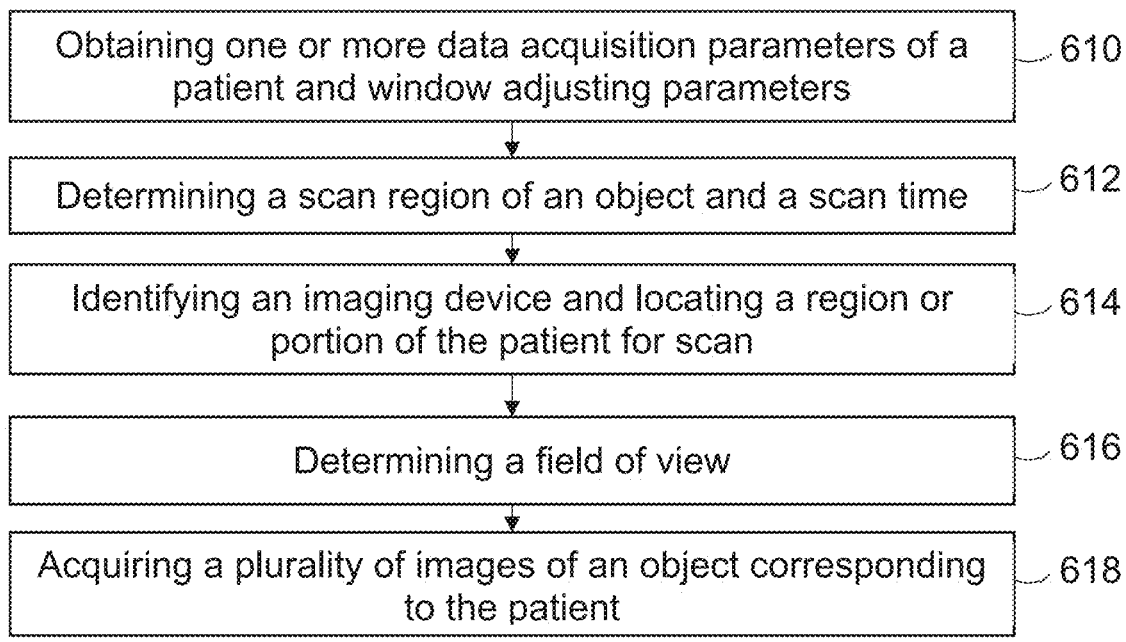
FIG. 6A is a flowchart illustrating an exemplary process for acquiring a plurality of images according to some embodiments of the present disclosure.

FIG. 6A is a flowchart illustrating an exemplary process for acquiring a plurality of images according to some embodiments of the present disclosure. In some embodiments, the process 600A may be implemented in the imaging system 100 illustrated in FIG. 1. For example, the process 600A may be stored in a storage medium (e.g., the storage device 150, or the storage 220 of the processing device 140, the storage 390 of the terminal 130, the memory 360 of the terminal 130) as a form of instructions, and can be invoked and/or executed by the processing device 140 or the terminal 130 (e.g., the processor 210 of the processing device 140, the CPU 340 and/or the GPU 330 of the terminal 130, or one or more modules in the processing device 140 illustrated in FIG. 4). The operations of the illustrated process 600A presented below are intended to be illustrative. In some embodiments, the process 600A may be accomplished with one or more additional operations not described, and/or without one or more of the operations discussed. Additionally, the order in which the operations of the process 600A as illustrated in FIG. 6A and described below is not intended to be limiting.

In 610, the imaging system 100 may obtain one or more data acquisition parameters of a patient and window adjusting parameters. The one or more data acquisition parameters may include the size of an image to be generated based on the data to be acquired, data format of the data, the starting position of the data acquisition, the end position of the data acquisition, and the region of the patient to be covered in the data acquisition. The window adjusting parameters may specify a window in which the image is to be displayed. The window adjusting parameters may include a window width, a window level, or a window adjusting mode (e.g., an automatic mode, a manual mode).

In 612, the imaging system 100 may determine a scan region of a patient and a scan time. In some embodiments, the scan region may be determined based on an issue of interest (e.g., a disease) of the patient. The scan time may be determined based on, e.g., the status of the patient.

In 614, the imaging system 100 may identify an imaging device 110 that is used to scan the patient and locate a region or portion of the patient for scan using the imaging device 110.

In 616, the imaging device 110 may determine a field of view by determining a starting position of the data acquisition by scan using the imaging device 110.

In 618, the imaging device 110 may acquire a plurality of images of an object corresponding to the patient. The object may be an interventional device located in region or portion of the patient. In some embodiments, the acquisition of the plurality of images may include one or more operations, such as an image checking operation, a testing operation, a resetting phase operation, and a filling phase operation. In some embodiments, an image sequence as illustrated in process 500 may be acquired based on the one or more operations.

In the image checking operation, an image acquired in 618 may be checked based on one or more parameters (e.g., image quality, image content).

In the testing operation, a phase testing corresponding to the object may be performed. The object may include the heart of the patient. A cardiac cycle of the heart may include four phases including a filling phase, an isovolumetric contraction phase, an outflow phase, and an isovolumetric relaxation phase. In some embodiments, a target region testing may be performed in any of the four phases. The target region may be determined based visual perception in a time period (e.g., one or more seconds, one or more minutes). During the visual perception, one or more images corresponding to the target region may be acquired. Based on the acquired images corresponding to the target region, a compensation process may be performed in which a count of X-ray pass through the patient may be adjusted.

In the resetting phase operation, a reversal point (e.g., a starting point of a filling phase) may be determined and assigned as a starting time point for data acquisition.

In the filling phase operation, data may be acquired and one or more images may be reconstructed and displayed based on the acquired data. The filling phase operation may be perform base on the determined reversal point corresponding to a filling phase of the cardiac cycle. The one or more images may be used to provide a visualization of a bolus injection of contrast media.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 6B:
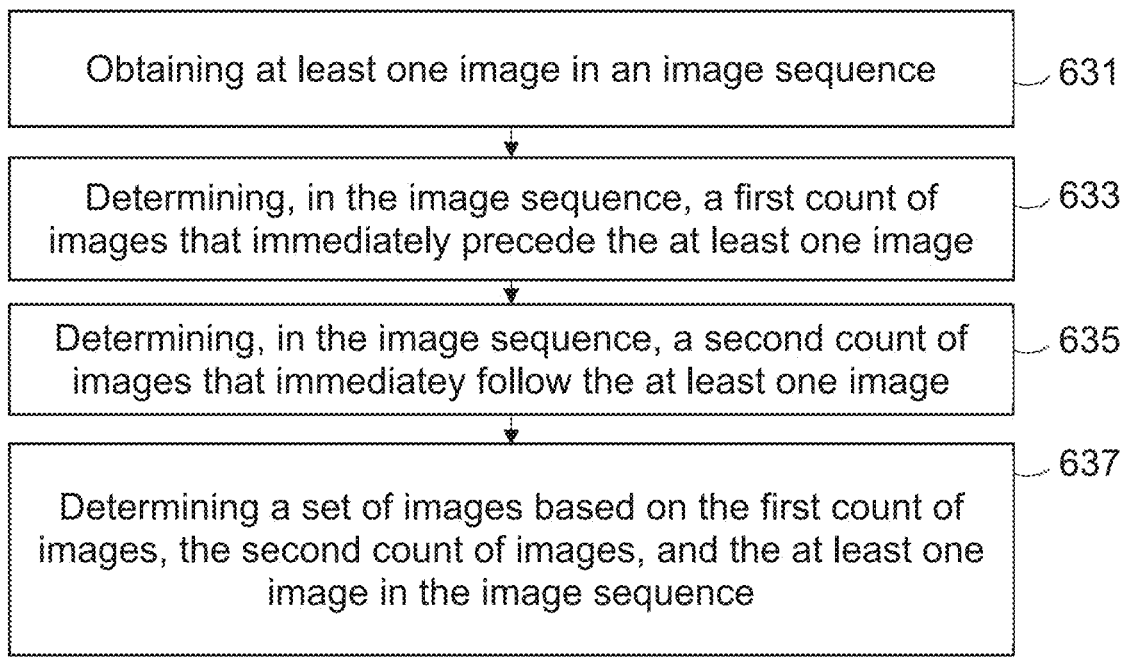
FIG. 6B is a flowchart illustrating an exemplary process for determining a set of images based on at least one image according to some embodiments of the present disclosure.

FIG. 6B is a flowchart illustrating an exemplary process for determining a set of images based on at least one image according to some embodiments of the present disclosure. In some embodiments, the process 600B may be implemented in the imaging system 100 illustrated in FIG. 1. For example, the process 600B may be stored in a storage medium (e.g., the storage device 150, or the storage 220 of the processing device 140, the storage 390 of the terminal 130, the memory 360 of the terminal 130) as a form of instructions, and can be invoked and/or executed by the processing device 140 or the terminal 130 (e.g., the processor 210 of the processing device 140, the CPU 340 and/or the GPU 330 of the terminal 130, or one or more modules in the processing device 140 illustrated in FIG. 4). The operations of the illustrated process 600B presented below are intended to be illustrative. In some embodiments, the process 600B may be accomplished with one or more additional operations not described, and/or without one or more of the operations discussed. Additionally, the order in which the operations of the process 600B as illustrated in FIG. 6B and described below is not intended to be limiting.

In 631, the obtaining module 410 may obtain at least one image in an image sequence. The at least one image may be determined based on a user input or object detection. For example, the at least one image may be one or more consecutive images in which an object (e.g., a stent, a guidewire) are detected.

In 633, the selection module 430 may determine, in the image sequence, a first count of images that immediately precede the at least one image.

In 635, the selection module 430 may determine, in the image sequence, a second count of images that immediately follow the at least one image.

The first count and the second count may be the same or different. For example, the first count may be 15, the second count may be 10. As another example, the first count and second count may both be 10. In some embodiments, the first count and second count may be a pre-set number. In some embodiments, the first count and second count may be determined based on a calculation process. For example, the first count and the second count may be a value of 1% count of images included in the image sequence.

In 637, the selection module 430 may determine a set of images based on the first count of images, the second count of images, and the at least one image in the image sequence.

In some embodiments, the set of images may be any set of the one or more sets of images in 520 of process 500 as illustrated in FIG. 5.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, 633 and/or 635 may be skipped, which means the set of images may be determined based on one or more of the at least one image, the first count of images, or the second count of images for further processing. In some embodiments, a third count of images may be removed from the at least one image in the image sequence. For example, an image whose quality is deemed lower than a quality threshold may be removed. As another example, a preset count of images at a preset location (e.g., first and/or last 7 images of the image sequence) may be removed from the at least one image in the image sequence.

Figure 6C:
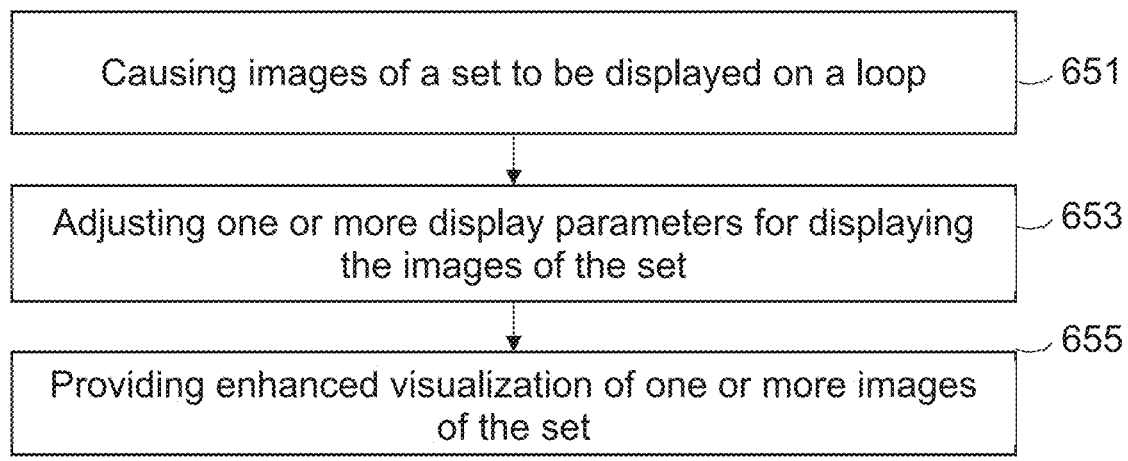
FIG. 6C is a flowchart illustrating an exemplary process for processing a plurality of images according to some embodiments of the present disclosure.

FIG. 6C is a flowchart illustrating an exemplary process for processing a plurality of images according to some embodiments of the present disclosure. In some embodiments, the process 600C may be implemented in the imaging system 100 illustrated in FIG. 1. For example, the process 600C may be stored in a storage medium (e.g., the storage device 150, or the storage 220 of the processing device 140, the storage 390 of the terminal 130, the memory 360 of the terminal 130) as a form of instructions, and can be invoked and/or executed by the processing device 140 or the terminal 130 (e.g., the processor 210 of the processing device 140, the CPU 340 and/or the GPU 330 of the terminal 130, or one or more modules in the processing device 140 illustrated in FIG. 4). The operations of the illustrated process 600C presented below are intended to be illustrative. In some embodiments, the process 600C may be accomplished with one or more additional operations not described, and/or without one or more of the operations discussed. Additionally, the order in which the operations of the process 600C as illustrated in FIG. 6C and described below is not intended to be limiting.

In 651, the processing device 400 may cause images of a set to be displayed on a loop. The images of the set may be the at least one set of images determined in 530 of process 500.

In 653, the processing device 400 may adjust one or more display parameters for displaying the images of the set. The one or more display parameters may include a frame rate, an image scaling factor, or an image displaying region, a display mode or order (e.g., replay), or the like. For example, the frame rate may be increased if an object is detected in one or more images, and the frame rate may be reduced if no object is detected. As another example, one or more images may be set to be replayed in response to user input. The frame rate for replaying the one or more images may also be adjusted. As a further example, if one or more target images are determined, one or more regions of the one or more target images may be processed under a selected process, for example, zooming, shrinking to a normal size, cropping, enhanced visualization, or the like.

In some embodiments, the images of the set may include images from one or more image sequences. One or more images displayed on a display device may be from a same image sequence or different image sequences. For instance, images sequentially displayed on the display device may be from a same sequence or different sequences.

In 655, the processing device 400 may provide enhanced visualization of one or more images of the set. The image enhanced visualization operation may be performed base on any one of processes 1100, 1300, 1400, 1500, 1600, 1700, 1800, and/or 1900 as illustrated in the present disclosure.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

FIG. 7 illustrates an exemplary tube image according to some embodiments of the present disclosure. The tube image shows a tube marker 710 and a tube marker 720 indicating location information of a tube. The tube marker 710 and the tube marker 720 may be detected based on one or more tube marker characters, such as, the shape, the size, the color, the grey level, or the like. A stent may be detected based on the tube marker 710 and the tube marker 720.

Figure 8A:
FIG. 8A is a schematic diagram illustrating an exemplary interface according to some embodiments of the present disclosure.
Figure 8B:
FIGS. 8B and 8C are schematic diagrams illustrating exemplary interfaces according to some embodiments of the present disclosure.
Figure 8C:

FIG. 8A is a schematic diagram illustrating an exemplary interface according to some embodiments of the present disclosure. The interface 800A may include a stent visualization option 810. A control panel as illustrated in FIGS. 8B and 8C may be activated by, e.g., a click or touch on the stent visualization option 810.

FIGS. 8B and 8C are schematic diagrams illustrating exemplary interfaces according to some embodiments of the present disclosure. The interfaces 800B and 800C may be configured for enabling a user to individually set one or more parameters which relate to an image selection from an image sequence. The interface 800B as illustrated in FIG. 8B may include a slider bar 830, a number indicator 835, a confirmation button 836, and a display region 839. The number indicator 835 may be configured to indicate a count of images in the image sequence. The slider bar 830 may be configured to allow a user to select one or more images included in the image sequence to determine an image set. The image set may be defined based on a starting location (e.g., location 831, location 855) and an ending location (e.g., location 837, location 857). The starting location or ending location may be specified by the user by way of, e.g., a mouse click. In some embodiments, the interfaces 800B and 800C may be displayed on a touch screen and the starting location and/or the ending location may be specified by the user by way of, e.g., a user touch. The confirmation button 836 may be configured to allow the user to confirm an image selection. The display region 839 may be configured to display one or more images in the image sequence for providing information to facilitate the user to determine an image selection.

For example, a first image set may be defined by location 835 and location 837. Based on a user selection, the first image set selected as illustrated in interface 800B may be changed to a second image set as illustrated in interface 800C by moving the starting location of the slider bar indicating the first image of the image set from location 831 to location 855 and moving the ending location of the slider bar indicating the last image of the image set from location 837 to location 857.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, a text box, instead of the slider bar 830, may be used to indicate an image selection. A user may input one or more characters (e.g., 80 to 100) to determine which images to be selected for further processing. As another example, a plurality of images in an image sequence may be classified or clustered into one or more groups, each of the one or more groups being associated with a marker (e.g., a number, an icon, a location in the interface 800A). By selecting the marker, a corresponding group may be selected for further processing. As a further example, a set of images determined through user instructions provided via, e.g., interface 800A and/or 800B may be adjusted (e.g., supplemented) to determine a corresponding set based on, e.g., process 600B as illustrated in FIG. 6B.

Figure 9A:
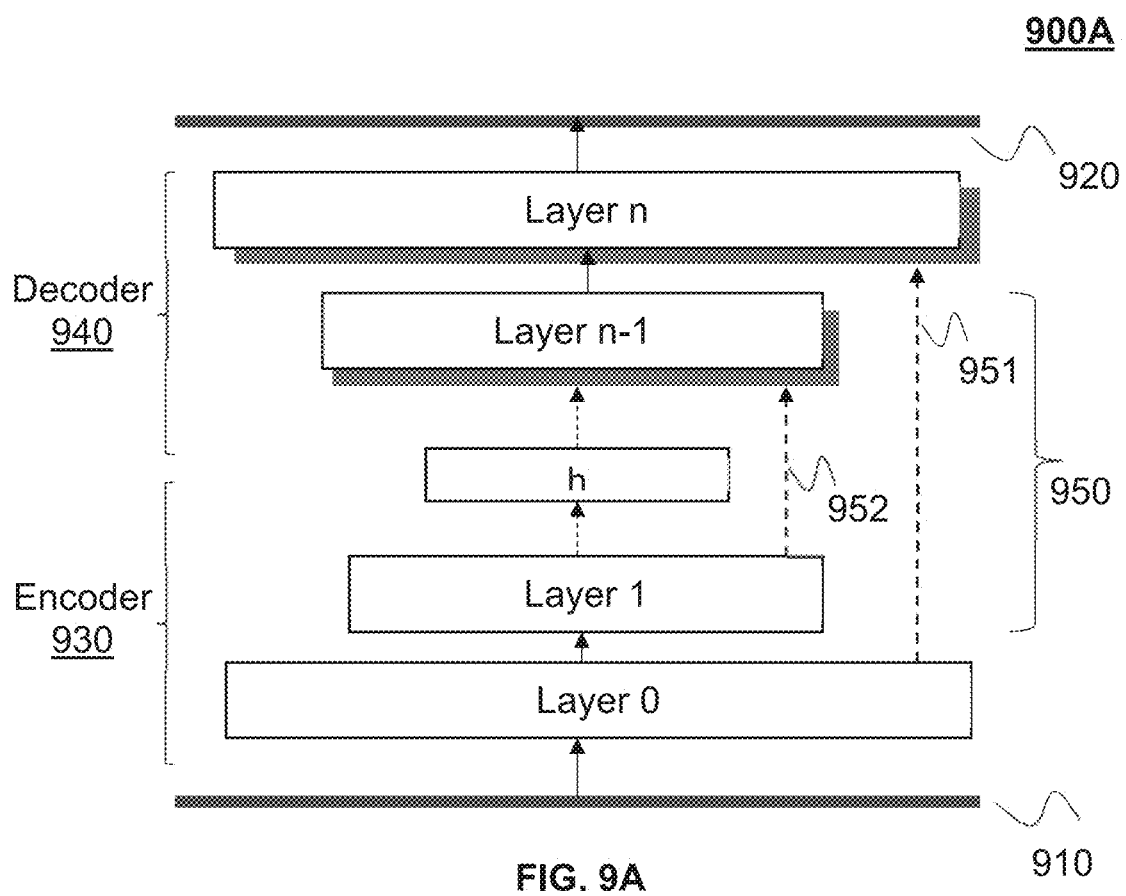
FIG. 9A is a schematic diagram illustrating an exemplary neural network architecture according to some embodiments of the present disclosure.

FIG. 9A is a schematic diagram illustrating an exemplary neural network architecture according to some embodiments of the present disclosure. The neural network architecture 900A may learn segmentation in an end-to-end setting. The neural network architecture 900A may include a decoder 940, an encoder 930, and a plurality of skip connections 950 (e.g., skip connection 951, skip connection 952) between layers (e.g., layer 0, layer 1, layer h, layer n−1, layer n) of the neural network architecture 900A. The neural network architecture 900A may be configured to segment an input image 910 and generate an output image 920. In some embodiments, the neural network architecture 900A may include a U-Net (short for U-shape) architecture. The neural network architecture 900A may be divided into an encoder-decoder path or contracting-expansive path equivalently. The encoder 930 may provide a down-sampling path and the decoder 940 may provide an up-sampling path. The plurality of skip connections 950 used in neural network architecture 900A may directly fast-forward high-resolution feature maps from the encoder 930 to the decoder 940. This may result in a concatenation of semantically dissimilar feature maps. By introducing the plurality of skip connections 950 in the encoder-decoder architecture, fine-grained details may be recovered in the predication.

In some embodiments, a pixel level segmented image may be generated based on the neural network architecture 900A. The segmented image (e.g., a guidewire segmented image), which may be a binary image, may have the same size as an input scan image (e.g., a guidewire image). The neural network architecture 900A may be trained, using a back-propagation algorithm, based on a difference value between a target segmented image and an output image. The down-sampling path of the encoder 930 may extract simple features of the guidewire image (e.g., an edge of a guidewire). The up-sampling path of the decoder 940 may extract complex features of the guidewire image. The decoder 940 may determine an image of the same size as the guidewire image by decoding the complex features. The neural network architecture 900A may extract features of different complexity (i.e., the simple features, the complex features) and perform a feature fusion operation to determine a segmented image.

Figure 9B:
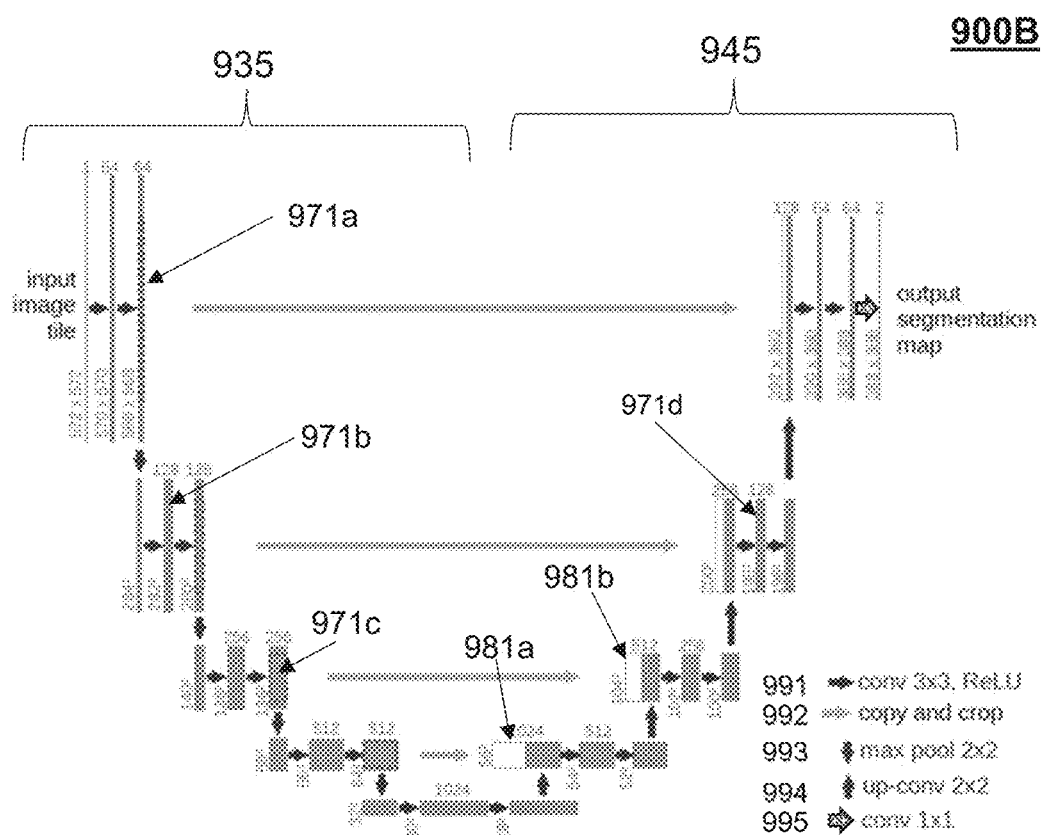
FIG. 9B is a schematic diagram illustrating an exemplary U-Net architecture according to some embodiments of the present disclosure.

FIG. 9B is a schematic diagram illustrating an exemplary U-Net architecture according to some embodiments of the present disclosure. The U-Net architecture 900B may include an encoder 935 and a decoder 945. A lowest resolution of the U-Net architecture 900B may be 32×32 pixels.

As illustrated in FIG. 9B, each gray box (e.g., boxes 971*a*, 971*b*, 971*c*, 971*d*) may correspond to a multi-channel feature map. The number above a gray box may indicate the channel count of the feature channels of the gray box. For example, the channel count of the feature channels of gray box (or feature map) 971*a* may be 64. An x-y-size may be provided at a lower left edge of the gray box. For example, the gray box 971*a* may include a size of 568×568. A blank box (e.g., blank box 981*a*, 981*b*) may represent a copied feature map. Arrows 991, 992, 993, 994, 995 may denote different operations.

The U-Net architecture 900B may include a contracting path (the left side corresponding to 935) and an expansive path (the right side corresponding to 945). The contracting path may follow a typical architecture of a convolutional network. It may include repeated applications of two 3×3 convolutions (unpadded convolutions), each followed by a rectified linear unit (ReLU) and a 2×2 max pooling operation with stride 2 for down-sampling. At each down-sampling step, the U-Net architecture 900B double the channel count of feature channels. Every step in the expansive path may include an up-sampling of the feature map followed by a 2×2 convolution ("up-convolution") that halves the channel count of the feature channels, a concatenation with the correspondingly cropped feature map from the contracting path, and two 3×3 convolutions, each followed by a ReLU. The cropping may be needed due to the loss of border pixels in every convolution. At the final layer, a 1×1 convolution may be used to map each 64-component feature vector to a desired number of classes. In total, the network may have 23 convolutional layers.

FIG. 10 is a flowchart illustrating an exemplary process for training a guidewire segmentation model according to some embodiments of the present disclosure. In some embodiments, the process 1000 may be implemented in the imaging system 100 illustrated in FIG. 1. For example, the process 1000 may be stored in a storage medium (e.g., the storage device 150, or the storage 220 of the processing device 140, the storage 390 of the terminal 130, the memory 360 of the terminal 130) as a form of instructions, and can be invoked and/or executed by the processing device 140 or the terminal 130 (e.g., the processor 210 of the processing device 140, the CPU 340 and/or the GPU 330 of the terminal 130, or one or more modules in the processing device 140 illustrated in FIG. 4). The operations of the illustrated process 1000 presented below are intended to be illustrative. In some embodiments, the process 1000 may be accomplished with one or more additional operations not described, and/or without one or more of the operations discussed. Additionally, the order in which the operations of the process 1000 as illustrated in FIG. 10 and described below is not intended to be limiting.

In 1010, the training module 470 may obtain a preliminary guidewire segmentation model and a set of training samples. A training sample may include a training image pair. The preliminary guidewire segmentation model may include a U-Net architecture as illustrated in FIGS. 9A and/or 9B. A training image pair may include a sample guidewire image and a reference segmented guidewire image. In some embodiments, the set of training samples may include positive training samples (e.g., guidewire image 1200C) and negative training samples. As used herein, a positive training sample refers to a training image pair including a sample image including an object (e.g., a guidewire) and a reference segmented image (e.g., a reference segmented guidewire image). As used herein, a negative training sample refers to a training image pair in which the sample image lacks an object and a reference segmented image is missing. In some embodiments, the set of training samples may satisfy a sample size threshold with respect to at least one of the amount of training image pairs, the amount of positive training samples, or the amount of negative training samples to achieve a desired training performance.

In 1020, the training module 470 may train, using the set of training image pairs, the preliminary guidewire segmentation model by iteratively adjusting at least one parameter of the preliminary guidewire segmentation model based on a guidewire loss function. The guidewire loss function may correspond to one or more structural characters of a guidewire. The one or more structural characters of the guidewire may be determined based on one or more performance characteristics of the guidewire, such as flexibility, torquability, support, malleability, visibility, or the like. In some embodiments, the torquability of the guidewire may allow the guidewire to be pointed in different directions by an operator, to go into side branches, to cross an asymmetric or eccentric lesion, to avoid stent struts, and to go around corners and bends in a coronary artery. The one or more structural characters of the guidewire may include a consistency of the guidewire, a length to width (diameter) ratio. For example, a cross-sectional area of the guidewire may be with a maximum outer diameter in a range of 0.204-1.072 mm and a length of the guidewire may be in a range of 50-300 cm. In some embodiments, the guidewire may include a decreasing cross-sectional area in a direction towards a distal end member.

In some embodiments, the training of the preliminary guidewire segmentation model may use a guidewire loss function including, e.g., a soft Dice loss function component and a collinearity penalty function component. The soft Dice loss function component may be configured to assess a segmenting precision of a segmented guidewire image generated by the preliminary guidewire segmentation model or an intermediately trained guidewire segmentation model. The collinearity penalty function component may be configured to assess segmenting continuity of a segmented guidewire image generated by the preliminary guidewire segmentation model or an intermediately trained guidewire segmentation model. The guidewire loss function may be designed based on the soft Dice loss function component and the collinearity penalty function component, as well as a weight of each of the two components.

In some embodiments, the guidewire loss function may be expressed as equation (1) below:

$$\text{Loss} = \lambda 1 \text{loss}_{dis} + \lambda 2 \text{reg}_{linear}, \quad (1)$$

where Loss represents a value of the guidewire loss function in a current iteration of an iterative training process; $\text{loss}_{dis}$ represents a value of the soft Dice loss function component in the current iteration; $\text{reg}_{linear}$ represents a value of the collinearity penalty function component; and $\lambda 1$ and $\lambda 2$ represent preset weights of the two components, respectively.

In some embodiments, a plurality of pairs of $\lambda 1$ and $\lambda 2$ may be obtained to determine a plurality of guidewire segmentation models. Each of the plurality of guidewire segmentation models may relate to a desired segmentation effect based on a corresponding ($\lambda 1, \lambda 2$) pair. The higher $\lambda 1$, the more precise the segmented guidewire image determined based on the guidewire segmentation model. The higher $\lambda 2$, the more continuous the segmented guidewire image determined based on the guidewire segmentation model.

In some embodiments, the $\text{loss}_{dis}$ expressed as equation (2) may be used as an objective function in a guidewire image segmentation task:

$$\text{loss}_{dis} = \frac{2y \cdot \hat{y}}{2y \cdot \hat{y} + (1+\Phi) \odot (y + \hat{y} - y \cdot \hat{y})}, \quad (2)$$

where y represents a target marked value; $\hat{y}$ represents a predicted value of a neural network; $\Phi$ represents a preset coefficient; "·" represents a product operator generally used between two vectors; and "⊙" represents an exclusive NOR operator.

In some embodiments, the larger a distance between a region and a centerline, the larger the value of the soft Dice loss function component $\text{loss}_{dis}$ corresponding to the region. The region may be any portion of the guidewire image which does not include the guidewire. The region may be of any size, location, or shape. The centerline may be a curve representing the guidewire in the guidewire image. In some embodiments, the distance of a region to the centerline may be determined based on a minimum distance from a point of the region (e.g., a geometrical center point) to all points in the centerline. Based on the soft Dice loss function component $\text{loss}_{dis}$, the guidewire segmentation model's ability to learn or recognize a feature of a region at a specific distance from the centerline may be improved in order to reduce the value of the soft Dice loss function component with respect to the region. The specific distance may include a distance to determine that a region is far from the centerline. That means by employing the $\text{loss}_{dis}$, the ability of the guidewire segmentation model to segment regions which are away from a centerline corresponding the guidewire by a large distance may be improved and a desired precision of segmentation may be achieved. In some embodiments, a distance map 1200D may be employed to show the training effect of the process 1000.

The guidewire loss function may further include a collinearity penalty function component, $\text{reg}_{linear}$. Considering that the guidewire is continuous, when a segmentation result includes a discontinuous curve corresponding to the guidewire, the value of $\text{reg}_{linear}$ may be large which can lead to a correspondingly large value of the guidewire loss function. A value of the collinearity penalty function component may include a sum of differences between a predicted position of a point in the guidewire in a segmented image and one or more points in the point's neighborhood within the segmented image. The predicted position of a point in the guidewire may be the position of the discontinuous curve of the segmentation result. The point's neighborhood in the segmented image may include a region in the segmented image that surrounds the point. The region may be of any size, location, or shape. For example, a 4*4 area (an area including an array of pixels or voxels arranged in a 4 by 4 array) surrounding a point may be used as a neighborhood of the point. As another example, an 8*8 area surrounding a point may be used as a neighborhood of the point. By including the above-mentioned collinearity penalty function component as part of the guidewire loss function, the guidewire segmentation model's ability to learn or recognize a feature corresponding to the discontinuous curve may be enhanced and the continuity of the guidewire in the segmented image so determined may be improved. At the same time, the guidewire in a segmented guidewire image obtained using the guidewire segmentation model may remain as a curve.

In some embodiments, the collinearity penalty function component (e.g., $\text{reg}_{linear}$) may be expressed as equation (3) as below:

$$\text{reg}_{linear}=\Sigma_{x\in y}\Sigma_{s,r\in N(x)}(\alpha\hat{y}(r)+\hat{y}(s))-\beta\hat{y}(x)), \quad (3)$$

where $\alpha$ and $\beta$ are preset weights for adjusting a difference between $\hat{y}(s)$ and $\hat{y}(x)$ and a difference between $\hat{y}(r)$ and $\hat{y}(x)$; x represents a point in the predicted result (a segmented curve representing the guidewire); N(x) represents a set of neighborhood points of x; s and r represent points in the set of N(x); $\hat{y}(r)$ represents a predicted output value of the point r; $\hat{y}(s)$ represents a predicted output value of the point s; and $\hat{y}(x)$ represents a predicted value of the point x.

In some embodiments, the training of the guidewire segmentation model may be based on an optimization algorithm. In some embodiments, the optimization algorithm may include a gradient descent algorithm, a conjugate gradient algorithm, a Lagrange algorithm, a momentum algorithm, a Nesterov accelerated gradient (NAG) algorithm, a simulated annealing (SA) algorithm, or Adam (short for Adaptive Moment Estimation) optimization algorithm, etc.

In some embodiments, the process 1000 may employ an Adam optimization algorithm for updating one or more parameters during the training of the guidewire segmentation model. The Adam optimization algorithm may be an extension to the stochastic gradient descent algorithm. The Adam optimization algorithm may be used to determine adaptive learning rates for each parameter of the one or more parameters of the guidewire segmentation model based on a first moment estimate and a second raw moment estimate. The efficiency of an online application and the convergence rate of training the guidewire segmentation model may be enhanced by applying the Adam optimization algorithm during the process of the model training.

In some embodiments, the Adam optimization algorithm may include operations (a)-(g). In (a), the training module 470 may compute gradients with regard to a stochastic objective based on equation (4) below:

$$g \leftarrow \frac{1}{m}\nabla_\theta \Sigma_i L(f(x^{(i)};\theta), y^{(i)}), \quad (4)$$

where m represents a count of training samples; i represents the $i^{th}$ training sample in a total of m training samples; $x^{(i)}$ represents a predicted segmenting result; $y^{(i)}$ represents a standard sample; and $\theta$ represents an initial value or an intermediate value of a parameter of the guidewire segmentation model.

In (b), the training module 470 may update a biased first moment estimate based on equation (5) below:

$$s \leftarrow \rho_1 s + (1-\rho_1)g, \quad (5)$$

where $\rho_1$ represents a decay rate of the first moment estimate. In some embodiments, a default value of $\rho_1$ may be 0.9. As used herein, the default value may be a value corresponding to a good performance of the Adam optimization algorithm. In some embodiments, the default value may be determined based on user input.

In (c), the training module 470 may update a biased second raw moment estimate based on equation (6) below:

$$r \leftarrow \rho_2 r + (1-\rho_2)g \odot g, \quad (6)$$

where $\rho_2$ represents a decay rate of the second raw moment estimate. In some embodiments, a default value of $\rho_2$ may be 0.999.

In (d), the training module 470 may determine a bias-corrected first moment estimate based on equation (7) below:

$$\hat{s} \leftarrow \frac{s}{1-\rho_1^2}. \quad (7)$$

In (e), the training module 470 may determine a bias-corrected second raw moment estimate based on equation (8) below:

$$\hat{r} \leftarrow \frac{r}{1-\rho_2^2}. \quad (8)$$

In (f), the training module 470 may determine an update in the value of the parameter based on equation (9) below:

$$\Delta\theta = -\epsilon\frac{\hat{s}}{\sqrt{\hat{r}+\delta}}, \quad (9)$$

where $\hat{s}$ represents a bias-corrected first moment estimate, $\hat{r}$ represents a bias-corrected second raw moment estimate, E represents a step size parameter, and $\delta$ represents a constant for numerical stability. In some embodiments, the effective magnitude of the steps taken in the parameter space at each timestep may be approximately bounded by the step size setting $\epsilon$. In some embodiments, a default value of $\epsilon$ may be 0.001. In some embodiments, a default value of $\delta$ may be $10^{-8}$.

In (g), the training module 470 may determine the updated value of the parameter based on equation (10) below:

$$\theta \leftarrow \theta + \Delta\theta. \quad (10)$$

In some embodiments, the sample image of a training sample may be pre-processed before input into the preliminary guidewire segmentation model or an intermediate guidewire segmentation model for model training purposes. For instance, the pre-process module 420 may pre-process the sample image. The pre-process operation may include performing a normalization operation on the guidewire image. A segmentation speed and precision of a segmentation model may be improved by using a pre-processed sample image, instead of an unprocessed sample image, in the training. In some embodiments, exemplary algorithm employed in the pre-process operation may include a non-local means algorithm, a block matching 3D filter algorithm, a Gauss filter algorithm, or the like, or a combination thereof.

In 1030, the training module 470 may determine the guidewire segmentation model by the training process. The training process may terminate when a termination condition is satisfied. In some embodiments, the termination condition may relate to the guidewire loss function. For instance, the termination condition may include that the value of the guidewire loss function is below a threshold, that the change in the value of the guidewire loss function over a certain count of iterations of the training process is below a threshold, or the like, or a combination thereof. The guidewire segmentation model may be used in the process 1100 for segmenting a guidewire image.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the set of training images may be pre-processed before provided to the guidewire segmentation model. As another example, a data augmentation operation may be employed when only few training samples are available.

Figure 11:
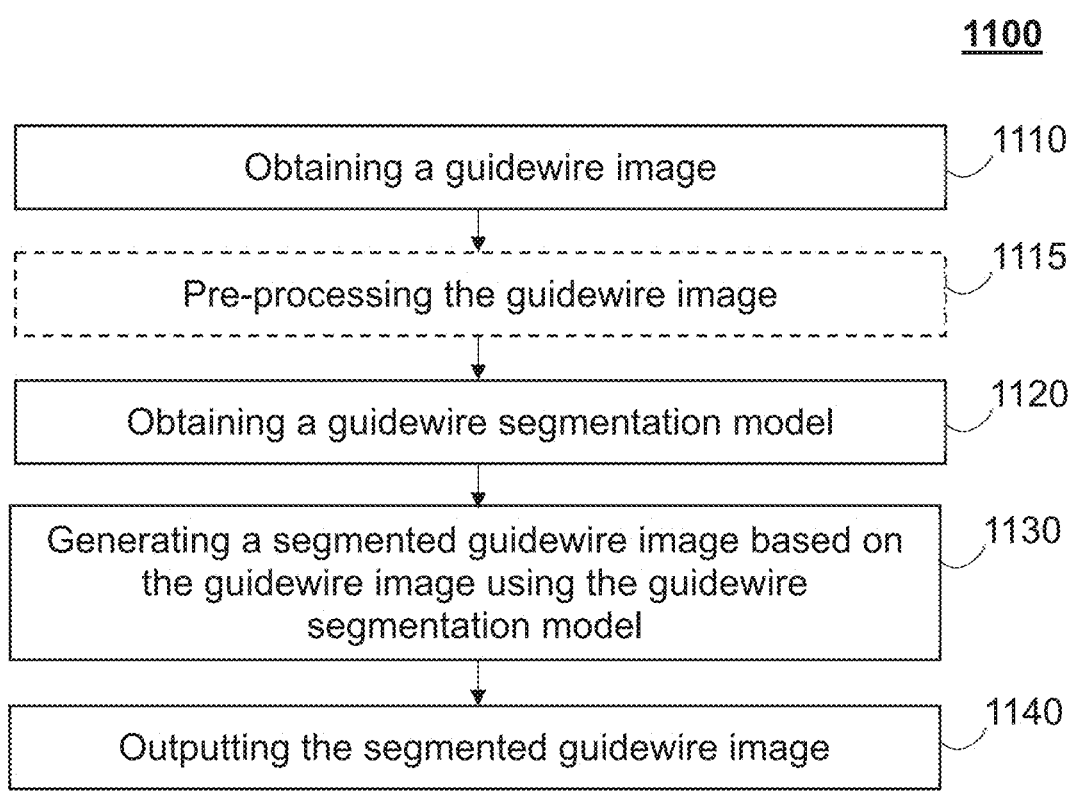
FIG. 11 is a flowchart illustrating an exemplary process for determining a segmented guidewire image according to some embodiments of the present disclosure.

FIG. 11 is a flowchart illustrating an exemplary process for determining a segmented guidewire image according to some embodiments of the present disclosure. In some embodiments, the process 1100 may be implemented in the imaging system 100 illustrated in FIG. 1. For example, the process 1100 may be stored in a storage medium (e.g., the storage device 150, or the storage 220 of the processing device 140, the storage 390 of the terminal 130, the memory 360 of the terminal 130) as a form of instructions, and can be invoked and/or executed by the processing device 140 or the terminal 130 (e.g., the processor 210 of the processing device 140, the CPU 340 and/or the GPU 330 of the terminal 130, or one or more modules in the processing device 140 illustrated in FIG. 4). The operations of the illustrated process 1100 presented below are intended to be illustrative. In some embodiments, the process 1100 may be accomplished with one or more additional operations not described, and/or without one or more of the operations discussed. Additionally, the order in which the operations of the process 1100 as illustrated in FIG. 11 and described below is not intended to be limiting.

In 1110, the obtaining module 410 may obtain a guidewire image. In some embodiments, the guidewire image may be obtained based on process 500. For example, the guidewire image may be an image obtained from an image set. In some embodiments, process 1000 may be configured to process guidewire image one-by-one in a sequence. In such a situation, by displaying the processed image generated by process 1000 one-by-one, a guidewire may be tracked.

In 1115, the pre-process module 420 may pre-process the guidewire image. The pre-process operation may include performing a normalization operation on the guidewire image. In some embodiments, an algorithm employed in the pre-process operation may include a non-local means algorithm, a block matching 3D filter algorithm, or a Gauss filter algorithm.

In some embodiments, an image evaluation operation may be performed following the pre-process operation in 1115. In the image evaluation operation, an image quality indicating a noise ratio of the pre-processed image may be assessed. The image evaluation operation may employ a structural similarity (SSIM) algorithm, a peak signal-to noise ratio (PSNR) algorithm, a mean squared error (MSE) algorithm, or the like. The pre-process module 420 may further compare the image quality value for each pre-processed image with a threshold. If the image quality value corresponding to a pre-processed image is higher than the threshold, the pre-processed image may be used as an input image of the guidewire segmentation model. If the image quality value corresponding to a pre-processed image is below the threshold, the pre-processed image may further be processed to reduce noise. Based on such a filtering mechanism, only images with an image quality (assessed in term of, e.g., a noise level) exceeding the threshold can be used as input images of the guidewire segmentation model and the precision of the output images of the guidewire segmentation model may be improved.

In some embodiments, the noise reduction operation performed in 1115 may include performing a normalization operation on a guidewire image. The normalization may be configured to reduce an influence on contrast caused by overexposure, an influence on sharpness caused by low image quality, and/or high noise, or the like. In some embodiments, the normalization operation may determine a standard normal distribution image based on the guidewire image. For example, the normalization operation may include subtracting a mean pixel value from each pixel value in the guidewire image and further dividing the subtracted result by a standard deviation of the pixel (or voxel) values in the guidewire image. The mean pixel value may be an average of all pixels in the guidewire image.

In 1120, the obtaining module 410 may obtain a trained guidewire segmentation model (or referred to as a guidewire segmentation model for brevity). The guidewire segmentation model may be a U-Net architecture model. The guidewire segmentation model may be trained based on the process 1000 as illustrated on FIG. 10.

In some embodiments, the imaging system 100 may include a guidewire segmentation model for guidewire segmentation. In some embodiments, the imaging system 100 may include more than one guidewire segmentation model with different ($\lambda 1$, $\lambda 2$) pairs as illustrated in FIG. 10. A specific guidewire segmentation model may be selected from the more than one trained guidewire segmentation models based on a desired segmentation effect. In some embodiments, in order to get a more precise segmentation guidewire image, a ($\lambda 1$, $\lambda 2$) pair with a high $\lambda 1$ may be selected. For example, the ($\lambda 1$, $\lambda 2$) pair may be (0.7, 0.3). In some embodiments, in order to get a segmentation guidewire image with more collinearity, a ($\lambda 1$, $\lambda 2$) pair with a high $\lambda 2$ may be selected. For example, the ($\lambda 1$, $\lambda 2$) pair may be (0.4, 0.6).

In 1130, the segmentation module 450 may generate a segmented guidewire image based on the guidewire image using the guidewire segmentation model.

In 1140, the segmentation module 450 may output the segmented guidewire image. In some embodiments, the segmented guidewire image may be outputted to the terminal 130 for display. In some embodiments, the segmented guidewire image may be outputted to a storage medium (e.g., the storage device 150, or the storage 220 of the processing device 140, the storage 390 of the terminal 130, the memory 360 of the terminal 130) for storage.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, 1115 may be skipped, which means the guidewire image may be transmitted to the trained guidewire segmentation model for further processing. However, the legal protection scope will be defined by the description of claims.

Figure 12A:
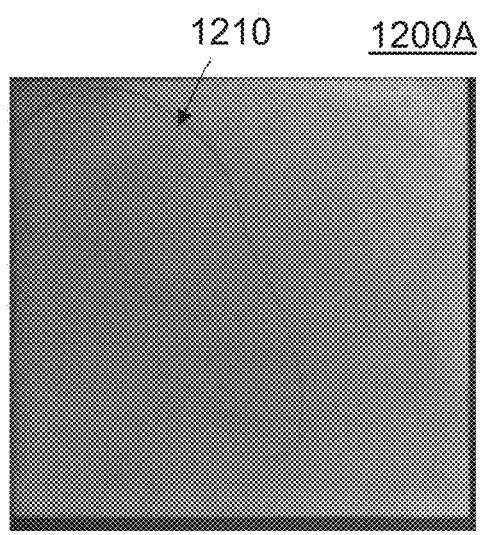
FIG. 12A illustrates an exemplary guidewire image according to some embodiments of the present disclosure.
Figure 12B:
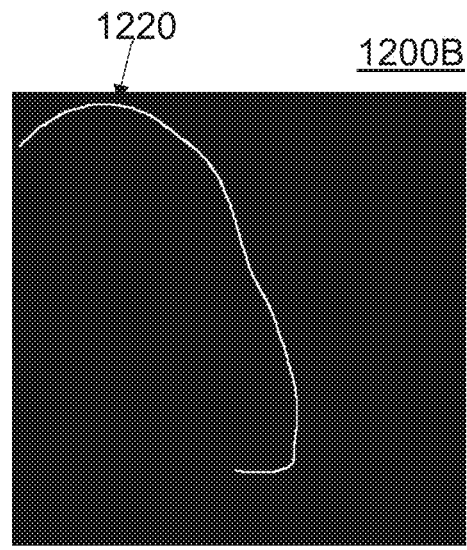
FIG. 12B illustrates an exemplary segmented guidewire image according to some embodiments of the present disclosure.

FIG. 12A illustrates an exemplary guidewire image according to some embodiments of the present disclosure. FIG. 12B illustrates an exemplary segmented guidewire image according to some embodiments of the present disclosure. The guidewire 1210 of guidewire image 1200A as illustrated in FIG. 12A may be segmented to determine the segmentation guidewire image 1200B including a curve 1220 as illustrated in FIG. 12B for indicating the guidewire 1210.

In some embodiments, the guidewire image 1200A may be used as an input image of the trained guidewire segmentation model of process 1100. The segmentation guidewire image 1200B may be an output image of the trained guidewire segmentation model of process 1100.

Figure 12C:
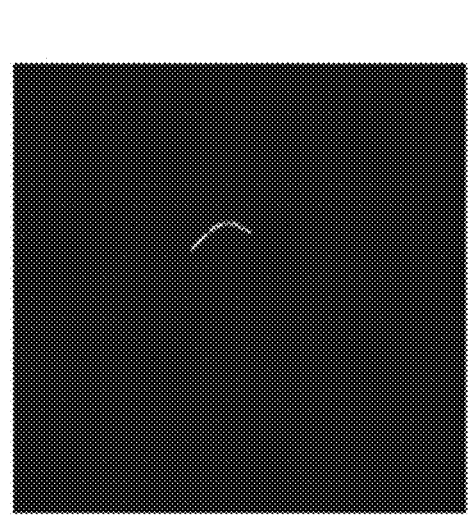
FIG. 12C illustrates an exemplary guidewire image according to some embodiments of the present disclosure.

FIG. 12C illustrates an exemplary guidewire image according to some embodiments of the present disclosure. The guidewire image 1200C may be configured to train a guidewire segmentation model. For training the guidewire segmentation model the guidewire image 1200C may be used as a mask. The mask may be configured to localize the most important aspects of an input image (e.g., the guidewire in the guidewire image 1200C) for prediction of an original network.

Figure 12D:
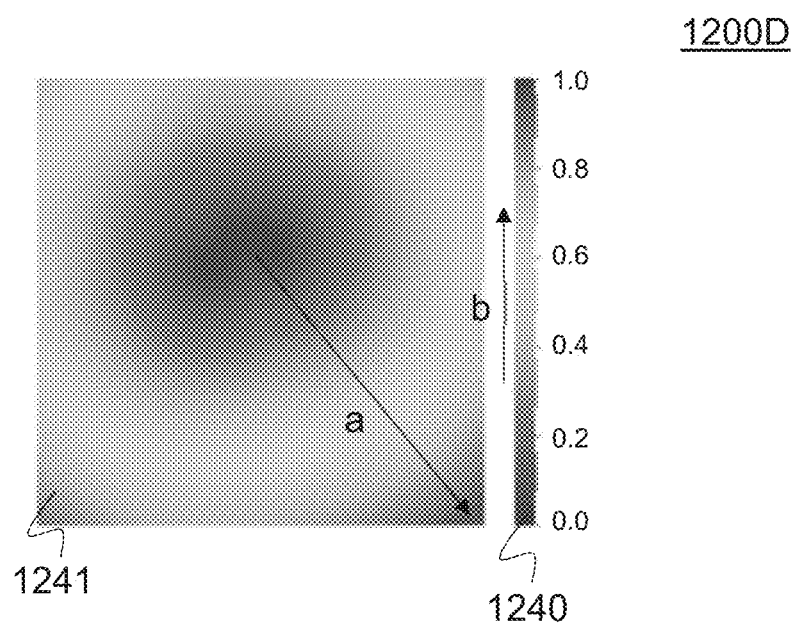
FIG. 12D is a schematic diagram illustrating an exemplary distance map according to some embodiments of the present disclosure.

FIG. 12D is a schematic diagram illustrating an exemplary distance map according to some embodiments of the present disclosure. The distance map 1200D may be configured to provide reference information for model training (e.g., a guidewire image segmentation model training as showing in FIG. 10). In some embodiments, the distance map 1200D may be an image of different colors. The distance map 1200D as illustrated in FIG. 12D is a grayscale image based on an original color image including colors ranging from purple-blue to red. The distance map 1200D may include a first block 1241 and a second blocking 1240. The first block 1240 may include a color scale ranging from purple-blue to red, along a direction b, corresponding to a numerical scale of 0 to 1 with an increment of 0.2. Each of the different colors may be marked with a different value (corresponding to the numeral scale of the 1240) for distinguishing the different colors. The second block 1240 may be configured to show the different values associated with the different colors. Each of the different colors may indicate a distance of a region to a centerline of a guidewire. The smaller a numeral value of an element (e.g., a pixel, a voxel) in the distance map, the closer a point (in the physical world) that corresponds to the element in the distance map to the centerline of the guidewire. For instance, from a center of 1241 toward the boundary of 1241 along the direction a, the values of the elements increase as illustrated in FIG. 12D, indicating that the guidewire is located in a center region of FIG. 12D.

Figure 13:
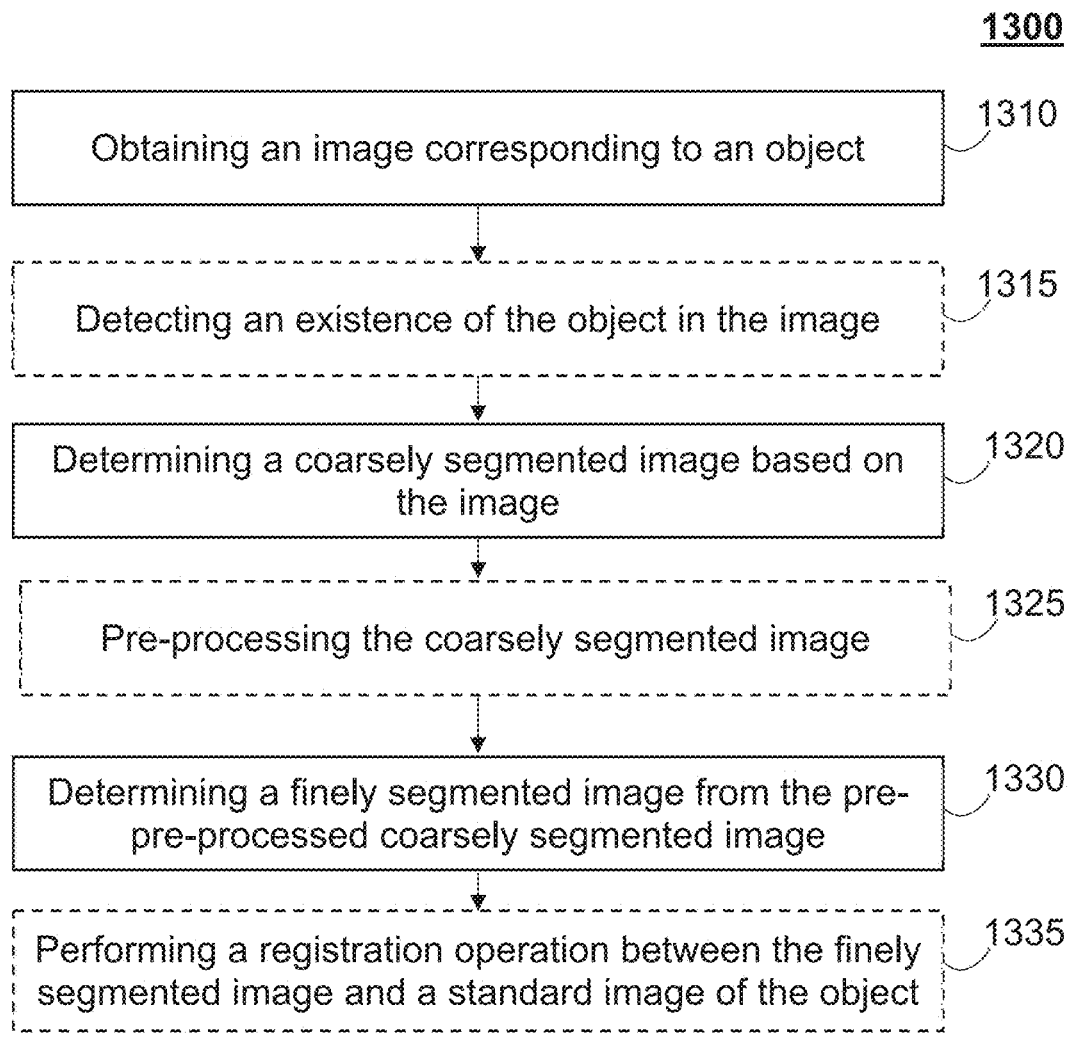
FIG. 13 is a flowchart illustrating an exemplary process for processing an image corresponding to an object according to some embodiments of the present disclosure.

FIG. 13 is a flowchart illustrating an exemplary process for processing an image corresponding to an object according to some embodiments of the present disclosure. In some embodiments, the process 1300 may be implemented in the imaging system 100 illustrated in FIG. 1. For example, the process 1300 may be stored in a storage medium (e.g., the storage device 150, or the storage 220 of the processing device 140, the storage 390 of the terminal 130, the memory 360 of the terminal 130) as a form of instructions, and can be invoked and/or executed by the processing device 140 or the terminal 130 (e.g., the processor 210 of the processing device 140, the CPU 340 and/or the GPU 330 of the terminal 130, or one or more modules in the processing device 140 illustrated in FIG. 4). The operations of the illustrated process 1300 presented below are intended to be illustrative. In some embodiments, the process 1300 may be accomplished with one or more additional operations not described, and/or without one or more of the operations discussed. Additionally, the order in which the operations of the process 1300 as illustrated in FIG. 13 and described below is not intended to be limiting. In some embodiments, operation 1320 of the process 1300 may be performed based on the process 1400. In some embodiments, operation 1330 of the process 1300 may be performed based on the process 1500.

In 1310, the obtaining module 410 may obtain an image corresponding to an object. The object may be an implantable or interventional device. In some embodiments, the object may include a guidewire, a balloon, a stent, or the like. The image may include one or more objects. In some embodiments, the image may include a guidewire, a balloon, a stent, or the like, or any combination thereof.

For illustration purposes, the image may be an original stent image generated by the imaging device 110. A stent may only occupy a small percentage of the original stent image. For example, a 100×100 area in a 1024×1024 image. In order to improve stent visualization, the image may be zoomed in with respect to the region of interest or other parts of the image may need to be masked.

In 1315, the detection module 440 may detect an existence of the object in the image.

In some embodiments, an existence of a stent in the image may be determined. For example, the existence of the stent may be determined based on a feature descriptor of the stent. As another example, the existence of the stent may be determined based on a stent detection neural network (e.g., a DetNet architecture neural network as illustrated in process 1400), and location information may also be determined associated with the existence of the stent.

In 1320, the segmentation module 450 may determine a coarsely segmented image based on the image. The coarsely segmented image may include the object (e.g., a stent) to be segmented located within a portion of the image. That is to say, the coarsely segmented image may be a portion of the image of the object. For example, the coarsely segmented image may be a region of the image including the object. In some embodiments, the coarsely image segmentation may be performed based on location information of the object.

In some embodiments, the location information of the object may be determined based on a marker corresponding to the object. For example, location information of the stent may be determined based on one or more markers as illustrated in process 1600.

In some embodiments, the location information of the object may be determined based on a neural network. For example, location information of the stent may be determined based on a trained object detection model as illustrated in process 1400. As another example, a coarsely segmented image may be output by applying an image to a trained end-to-end network model.

In some embodiments, an area ratio threshold of an object in an image may be employed in determining the coarsely segmented image based on the image. As used herein an area ratio of an object in an image may be determined based on an area occupied by the object in the image to an area of the image. For example, in order to satisfy an area ratio threshold (e.g., a relatively high threshold of 80%), preliminary determined location information may be adjusted (e.g., narrow the preliminary determined location information). For another example, if an image satisfy the area ratio threshold before being segmented in 1320, then the image may be labeled as the coarsely segmented image without segmenting.

In 1325, the pre-process module 420 may pre-process the coarsely segmented image. The pre-processing the coarsely segmented image may include one or more operations of noise reduction, image restoration, image compression, image enhancement, image normalization, or the like.

In 1330, the segmentation module 450 may determine a finely segmented image from the pre-processed coarsely segmented image. The finely segmented image may be an image determined based on a contour of the object. The finely segmented image may be determined based on a threshold-based segmentation algorithm, a region-based segmentation algorithm, an edge-based segmentation algorithm, a model-based segmentation algorithm, or the like, or any combination thereof.

By segmenting the finely segmented image from the pre-processed coarsely segmented image (or the coarsely segmented image), a more precise segmentation may be achieved. For example, an enhanced segmentation and visualization of a stent may be achieved by segmenting the stent from a finely segmented stent image which in turn is determined in a coarsely segmented stent image. In some embodiments, if a first ratio equals the area occupied by the stent in the finely segmented stent image to the area of the finely segmented stent image, and a second ratio equals the area occupied by the stent to the area of the coarsely segmented stent image, the first ratio may be larger than the second ratio.

In some embodiments, the finely segmented image may be determined based on a trained neural network. For example, the trained neural network may include a trained stent segmentation model (or referred to as a stent segmentation model for brevity) as illustrated in process 1500.

In 1335, the registration module 460 may perform a registration operation between the finely segmented image and a standard image of the object. In some embodiments, the standard image of the object may include a standard stent image. In some embodiments, the standard image may be an image in an image sequence (e.g., the first image in the image sequence). The registration operation may include performing image matching and superimposing the finely segmented image and the standard image of the object.

In some embodiments, the registration operation may include the following operations: a) extracting a first group of feature points corresponding a stent in the finely segmented image, and extracting a second group of feature points corresponding the stent in the standard image; b) determining feature point pairs based on a similarity degree between the first group of feature points and the second group of feature points; c) determining image space coordinate transformation parameters based on the determined feature point pairs; d) superimposing the finely segmented image and the standard image based on the image space coordinate transformation parameters.

In a), the registration module 460 may extract a first group of feature points corresponding to the stent in the finely segmented image.

In some embodiments, each point of the first group of feature points may be described as a first feature vector; and each point of the second group of feature points may be described as a second feature vector. A first feature vector may be a set of descriptors corresponding to a feature point in the finely segmented image. A second feature vector may be a set of descriptors corresponding to a feature point in the standard image. The descriptors may include one or more parameters corresponding to the feature point. The one or more parameters of the feature point may include the shape, the size, the gray value, the boundary, a distance between the feature point and a reference point, or the like, of the feature point.

In some embodiments, the first group of feature points and/or the second group of feature points may be determined based on a feature point detecting algorithm. Exemplary feature point detecting algorithms may include a Speeded-Up Robust Features (SURF) algorithm, a Scale-invariant feature transform (SIFT) algorithm, or the like.

In b), the registration module 460 may determine feature point pairs based on similarity degrees between the first group of feature points and the second group of feature points.

In some embodiments, the similarity degree between a feature point of the first group and a feature point of the second group may be determined based on a similarity degree between the descriptors of the first feature vector of the feature point of the first group and the descriptors of the second feature vector of the feature point of the second group. Exemplary parameters for indicating the similarity degree between the respective descriptors of two feature vectors of the feature points one from each of the first group and the second group may include the Minkowski distance, the Euclidean distance, the Manhattan distance, the Pearson correlation coefficient, or the like.

In some embodiments, the registration module 460 may determine feature point pairs based on the similarity degrees and other reference information. For example, the registration module 460 may determine a first variance of descriptors of the first feature vector and a second variance of descriptors of the second feature vector. In response to a determination that the similarity degree between descriptors of two feature vectors and an average value of the variances (e.g., the first variance and the second variance) satisfy respective preset thresholds, feature points corresponding to the first feature vector and the second vector may be designated as a feature point pair.

In c), the registration module 460 may determine image space coordinate transformation parameters based on the determined feature point pairs.

In some embodiments, the image space coordinate transformation parameters may be used to specify a transformation relationship between the finely segmented image and the standard image. The transformation relationship may include rotation, shift, scale, shear, or the like, or any combination thereof. For example, the transformation relationship may include a combination of scale and shear. As another example, the transformation relationship may include a combination of shift and scale. As a further example, the transformation relationship may include a combination of rotation, shift, and scale. Registration between the finely segmented image and the standard image may be achieved by way of a transformation of the finely segmented image based on the transformation relationship. In some embodiments, an affine transformation model for registration is based on the transformation relationship.

In d) the registration module 460 may superimpose the finely segmented image and the standard image based on the image space coordinate transformation parameters.

In some embodiments, a series of finely segmented images of a stent may be obtained, such as $\{I_1, I_2, I_3, I_4, \ldots, I_n\}$. In some embodiments, the series of finely segmented images of the stent may be acquired at a sequence of different time points. In some embodiments, the series of finely segmented images of the stent may be acquired at the same time point. Image $I_1$ may be designated as the standard image of the stent. A registration operation may be performed between Image $I_1$ and image $I_2$ to determine an enhanced stent image $I_{e2}$. A registration operation may be performed between Image $I_1$ and image $I_3$ to determine an enhanced stent image $I_{e3}$. One by one, an enhanced stent image $I_{en}$ may be determined. In some embodiments, the enhanced stent images $\{I_{e1}, I_{e3}, \ldots, I_{en}\}$ may be displayed in sequence to track a movement of the stent. In some embodiments, the enhanced stent image may be displayed in multiple interfaces for multidimensional visualization. In some embodiments, one or more of the enhanced stent images $\{I_{e1}, I_{e3}, \ldots, I_{en}\}$ may be further superimposed with each other to determine a further enhanced stent image. For instance, the stent in a patient undergoes a cyclic motion along with a physiological motion, e.g., cardiac motion, respiratory motion; multiple enhanced stent images acquired in different motion cycles but corresponding to a same motion phase may be superimposed to provide a further enhanced stent image. For another example, multiple enhanced stent images acquired by two imaging devices of the same stent at the same time point, or multiple enhanced stent images reconstructed by different algorithms may be superimposed to provide a further enhanced stent image.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, 1315 may be skipped, which means the image corresponding to the object may be transmitted to the segmentation module 450 for coarsely segmenting. As another example, 1325 may be skipped, which means the coarsely segmented image may be transmitted to the segmentation module 450 for finely segmenting. The finely segmented image may be determined based on the coarsely segmented image. As a further example, 1335 may be omitted and another operation may be applied to the finely segmented image.

Figure 14:
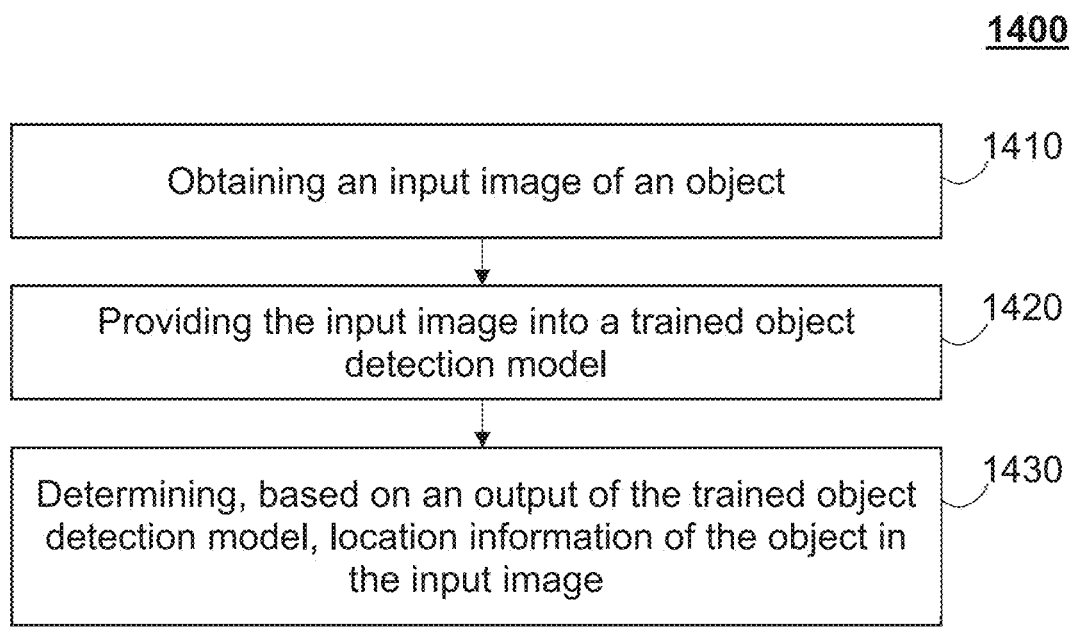
FIG. 14 is a flowchart illustrating an exemplary process for determining location information of an object in an image according to some embodiments of the present disclosure.

FIG. 14 is a flowchart illustrating an exemplary process for determining location information of an object in an image according to some embodiments of the present disclosure. In some embodiments, the process 1400 may be implemented in the imaging system 100 illustrated in FIG. 1. For example, the process 1400 may be stored in a storage medium (e.g., the storage device 150, or the storage 220 of the processing device 140, the storage 390 of the terminal 130, the memory 360 of the terminal 130) as a form of instructions, and can be invoked and/or executed by the processing device 140 or the terminal 130 (e.g., the processor 210 of the processing device 140, the CPU 340 and/or the GPU 330 of the terminal 130, or one or more modules in the processing device 140 illustrated in FIG. 4). The operations of the illustrated process 1400 presented below are intended to be illustrative. In some embodiments, the process 1400 may be accomplished with one or more additional operations not described, and/or without one or more of the operations discussed. Additionally, the order in which the operations of the process 1400 as illustrated in FIG. 14 and described below is not intended to be limiting.

In 1410, the obtaining module 410 may obtain an input image of an object. In some embodiments, the object may be a stent. In some embodiments, the input image may include a stent image.

In 1420, the detection module 440 may provide the input image into a trained object detection model. In some embodiments, the trained object detection model may include a DetNet architecture.

In 1430, the detection module 440 may determine, based on an output of the trained object detection model, location information of the object in the input image. For example, a DetNet model may be employed to output a reference point of origin, a length value, and a width value corresponding to the stent. Based on the reference point of origin, the length value, and the width value of the stent, a region of the stent in the image may be determined. In some embodiments, the length value and/or the width value may be determined based on the actual size of the stent, with or without an adjustment. For instance, the length value and/or the width value may be determined by adjusting (e.g., adding a present value to) the actual size of the stent. The adjustment may be made based on a margin of error.

It should be noted that the above description is merely provided for the purposes of illustration, and not intended to limit the scope of the present disclosure. For persons having ordinary skills in the art, multiple variations and modifications may be made under the teachings of the present disclosure.

Figure 15:
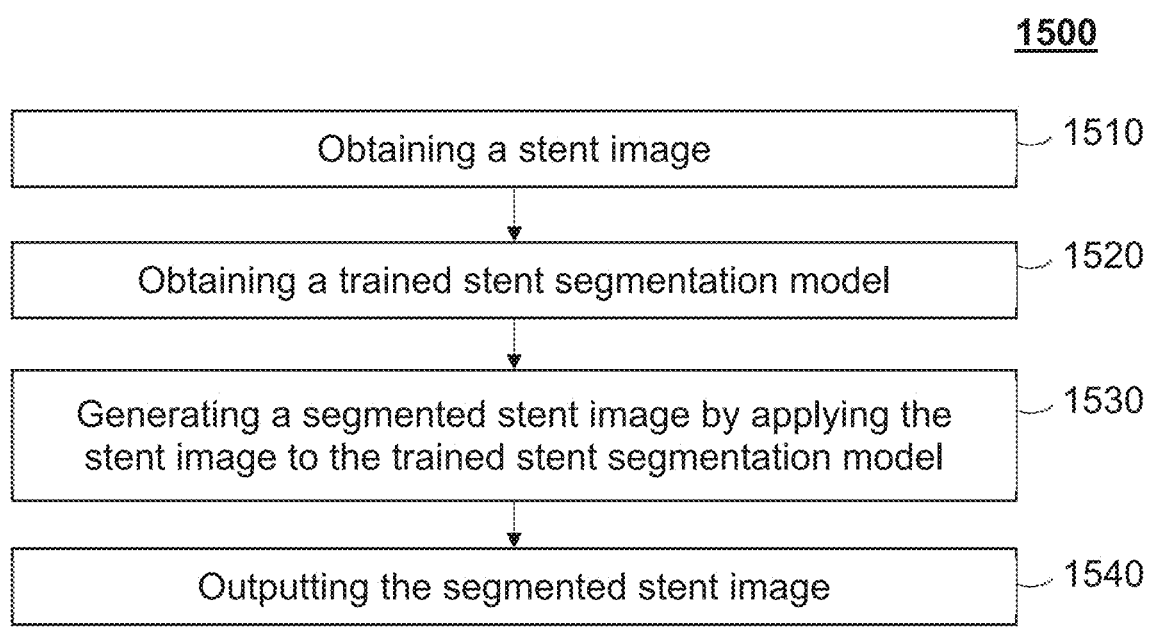
FIG. 15 is a flowchart illustrating an exemplary process for segmenting a stent image according to some embodiments of the present disclosure.

FIG. 15 is a flowchart illustrating an exemplary process for segmenting a stent image according to some embodiments of the present disclosure. In some embodiments, the process 1500 may be implemented in the imaging system 100 illustrated in FIG. 1. For example, the process 1500 may be stored in a storage medium (e.g., the storage device 150, or the storage 220 of the processing device 140, the storage 390 of the terminal 130, the memory 360 of the terminal 130) as a form of instructions, and can be invoked and/or executed by the processing device 140 or the terminal 130 (e.g., the processor 210 of the processing device 140, the CPU 340 and/or the GPU 330 of the terminal 130, or one or more modules in the processing device 140 illustrated in FIG. 4). The operations of the illustrated process 1500 presented below are intended to be illustrative. In some embodiments, the process 1500 may be accomplished with one or more additional operations not described, and/or without one or more of the operations discussed. Additionally, the order in which the operations of the process 1500 as illustrated in FIG. 15 and described below is not intended to be limiting.

In 1510, the obtaining module 410 may obtain a stent image. An area ratio of an area occupied by a stent included in the stent image to an area of the stent image may be larger than an area ratio threshold. As used herein, the area occupied by the stent included in the stent image may be the area of a rectangle of a minimum size that encloses the stent in the stent image. For instance, a rectangle of a minimum size that encloses the stent in the stent image may be determined such that each of at least one edge of the four edges of the rectangle intersects with at least one point of the stent (as segmented from the stent image) in the stent image. As another example, each of at least two perpendicular edges of the rectangle intersects with at least one point of the stent (as segmented from the stent image) in the stent image. The area ratio threshold may be applied in the coarse segmentation as described in 1320 such that a coarsely segmented image determined in the coarse segmentation satisfies the area ratio threshold. The area ratio threshold may be any one of 10%, 20%, 30%, 40%, 50%, 60%, 70%, 80%, or the like. By applying the area ratio threshold for obtaining the stent image, the segmentation speed and/or precision of the stent image may be improved.

In some embodiments, the stent image may be a coarsely segmented image determined in 1320 of process 1300 as illustrated in FIG. 13. In some embodiments, the stent image may be a pre-processed coarsely segmented image determined in 1325 of process 1300 as illustrated in FIG. 13. The pre-processed coarsely segmented image may be determined based on a normalization operation performed on the coarsely segmented image. Merely by way of example, by performing the normalization operation, pixel (or voxel) values in the pre-processed coarsely segmented image may satisfy a normal distribution. The normalization operation may include determining a mean pixel (or voxel) value of all pixels (or voxel) in the coarsely segmented image; subtracting the mean pixel (or voxel) value from each pixel (or voxel) value in the coarsely segmented image; and dividing the subtracted result by a standard deviation of the pixel (or voxel) values in the coarsely segmented image. By applying the normalization operation, a sharpness difference and a contrast difference between different coarsely segmented images may be reduced. By applying the normalization operation, segmentation speed and/or precision in further processing, e.g., further processing using a neural network (e.g., in 1330 of process 1300), may be improved.

In 1520, the obtaining module 410 may obtain a trained stent segmentation model (or referred to as a stent segmentation model for brevity). The trained stent segmentation model may be configured to segment the stent from the stent image.

In some embodiments, the trained stent segmentation model may be trained offline in an iteration process based on an initial stent segmentation model, a plurality of training samples, a loss function, and an optimization algorithm. One or more parameters of the initial stent segmentation model may be iteratively adjusted to determine the trained stent segmentation model.

In some embodiments, a training sample may include a sample image and a corresponding labeled sample image, both including a representation of a sample object (e.g., a stent). In some embodiments, the sample image of the training sample may include a coarsely segmented image. In some embodiments, the sample image (e.g., a sample coarsely segmented image) may be pre-processed before being input into the initial or an intermediate stent segmentation model. As used herein, in the context of model training, an intermediate model, or referred to as an intermediately trained model, refers to a model generated during the training process that is partially trained. Exemplary pre-processing operations may include mean filtering, median filtering, Gaussian filtering, or the like. The labeled sample image of the training sample may include a finely segmented image of the sample object. For instance, the labeled sample image may be obtained by performing a fine segmentation on the sample image.

A loss coefficient determined by the loss function may be configured to assess the similarity degree between a predicted segmented image determined based on the initial or an intermediate stent segmentation model using the sample image of a training sample as an input and a corresponding labeled sample image of the training sample. The higher the similarity degree, the lower the loss coefficient, indicating that the stent segmentation model is closer to be sufficiently trained. The lower the similarity degree, the higher the loss coefficient, indicating that the stent segmentation model is yet to be sufficiently trained. In some embodiments, the loss coefficient may be determined under a weighting operation (e.g., performing element-wise multiply between prediction and target) in the training of the stent segmentation model. Under the weighting operation, the stent segmentation model may learn features corresponding to a boundary of the stent and the segmentation sensitivity of the stent segmentation model may be improved. The above-mentioned operations for training may also be referred to as a distance-based training mechanism.

In some embodiments, the distance-based mechanism may include: a) for each point (e.g., a pixel, a voxel) included in a predicted segmented stent image (i.e., the output image of the initial or an intermediate stent segmentation model based on a sample image of a training sample as the input to the initial or intermediate stent segmentation model), determining a minimum distance from one or more distances between the each point and one or more marked points in the labeled sample image of the training sample; b) determining a loss weight based on the minimum distance value of the each point of the segmented stent image; c) for each point of the segmented stent image, determining a loss coefficient based on the loss function to assess the similarity degree between the predicted segmented image and the corresponding labeled sample image of the training sample at the each point; and d) performing a weighting operation based on the loss weight for the each point and the loss coefficient of the each point of the predicted segmented stent image. In some embodiments, the one or more marked points in the labeled sample image of the training sample may be a central point of a region occupied by a stent in the sample image of the training sample. In some embodiments, the one or more marked points in the labeled sample image of the training sample may be one or more points determined to be in a contour of the stent in the labeled sample image. In some embodiments, the loss function may include a Dice coefficient.

The distance-based training mechanism may improve the segmentation precision of the stent segmentation model. An edge point of a predicted segmented stent image may have a relatively long distance from the one or more marked points. As used herein, an edge region of an image represents a portion of the image not close to the central point of the image. An edge point of an image represents a point in the edge region of the image. A loss weight of the edge point may be relatively high. Then a loss value of the predicted segmented stent image determined based on the loss weights and the loss coefficients of points in the predicted segmented stent image under the weighting operation may be relatively high. To reduce the loss value of the predicted segmented stent image, the stent segmentation model may enhance the learning of features of the edge region of an image, and the segmentation precision of the stent segmentation model so trained may be improved.

Exemplary optimization algorithms may include a gradient descent algorithm, a Newton algorithm, a Quasi-Newton Method (QNM), a conjugate gradient algorithm, an Adam optimization algorithm, or the like, or any combination thereof.

In some embodiments, the stent segmentation model may be a U-Net model as illustrated in FIG. 9A and/or FIG. 9B. The training of the stent segmentation model may be based on the Adam optimization algorithm. More details regarding the Adam optimization algorithm and its application in the model training may be found elsewhere in the present disclosure. See, e.g., the description in connection with operation 1020 in FIG. 10.

In 1530, the segmentation module 450 may generate a segmented stent image by applying the stent image to the trained stent segmentation model.

In 1540, the segmentation module 450 may output the segmented stent image. In some embodiments, the segmented stent image may be outputted to the terminal 130 for display. In some embodiments, the segmented stent image may be outputted to a storage medium (e.g., the storage device 150, or the storage 220 of the processing device 140, the storage 390 of the terminal 130, the memory 360 of the terminal 130) for storage.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, an image pro-process operation may be performed before 1530, which means a pro-processed stent image may be transmitted to the segmentation module 450 for further processing.

Figure 16:
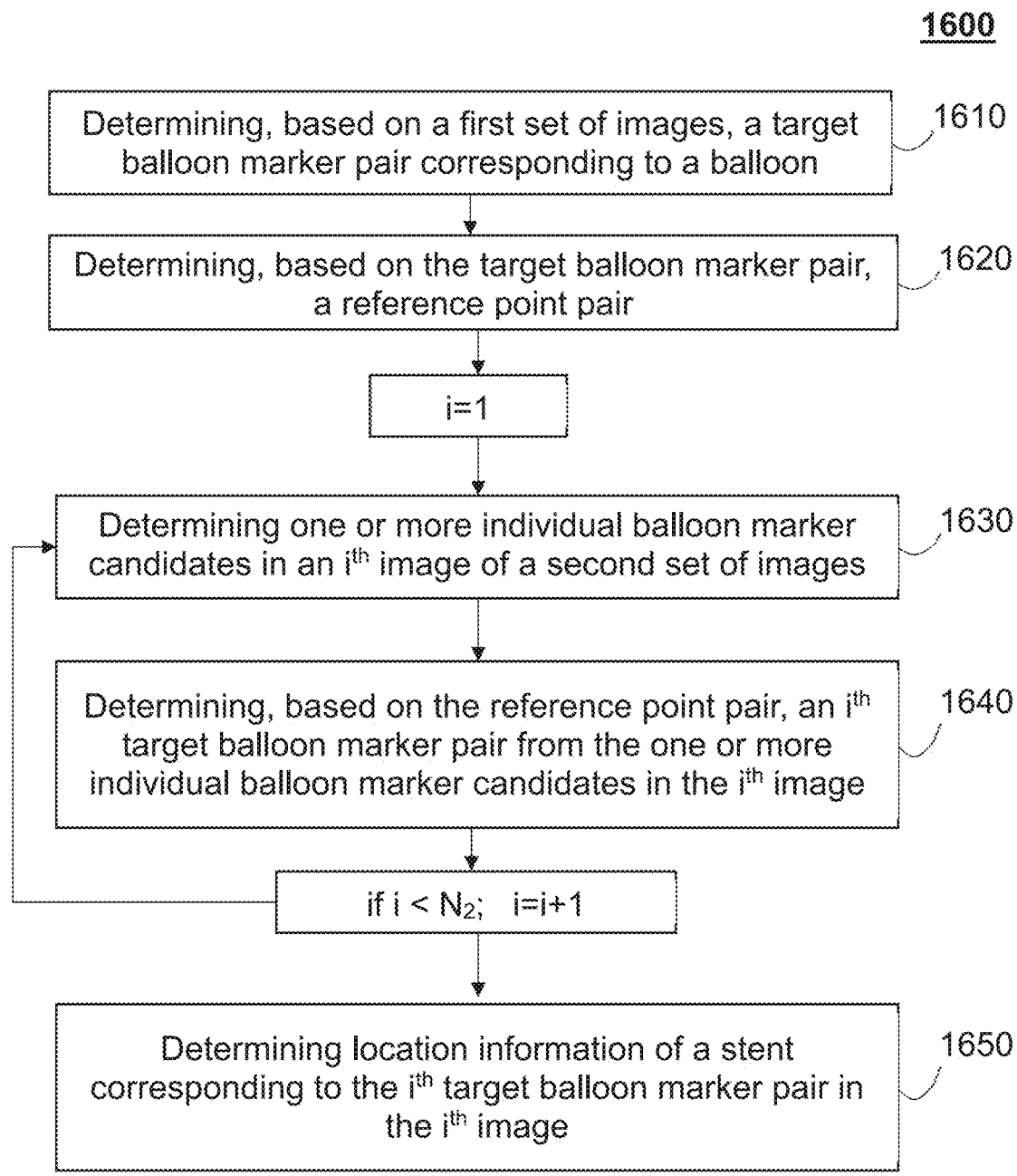
FIG. 16 is a flowchart illustrating an exemplary process for determining location information of a stent in an image according to some embodiments of the present disclosure.

FIG. 16 is a flowchart illustrating an exemplary process for determining location information of a stent in an image according to some embodiments of the present disclosure. In some embodiments, the process 1600 may be implemented in the imaging system 100 illustrated in FIG. 1. For example, the process 1600 may be stored in a storage medium (e.g., the storage device 150, or the storage 220 of the processing device 140, the storage 390 of the terminal 130, the memory 360 of the terminal 130) as a form of instructions, and can be invoked and/or executed by the processing device 140 or the terminal 130 (e.g., the processor 210 of the processing device 140, the CPU 340 and/or the GPU 330 of the terminal 130, or one or more modules in the processing device 140 illustrated in FIG. 4). The operations of the illustrated process 1600 presented below are intended to be illustrative. In some embodiments, the process 1600 may be accomplished with one or more additional operations not described, and/or without one or more of the operations discussed. Additionally, the order in which the operations of the process 1600 as illustrated in FIG. 16 and described below is not intended to be limiting.

In 1610, the detection module 440 may determine, based on a first set of images, a target balloon marker pair corresponding to a balloon represented in the first set of images. The target balloon marker pair may be configured to locate and track the balloon in the first set of images. In some embodiments, operation 1610 of the process 1600 may be performed based on the process 1800.

In 1620, the detection module 440 may determine, based on the target balloon marker pair, a reference point pair. The reference point pair may be configured to determine another target balloon marker pair in an image included in a second set as illustrated in 1630. In some embodiments, the reference point pair may be determined based on location information of the target balloon marker pair.

In some embodiments, the reference point pair used to determine a target balloon marker pair in each of the different images may be different. For example, for processing a first image in the second set, a target balloon marker pair may be assigned as the reference point pair; for processing an i+2$^{th}$ image in the second set, the i+1$^{th}$ target balloon marker pair may be assigned as the reference point pair. As another example, for processing an i+a$^{th}$ image in the second set, the i+b$^{th}$ target balloon marker pair may be assigned as the reference point pair, where a may be any positive number bigger than b.

Figure 19A:
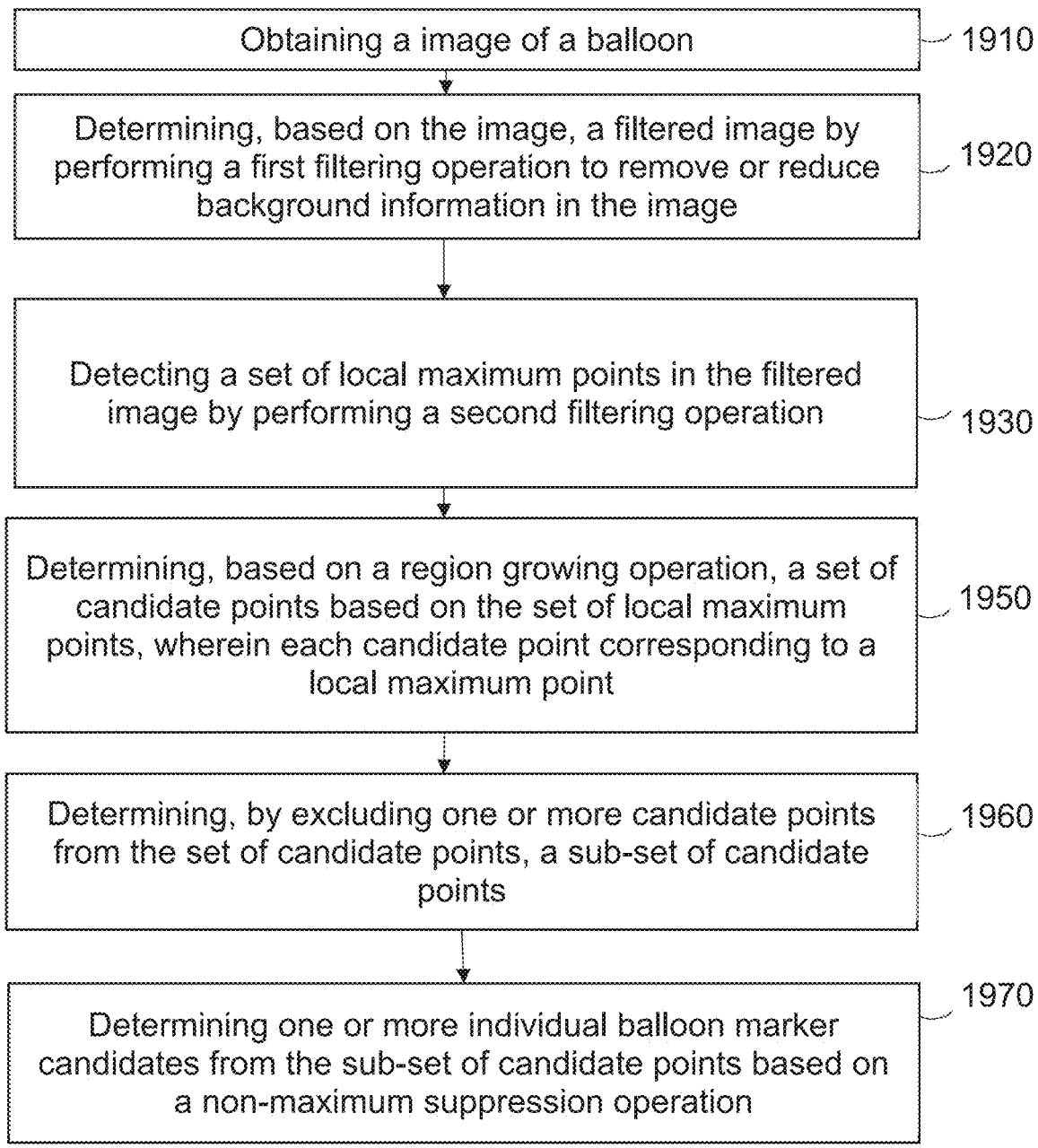
FIG. 19A is a flowchart illustrating an exemplary process for determining one or more individual balloon marker candidates according to some embodiments of the present disclosure.

In 1630, the detection module 440 may determine one or more individual balloon marker candidates in an i$^{th}$ image of a second set of images. The one or more individual balloon marker candidates in the i$^{th}$ image may be determined based on a process 1900A as illustrated in FIG. 19A.

The second set of images and the first set of images may both correspond to a same object (e.g., a stent). For example, images included in the second set and the first set may both be obtained in a cardiac cycle by a same imaging device.

In some embodiments, the images included in the first set and the second set may be the images in the at least one set of images determined in 530 of process 500. For the convenience of description, the images included in at least one set of images may be classified into two sets (i.e., the first set and the second set). Images included in the first set may be configured to determine the target balloon marker pair. More target balloon marker pairs corresponding to images included in the second set may be determined based on the target balloon marker pair.

In some embodiments, a first count of images included in the first set and a second count of images included in the second set may be the same or different. In some embodiments, the first count of images included in the first set may be a preset value, such as 15, 20, 30, 40, 60, 100, or the like. For example, the first set may include images acquired in one cardiac cycle at an image acquisition rate of 30 fps. As another example, the first set may include images acquired in two cardiac cycles at an image acquisition rate of 60 fps.

In some embodiments, the first count of images included in the first set may be determined based on the time when the images are acquired. Images acquired by the imaging device 110 in a first time period (e.g., one or more seconds, one or more minutes) may all be assigned as images in the first set for determining a target balloon marker pair. The first time period may be a preset value or be inputted by a user.

In some embodiments, the first count of images included in the first set may be changed based on a detection result of the target balloon marker pair. For example, if no target balloon marker pair is identified in the first set of images, additional images may be assigned to the first set to determine the target balloon marker pair. The additional images may come from the second set. As another example, the first count of images included in the first set may be determined based on both the image acquisition capacity of the imaging device 110 and/or the image processing capacity of processing device 400. In some embodiments, a second time period may be set for the process of searching for a target balloon marker pair in the first set of images. If no target balloon marker pair is identified within the second time period, the processing device 400 may terminate the process of target balloon marker pair detection. Meanwhile, the processing device 400 may provide a notification (e.g., an alarm, a message) corresponding to the failure of identifying any target balloon marker pair in the first set of images.

In 1640, the detection module 440 may determine, based on the reference point pair, an i$^{th}$ target balloon marker pair from the one or more individual balloon marker candidates in the i$^{th}$ image.

Figure 20:
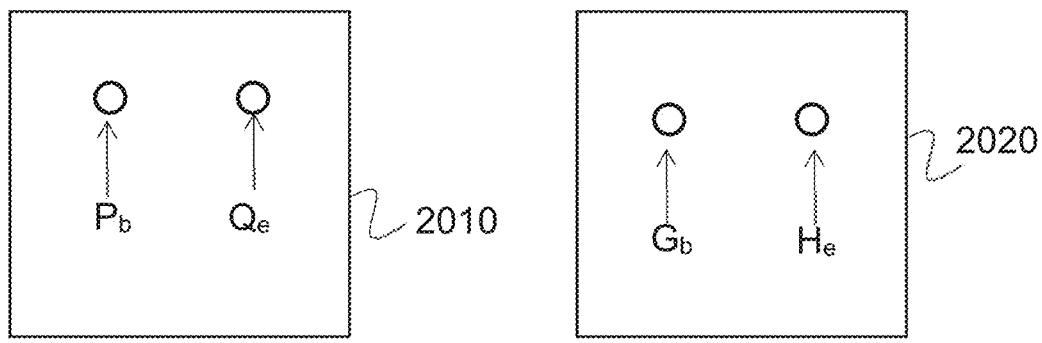
FIG. 20 illustrates exemplary images with balloon marker pairs according to some embodiments of the present disclosure.

As illustrated in FIG. 20, a target balloon marker pair $P_bQ_e$ in an image 2010 may be assigned as the reference point pair for determining a target balloon marker pair in another image (e.g., image 2020). Based on the reference point pair (e.g., target balloon marker pair $P_bQ_e$), one or more individual balloon marker candidates may be identified in the i$^{th}$ image (not shown in the image 2020).

In some embodiments, the detection module 440 may perform a matching operation between the reference point pair and the one or more individual balloon marker candidates identified in the i$^{th}$ image to determine two individual balloon marker candidates as the i$^{th}$ target balloon marker pair in the i$^{th}$ image. Taking the target balloon marker pair $P_bQ_e$ and the target balloon marker pair $G_bH_e$ as an example, the matching operation may be performed base on at least one of the following conditions.

Condition (a), an absolute difference between a distance $D_{can}$ and a distance $D_{ref}$ does not exceed a distance threshold $D_{pair}$, where $D_{can}$ represents a distance between the two individual balloon marker candidates, $D_{ref}$ represents a distance between the balloon makers of the reference point pair, and $D_{pair}$ is a non-negative real number. In some embodiments, the distance threshold $D_{pair}$ may be 0 pixel, 3 pixels, 5 pixels, 10 pixels, 15 pixels, 30 pixels, 50 pixels, or the like.

In some embodiments, the distance threshold $D_{pair}$ may be 0 mm, 0.1 mm, 0.5 mm, 1 mm, 3 mm, 5 mm, 15 mm, 20 mm, or the like.

Condition (b), an absolute difference between a displacement $D_{pb\text{-}can}$ and a displacement $D_{pe\text{-}ref}$ does not exceed a displacement threshold $D_{be\text{-}pair}$, where $D_{pb\text{-}can}$ represents a displacement of a first balloon marker in a balloon marker pair with respect to a corresponding point in the reference point pair, $D_{pe\text{-}ref}$ represents a displacement of a second balloon marker in a balloon marker pair with respect to a corresponding point in the reference point pair, and $D_{be\text{-}pair}$ is a non-negative real number. More descriptions of the parameters involved in the condition (b) can be found in FIG. 20 and the description thereof.

In 1650, the detection module 440 may determine location information of a stent corresponding to the $i^{th}$ target balloon marker pair in the $i^{th}$ image. The location information may be determined based on a center point between the two balloon markers of the $i^{th}$ target balloon marker pair and the size of the stent.

In some embodiments, the location information may be configured to facilitate the segmentation of the stent in the $i^{th}$ image. For example, a rectangle region in the $i^{th}$ image may be determined based on the size of the stent and the center point. The rectangle region may be segmented from the $i^{th}$ image as a segmented stent.

Process 1600 may be an iterative process in which an $i+1^{th}$ image may be processed after the processing of an $i^{th}$ image is completed. In some embodiments, the iterative process may terminate when all images included in the second set are processed.

It should be noted that the above description is merely provided for the purposes of illustration, and not intended to limit the scope of the present disclosure. For persons having ordinary skills in the art, multiple variations and modifications may be made under the teachings of the present disclosure.

Figure 17:
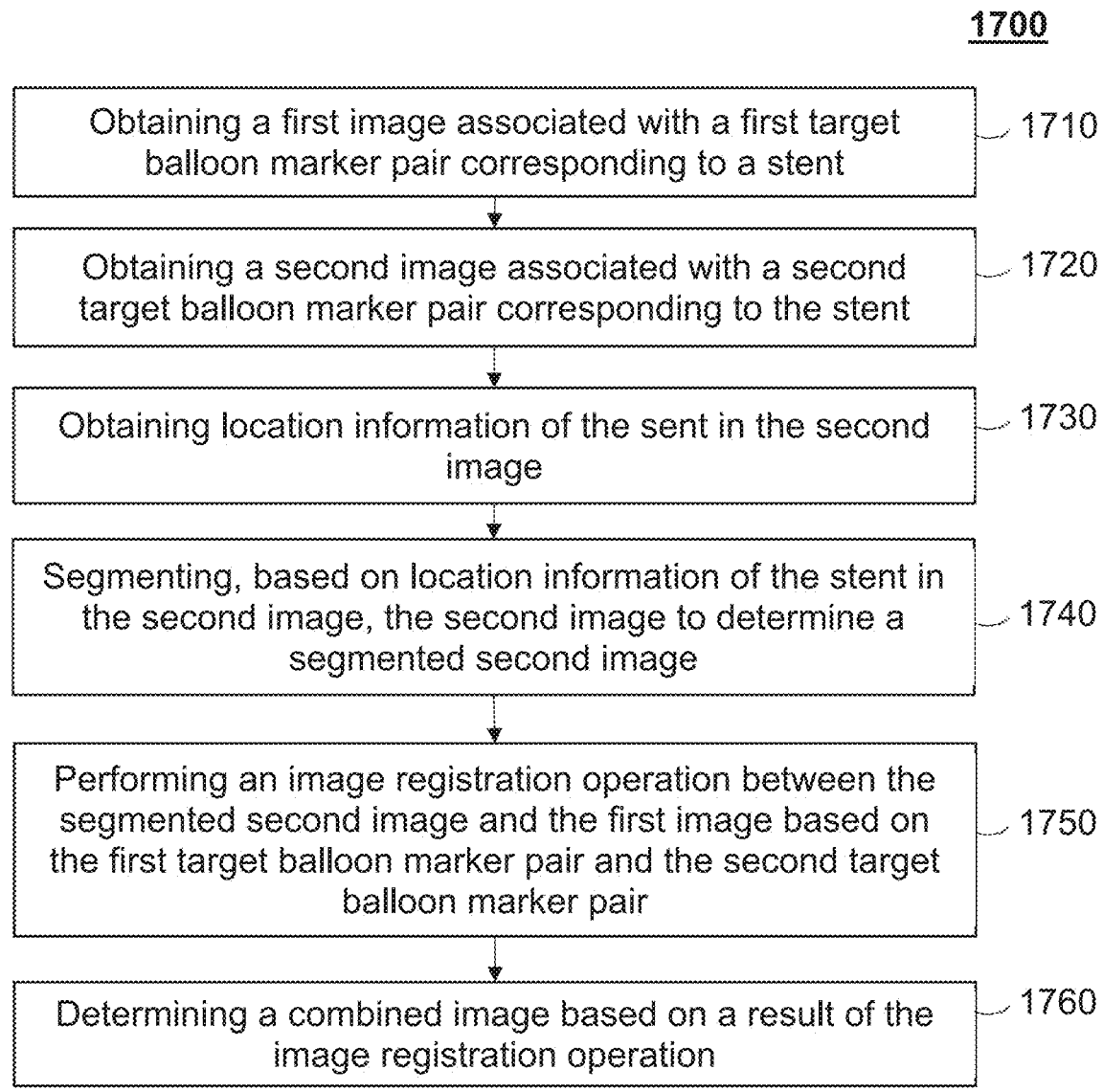
FIG. 17 is a flowchart illustrating an exemplary process for processing a stent image according to some embodiments of the present disclosure.

FIG. 17 is a flowchart illustrating an exemplary process for processing a stent image according to some embodiments of the present disclosure. In some embodiments, the process 1700 may be implemented in the imaging system 100 illustrated in FIG. 1. For example, the process 1700 may be stored in a storage medium (e.g., the storage device 150, or the storage 220 of the processing device 140, the storage 390 of the terminal 130, the memory 360 of the terminal 130) as a form of instructions, and can be invoked and/or executed by the processing device 140 or the terminal 130 (e.g., the processor 210 of the processing device 140, the CPU 340 and/or the GPU 330 of the terminal 130, or one or more modules in the processing device 140 illustrated in FIG. 4). The operations of the illustrated process 1700 presented below are intended to be illustrative. In some embodiments, the process 1700 may be accomplished with one or more additional operations not described, and/or without one or more of the operations discussed. Additionally, the order in which the operations of the process 1700 as illustrated in FIG. 17 and described below is not intended to be limiting.

Figure 22A:
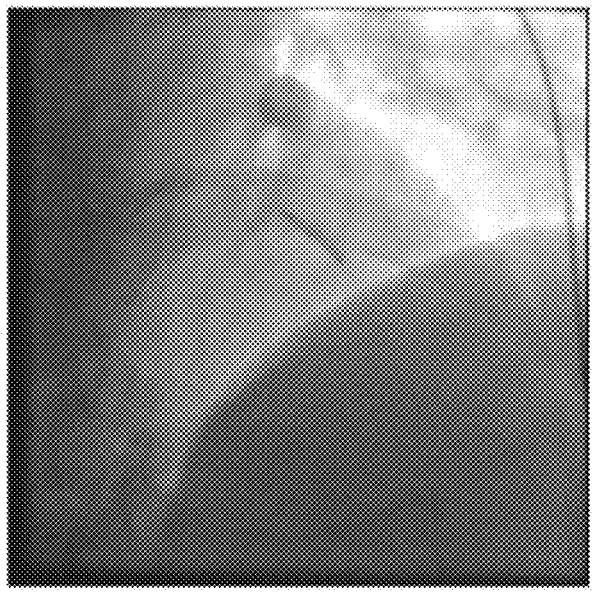
FIGS. 22A, 22B, and 22C illustrate exemplary stent images according to some embodiments of the present disclosure.

In 1710, the obtaining module 410 may obtain a first image associated with a first target balloon marker pair corresponding to a stent. The first image may be a first image in the second set as referred to in 1630 of process 1600. For example, the first image may be the image 2200A as shown in FIG. 22A.

In 1720, the obtaining module 410 may obtain a second image associated with a second target balloon marker pair corresponding to the stent. The second image may be a second image in the second set as referred to in 1630 of process 1600.

In 1730, the obtaining module 410 may obtain location information of the stent in the second image. In some embodiments, the location information of the stent in the second image may include the rectangle region as referred to in 1650 of process 1600.

In 1740, the segmentation module 450 may segment, based on location information of the stent in the second image, the second image to determine a segmented second image. In some embodiments, the segmented second image may be determined based on the rectangle region.

In 1750, the registration module 460 may perform an image registration operation between the segmented second image and the first image based on the first target balloon marker pair and the second target balloon marker pair.

The image registration operation may include a matching operation between the two images. For example, the matching operation may be performed based on the first target balloon marker pair in the first image and the second target balloon marker pair in the segmented second image. The size of the segmented second image is smaller than the second image, and so the efficiency of the matching operation may be improved by matching the segmented second image, instead of the second image, with the first image. In some embodiments, an image registration operation may be directly performed between the first image and the second image based on the first target balloon marker pair and the second target balloon marker pair.

In 1760, the registration module 460 may determine a combined image based on a result of the image registration operation. The combined image may be determined by superimposing the segmented second image with the first image. In some embodiments, more than one image may be obtained from the second set in 1720, and more than one image may be further segmented in 1740 to determine more than one segmented image. The more than one segmented image may all be superimposed with the first image to determine the combined image. By superimposing the segmented second image(s) with the first image, random noise included in the first image may be reduced and information of the stent included in the combined image may be enhanced. The combined image may provide enhanced visualization of the stent. For example, image 2220D as illustrated in FIG. 22D is a combined image for enhanced visualization of the stent, compared with image 2220A.

It should be noted that the above description is merely provided for the purposes of illustration, and not intended to limit the scope of the present disclosure. For persons having ordinary skills in the art, multiple variations and modifications may be made under the teachings of the present disclosure.

Figure 18:
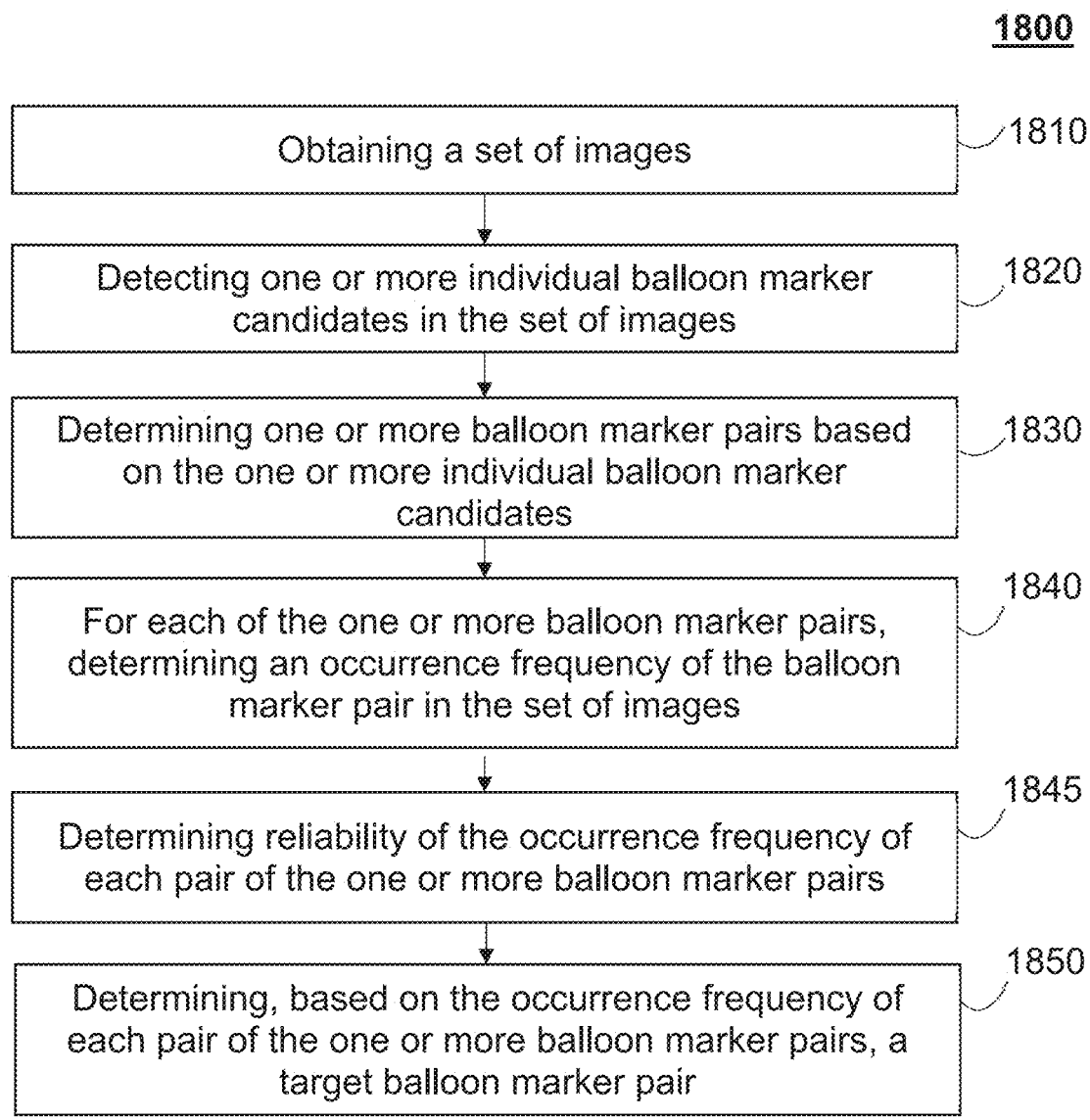
FIG. 18 is a flowchart illustrating an exemplary process for determining a target balloon marker pair according to some embodiments of the present disclosure.

FIG. 18 is a flowchart illustrating an exemplary process for determining a target balloon marker pair according to some embodiments of the present disclosure. In some embodiments, the process 1800 may be implemented in the imaging system 100 illustrated in FIG. 1. For example, the process 1800 may be stored in a storage medium (e.g., the storage device 150, or the storage 220 of the processing device 140, the storage 390 of the terminal 130, the memory 360 of the terminal 130) as a form of instructions, and can be invoked and/or executed by the processing device 140 or the terminal 130 (e.g., the processor 210 of the processing device 140, the CPU 340 and/or the GPU 330 of the terminal 130, or one or more modules in the processing device 140 illustrated in FIG. 4). The operations of the illustrated process 1800 presented below are intended to be illustrative. In some embodiments, the process 1800 may be accomplished with one or more additional operations not described, and/or without one or more of the operations discussed. Additionally, the order in which the operations of the process 1800 as illustrated in FIG. 18 and described below is not intended to be limiting. In some embodiments, operation 1820 of the process 1800 may be performed based on the process 1900A.

In 1810, the obtaining module 410 may obtain a set of images. The set of images may correspond to a balloon and images included in the set may be configured to determine a target balloon marker pair. In some embodiments, the set of images may be obtained from the at least one set of images described in FIG. 5. In some embodiments, the set of images may be the first set of images referred to in 1610 of FIG. 16.

In 1820, the detection module 440 may detect one or more individual balloon marker candidates in the set of images. Each of the one or more individual balloon marker candidates in an image may be a candidate point for indicating a balloon marker in the image. In some embodiments, the one or more individual balloon marker candidates may be determined based on process 1900A as illustrated in FIG. 19A.

In some embodiments, if no individual balloon marker candidate can be detected, the detection module 440 may cause the imaging system 100 to provide a notification. The notification may be a message, an alarm, or the like.

In 1830, the detection module 440 may determine one or more balloon marker pairs based on the one or more individual balloon marker candidates. Each of the one or more balloon marker pairs may be determined based on the one or more individual balloon marker candidates detected in a same image. A balloon marker pair may be used to indicate two ends of a stent. For illustration purposes, the one or more individual balloon marker candidates may be recorded as $\{P_1, P_2, \ldots, P_N\}$, where N represents any positive integer bigger than 1.

In some embodiments, a pairwise matching mechanism may be employed to determine one or more candidate balloon marker pairs in an image. Under the pairwise matching mechanism, each of the one or more individual balloon marker candidates (e.g., $P_i$) may be matched with every other individual balloon marker candidate of the one or more individual balloon marker candidates (e.g., $P_1, P_2, \ldots, P_{i-1}, P_{i+1}, \ldots, P_N$) in a same image. For example, for the individual balloon marker candidate $P_i$ from the set $\{P_1, P_2, \ldots, P_N\}$, a total of (N−1) balloon maker pairs may be determined as:

$$\{(P_1,P_i),(P_2,P_i),\ldots,(P_{i-1},P_i),(P_{i+1},P_i),\ldots,(P_N,P_i)\}.$$

In some embodiments, candidate balloon marker pairs in the image may be assessed based on relative positions of the one or more individual balloon marker candidates in the image. For example, when a distance between an $i^{th}$ individual balloon marker candidate (e.g., $P_i$) and a $j^{th}$ individual balloon marker candidate (e.g., $P_j$) in the image satisfies an exclusion condition, then the candidate balloon marker pair $(P_i, P_j)$ may be excluded from further processing and/or analysis. The exclusion condition may include the distance between $P_i$ and $P_j$ is below a first distance threshold, indicating that $P_i$ and $P_j$ are located too close to each other so that no stent whose ends are indicated by $P_i$ and $P_j$ exists in the image. Additionally or alternatively, the exclusion condition may include that the distance between $P_i$ and $P_j$ exceeds a second distance threshold, indicating that $P_i$ and $P_j$ are located too far away from each other so that no stent whose ends are indicated by $P_i$ and $P_j$ exists in the image. The first distance threshold and the second distance threshold may relate to a length of the stent in the image, a deviation of the angle at which the imaging medium (e.g., X-ray) impinging on the stent (in a patient) for imaging the stent from a normal angle, an angle of the plane in which the stent (in the patient) is located, or the like, or a combination thereof. Any one of the one or more candidate balloon marker pairs that are not excluded may be designated as a balloon marker pair.

For each image of the set, operation 1830 may be performed to detect the existent of the one or more balloon marker pairs in the image.

In 1840, for each of the one or more balloon marker pairs, the detection module 440 may determine an occurrence frequency of the balloon marker pair in the set of images. As used herein, an occurrence frequency of a balloon marker pair in a set of images may represent a total number or count of images of the set in which the balloon marker pair is identified. For a first balloon marker pair $(P_i, P_j)$ in a first image of the set, if a second balloon marker pair $(P_m, P_n)$ in a second image of the set satisfying one or more correspondence conditions may be found, then the two balloon marker pairs may be deemed as a same balloon marker pair and an occurrence frequency of the first balloon maker pair $(P_i, P_j)$ in the set of images may be added with "1." If M balloon marker pairs one in each of M images of the set may be found satisfying the one or more correspondence conditions, then the occurrence frequency of the first balloon maker pair $(P_i, P_j)$ may be added with "M." For the set including N images, a maximum occurrence frequency of a balloon maker pair may be N. Exemplary correspondence conditions may include conditions 18a and 18b as described herein.

Correspondence condition 18a: a distance difference between $L(P_i, P_j)$ and $L(P_m, P_n)$ does not exceed a first threshold. The first threshold may be determined based on a preset value or a user input. As used herein, $L(P_i, P_j)$ represents a distance between the two individual balloon marker candidates in the first balloon marker pair $(P_i, P_j)$. $L(P_m, P_n)$ represents a distance between the two individual balloon marker candidates in the second balloon marker pair $(P_m, P_n)$. For example, if the distance difference between $L(P_i, P_j)$ and $L(P_m, P_n)$ is below or equal to the first threshold, then the first balloon marker pair $(P_i, P_j)$ and the second balloon marker pair $(P_m, P_n)$ may be deemed as a same balloon marker pair and the occurrence frequency of the first balloon marker pair $(P_i, P_j)$ in the first image and the second image may be regarded as two.

Correspondence condition 18b: a distance difference between $LL(P_i, P_m)$ and $LL(P_j, P_n)$ does not exceed a second threshold. The second threshold may be determined based on a preset value or a user input. In some embodiments, the second threshold may correspond to a displacement of the stent in the first image with respect to the stent in the second image. In some embodiments, the displacement of the stent in the first image with respect to the stent in the second image may be assessed in terms of the relative positions, or a change thereof, of the balloon marker pairs that are considered to indicate the positions of the stent in the first and second images. As used herein, $LL(P_i, P_m)$ represents a distance between the individual balloon marker candidate $P_i$ included in the first balloon marker pair $(P_i, P_j)$ in the first image and the individual balloon marker candidate $P_m$ included in the second balloon marker pair $(P_m, P_n)$ in the second image. $LL(P_j, P_n)$ represents a distance between the individual balloon marker candidate $P_j$ included in the first balloon marker pair $(P_i, P_j)$ in the first image and the individual balloon marker candidate $P_n$ included in the second balloon marker pair ($P_m$, $P_n$) in the second image. For example, if the distance difference between $LL(P_i, P_m)$ and $LL(P_j, P_n)$ is below or equal to the second threshold, then the first balloon marker pair ($P_i$, $P_j$) and the second balloon marker pair ($P_m$, $P_n$) may be deemed as a same balloon marker pair and the occurrence frequency of the first balloon maker pair ($P_i$, $P_j$) in the first image and the second image may be regarded as two.

In some embodiments, two balloon marker pairs may be deemed as a same balloon marker pair if both the correspondence conditions 18a and 18b are found to be satisfied.

In 1845, the detection module 440 may determine reliability of the occurrence frequency of each pair of the one or more balloon marker pairs. The reliability may be assessed based on one or more of the reliability conditions 18e, 18f, 18g, and 18h.

Reliability condition 18e: whether no eligible balloon marker pair is determined in 1830 of process 1800. For example, all candidate balloon marker pairs matched in 1830 may be excluded as described in 1830. As another example, only one individual balloon marker candidate is determined in 1820 and no matched balloon marker pair is determined in 1830.

Reliability condition 18f: whether an occurrence frequency of the highest occurrence frequency balloon marker pair is lower than a first occurrence frequency threshold. The first occurrence frequency threshold may be any positive integer lower than the image count of the images included in the set, such as 1, 2, 3, 4, 5, 6, 7, or the like.

Reliability condition 18g: whether more than one balloon marker pairs are determined with an occurrence frequency higher than a second occurrence frequency threshold. The second occurrence frequency threshold may be equal to an image count of the images included in the set. In some embodiments, a difference between the second occurrence frequency threshold and the count of images included in the set may be 1, 2, 3, 4, or the like. For instance, when in the second image, multiple balloon marker pairs are present and close to each other, each of such balloon marker pairs may satisfy the correspondence condition 18a and/or the correspondence condition 18b such that the balloon marker pair is deemed as a same one in the first image. Then the occurrence frequency of the balloon marker pair in the first and second images may be determined to be greater than 2.

Reliability condition 18h: whether a difference between the highest occurrence frequency and a second highest occurrence frequency of the occurrence frequencies of the one or more balloon marker pairs is smaller than a third occurrence frequency threshold. The third occurrence frequency threshold may be 1, 2, 3, 4, 5, or the like.

In some embodiments, if the occurrence frequency of a pair of the one or more balloon marker pairs is deemed unreliable based on one or more of the reliability conditions 18e, 18f, 18g, and 18h, the balloon marker pair may be excluded from further analysis, e.g., analysis as described in 1850.

In 1850, the detection module 440 may determine, based on the occurrence frequency of each pair of the one or more balloon marker pairs, a target balloon marker pair. The target balloon marker pair may be the target balloon marker pair with the highest occurrence frequency among all of the one or more balloon marker pairs.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the 1845 may be omitted FIG. 19A is a flowchart illustrating an exemplary process for determining a balloon marker candidate according to some embodiments of the present disclosure. In some embodiments, the process 1900A may be implemented in the imaging system 100 illustrated in FIG. 1. For example, the process 1900A may be stored in a storage medium (e.g., the storage device 150, or the storage 220 of the processing device 140, the storage 390 of the terminal 130, the memory 360 of the terminal 130) as a form of instructions, and can be invoked and/or executed by the processing device 140 or the terminal 130 (e.g., the processor 210 of the processing device 140, the CPU 340 and/or the GPU 330 of the terminal 130, or one or more modules in the processing device 140 illustrated in FIG. 4). The operations of the illustrated process 1900A presented below are intended to be illustrative. In some embodiments, the process 1900A may be accomplished with one or more additional operations not described, and/or without one or more of the operations discussed. Additionally, the order in which the operations of the process 1900A as illustrated in FIG. 19A and described below is not intended to be limiting. In some embodiments, operation 1960 of the process 1900A may be performed based on the process 1900B.

In 1910, the obtaining module 410 may obtain an image of a balloon. The image may be any image included in a first set of images as referred to in 1610 of process 1600 or a second set of images as referred to in 1630 of process 1600.

In 1920, the detection module 440 may determine, based on the image, a filtered image by performing a first filtering operation. The filtering operation may be configured to remove or reduce background information in the image. In some embodiments, information other than the information of the stent in the image may be considered background information. For instance, the background information may include information corresponding to bones or the heart in the image. By applying the first filtering operation, dark features on a varying background in the image may be removed or reduced. For example, local minima of the image that are smaller than a structural element may be extracted.

In some embodiments, the first filtering operation may include a top-hat transform. The top-hat transform may include a morphology transform to keep a bright object in a dark background or a dark object in a bright background. By applying the top-hat transform, features corresponding to the balloon may be kept and features corresponding to bones or the heart may be removed from the image.

In 1930, the detection module 440 may detect a set of local maximum points in the filtered image by performing a second filtering operation. The set of local maximum points may correspond to the edges of the balloon. The second filtering operation may include a Laplacian of Gaussian (LoG) algorithm, an optimal thresholding algorithm, or the like.

In 1950, the detection module 440 may determine, based on a region growing operation, a set of candidate points based on the set of local maximum points. Each candidate point may include one or more pixels (or voxels). In some embodiments, the boundary of a candidate point including one or more pixels (or voxels) may be determined based on gray levels of the one or more pixels (or voxels).

In 1960, the detection module 440 may determine, by excluding one or more candidate points from the set of candidate points, a sub-set of candidate points. In some embodiments, whether to exclude a candidate point may be determined based on one or more balloon marker characters. The one or more characters may include a morphology character (e.g., a degree of roundness of the balloon marker), a size of the balloon marker, a balloon marker response value, or the like, or any combination thereof. In some embodiments, operation 1960 of the process 1900A may be performed based on the process 1900B.

In some embodiments, the exclusion of a candidate point may be performed based on a user instruction, a similarity degree (higher than a threshold) between a candidate point and one or more excluded candidate points, the location of a candidate point, or the like, or a combination thereof.

In 1970, the detection module 440 may determine one or more individual balloon marker candidates from the sub-set of candidate points based on, e.g., a non-maximum suppression (NMS) operation. A region used in the NMS operation may be determined based on the morphology characters of the one or more individual balloon marker candidates. For example, the region may include an arrangement of pixels, e.g., 3×3 pixels, 3×5 pixels, 5×5 pixels, 7×7 pixels, 7×8 pixels, 9×9 pixels, 10×10 pixels, or the like.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, 1920 and 1930 may be combined into one operation. As another example, 1960 may be performed before 1950.

Figure 19B:
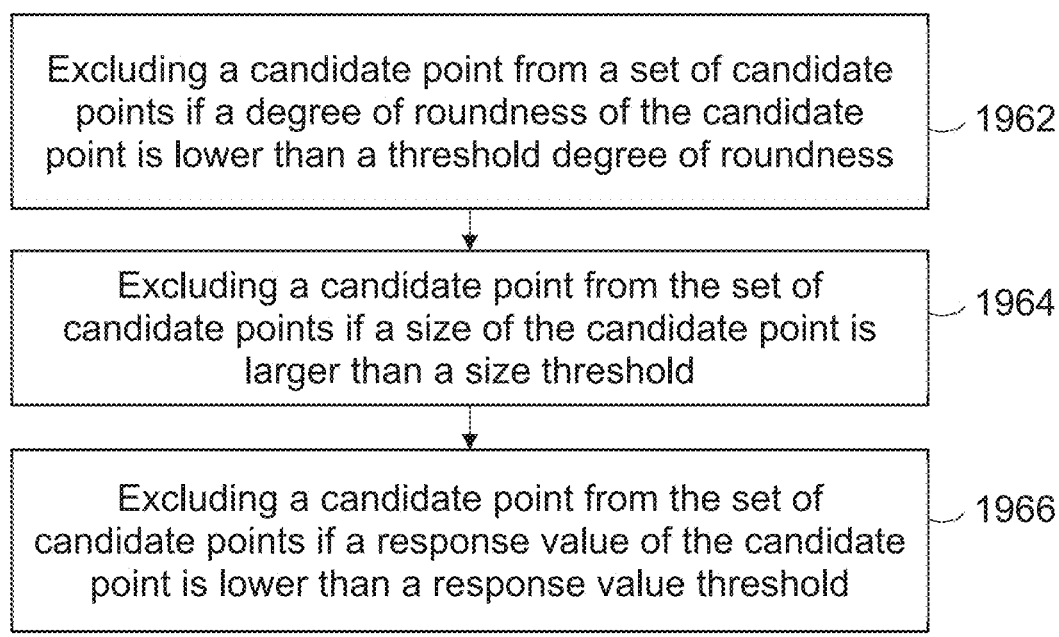
FIG. 19B is a flowchart illustrating an exemplary process for excluding a candidate point form a set of candidate points according to some embodiments of the present disclosure.

FIG. 19B is a flowchart illustrating an exemplary process for excluding a candidate point from a set of candidate points according to some embodiments of the present disclosure. In some embodiments, the process 1900B may be implemented in the imaging system 100 illustrated in FIG. 1. For example, the process 1900B may be stored in a storage medium (e.g., the storage device 150, or the storage 220 of the processing device 140, the storage 390 of the terminal 130, the memory 360 of the terminal 130) as a form of instructions, and can be invoked and/or executed by the processing device 140 or the terminal 130 (e.g., the processor 210 of the processing device 140, the CPU 340 and/or the GPU 330 of the terminal 130, or one or more modules in the processing device 140 illustrated in FIG. 4). The operations of the illustrated process 1900B presented below are intended to be illustrative. In some embodiments, the process 1900B may be accomplished with one or more additional operations not described, and/or without one or more of the operations discussed. Additionally, the order in which the operations of the process 1900B as illustrated in FIG. 19B and described below is not intended to be limiting.

In 1962, the detection module 440 may exclude a candidate point from the set of candidate points if a degree of roundness of the candidate point is lower than a threshold degree of roundness. As described in FIG. 19A, a candidate point may be determined based on a region including one or more pixels (or voxels). The degree of roundness may be a measure of how closely a shape of the candidate point approaches that of a mathematically perfect circle. In some embodiments, the degree of roundness of a candidate point may be deemed proportional to the probability of the candidate point is a balloon maker.

The degree of roundness of the candidate point (e.g., Round) may be determined based on the area and/or perimeter of a corresponding region of the candidate point. For example, the degree of roundness of a candidate point Round may be determined based on equation (11) below:

$$\text{Round} = \frac{4 \times \pi \times S}{C^2} \quad (11)$$

where S represents an area of a corresponding region of a candidate point; and C represents a perimeter of the corresponding region of the candidate point.

In some embodiments, the threshold degree of roundness may be a preset fixed value. For example, the threshold degree of roundness may be 0.8, 0.9, 0.80, 0.90, or the like. In some embodiments, the threshold degree of roundness may be determined based on a statistical value of degrees of roundness of one or more candidate points in the set of candidate points. For example, a median degree of roundness or an average degree of roundness of the candidate points in the set may be assigned as the threshold degree of roundness. In some embodiments, the threshold degree of roundness may correspond to the region growing operation described in 1950 of process 1900A. For example, if a region growing algorithm employed by the process 1900A may trend to generate a region with higher degrees of roundness, then a relatively high value may be determined as the threshold degree of roundness. In some embodiments, the threshold degree of roundness may be an empirical value. For instance, the threshold degree of roundness may be set based on results of prior balloon maker identification operations.

In 1964, the detection module 440 may exclude a candidate point from the set of candidate points if the size of the candidate point is larger than a size threshold.

In some embodiments, the size threshold may include a range between a lower size threshold and an upper size threshold. The lower size threshold may include, e.g., 2×2 pixels, 3×3 pixels, 4×4 pixels, or the like. The higher size threshold may include, e.g., 8×8 pixels, 9×9 pixels, 10×10 pixels, 12×12 pixels, 15×15 pixels, or the like. In some embodiments, the size threshold may be a preset fixed value. In some embodiments, the size threshold may be determined based on a statistical value of the size of one or more candidate points in the set of candidate points. For example, a median size or an average size of the candidate points in the set may be assigned as the size threshold. In some embodiments, the size threshold may be an empirical value. For instance, the size threshold may be set based on the results of prior balloon maker identification operations. In some embodiments, the size threshold may be determined based on the size of the actual balloon inserted into a patient the procedure of which is being imaged and analyzed herein.

In 1966, the detection module 440 may exclude a candidate point from the set of candidate points if a balloon marker response value of the candidate point is lower than a response value threshold. The balloon marker response value of the candidate point may be determined along with the determination of the local maximum points in 1930 of process 1900A. As used herein, a local maximum point, which may be recorded as a candidate point, may indicate a balloon marker. A balloon marker response value relates to a sharp straight discontinuity of the balloon marker and it may be determined based on a corresponding local maximum point.

In some embodiments, the response value threshold may be determined based on balloon marker response values of one or more candidate points excluded in 1964 and/or 1962.

For example, 6 candidate points (e.g., $P_{C1}$, $P_{C2}$, $P_{C3}$, $P_{C4}$, $P_{C5}$, $P_{C6}$) are determined and corresponding balloon marker response values include 1 ($P_{C1}$), 2 ($P_{C2}$), 3 ($P_{C3}$), 4 ($P_{C4}$), 5 ($P_{C5}$), and 6 ($P_{C6}$). If candidate points $P_{C2}$ (with a balloon marker response value "2"), $P_{C3}$ (with a balloon marker response value "3"), and $P_{C4}$ (with a balloon marker response value "4") are excluded in 1962 and 1964 based on their size and/or degree of roundness, then candidate point $P_{C1}$ (with a balloon marker response value "1") may be excluded in 1966 of process 1900B.

In some embodiments, the response value threshold may be determined based on a statistical value of the balloon marker response value(s) of one or more candidate points in the set of candidate points. For example, a median balloon marker response value or an average balloon marker response value of the candidate points in the set may be assigned as the response value threshold. In some embodiments, the response value threshold may be a preset fixed value. In some embodiments, the response value threshold may be an empirical value. For instance, the response value threshold may be set based on results of prior balloon maker identification operations.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more operations of 1962, 1964, and 1966 may be omitted.

FIG. 20 illustrates exemplary images including balloon marker pairs according to some embodiments of the present disclosure.

The image 2010 may be an image included in the first set as referred to in 1610 of process 1600. The image 2010 may include a target balloon marker pair $P_b Q_e$. The target balloon marker pair $P_b Q_e$ may including a point $P_b$ and a point $Q_e$, where each of the point $P_b$ and point $Q_e$ represents an individual balloon marker candidate. In some embodiments, the target balloon marker pair $P_b Q_e$ may be assigned as the reference point pair.

The image 2020 may be an image included in the second set as referred to in 1630 of process 1600. The image 2020 may include a target balloon marker pair $G_b H_e$. The target balloon marker pair $G_b H_e$ may include a point $G_b$ and a point $H_e$, where each of the point $G_b$ and point $H_e$ represents an individual balloon marker candidate. In some embodiments, the target balloon marker pair $G_b H_e$ may be a target balloon marker pair determined based on the reference point pair (i.e., the target balloon marker pair $P_b Q_e$).

In some embodiments, the point $G_b$ in the image 2020 may correspond to the point $P_b$ determined in the image 2010. The point $H_e$ in the image 2020 may correspond to the point $Q_e$ in the image 2010. As used herein, a first point in a first image and a second point in a second image are considered corresponding points if they represent a same physical point in the real world (e.g., in the world coordinate system).

In some embodiments, a distance $D_{PQ}$ between the point $P_b$ and the point $Q_e$ in the image 2010 may represent a length of a stent determined in the image 2010. A distance $D_{GH}$ between the point $G_b$ and the point $H_e$ in the image 2020 may represent a length of a stent determined in the image 2020.

In some embodiments, the image 2010 may be determined by scanning a stent in a first location of a vessel at a first time point and the image 2020 may be determined by scanning the stent in a second location of the vessel at a second time point. A distance $D_{PG}$ between the point $P_b$ in the image 2010 and the point $G_b$ in the image 2020 may represent a first displacement of the stent between the first time point and the second time point. A second distance $D_{QH}$ between the point $Q_e$ in the image 2010 and the point $H_e$ in the image 2020 may represent a second displacement of the stent between the first time point to the second time point.

FIG. 21 is a schematic diagram illustrating an exemplary balloon according to some embodiments of the present disclosure. As illustrated in FIG. 21, the balloon 210 may be located between balloon marker A and balloon marker B in image 2100. The balloon 2110 is inflated and the stent 2120 expands within the inflated balloon 2110. When the balloon 2110 is deflated and withdrawn, the stent 2120 remains in place, serving as permanent scaffolding for a widened artery.

Figure 22B:
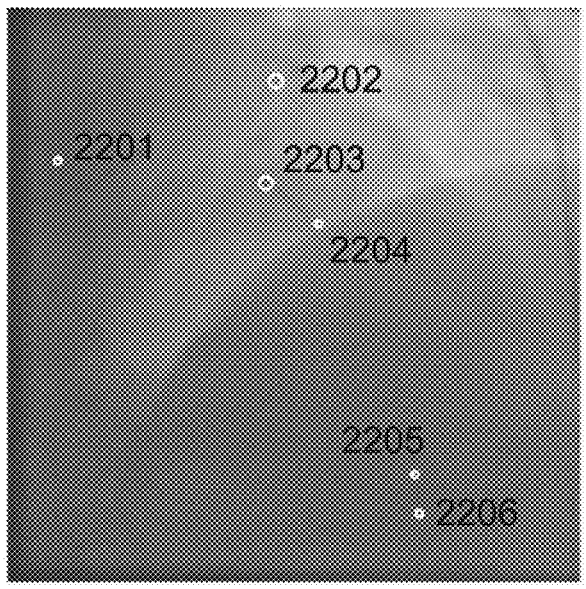
Figure 22C:
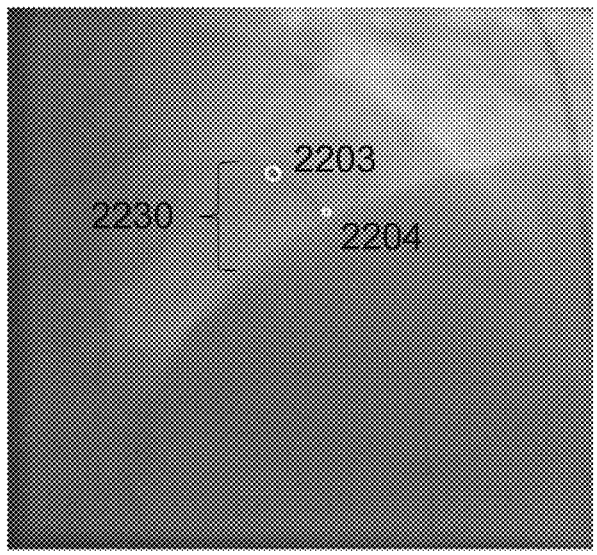
Figure 22D:
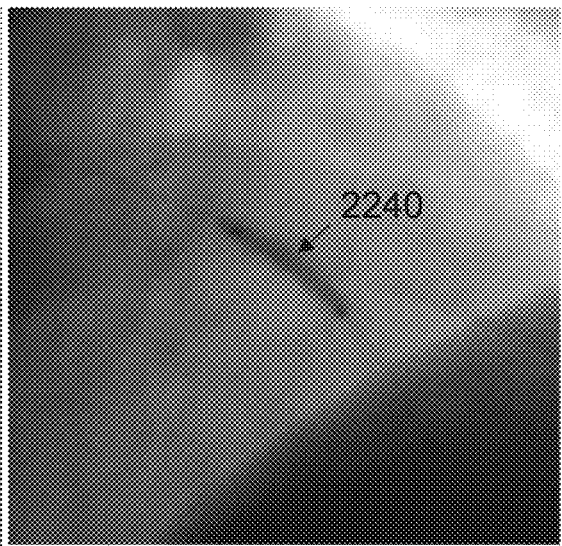
FIG. 22D illustrates an exemplary enhanced stent image according to some embodiments of the present disclosure.

FIGS. 22A, 22B, and 22C illustrate exemplary stent images according to some embodiments of the present disclosure. As illustrated in FIG. 22A, image 2200A may be one frame acquired during a stent implantation procedure. As illustrated in FIG. 22B, one or more individual balloon marker candidates (e.g., 2201, 2202, 2203, 2204, 2205, 2206) may be determined in image 2200B. As illustrated in FIG. 22C, a target balloon marker pair 2230 including a first balloon marker candidate 2203 and a second balloon marker candidate 2204 may be determined in image 2200C.

FIG. 22D illustrates an exemplary enhanced stent image according to some embodiments of the present disclosure. Image 2220D shows a stent 2240. The image 2220D may provide enhanced visualization of the stent 2240.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A system, comprising:
   at least one storage device including a set of instructions;
   at least one processor in communication with the at least one storage device, wherein when executing the set of instructions, the at least one processor is configured to cause the system to:
   obtain an image sequence;
   determine one or more sets of images from the image sequence, wherein each of the one or more sets of images includes one image or a plurality of consecutive images from the image sequence; and
   perform an image processing operation on at least one set of the one or more sets of images;
   wherein the at least one set of the one or more sets of images includes a guidewire image, and to perform an image processing operation on at least one set of the one or more sets of images, the at least one processor is further configured to cause to system to:
   obtain a trained neural network model, wherein the trained neural network model is trained by a soft Dice loss function and a collinearity penalty function; and
   generate a segmented guidewire image based on the guidewire image using the trained neural network model.

2. The system of claim 1, wherein to determine one or more sets of images from the image sequence, the at least one processor is further configured to cause to system to:
   receive a user input of a series of IDs of the one or more sets of images; and
   determine the one or more sets of images based on the user input.

3. The system of claim 1, wherein to determine one or more sets of images from the image sequence, the at least one processor is further configured to cause to system to:
   determine a detection result by detecting an object in the image sequence; and
   determine the one or more sets of images based on the detection result.

4. The system of claim 3, wherein to detect an object in the image sequence, the at least one processor is further configured to cause to system to:
   detect one or more markers corresponding to the object, wherein the one or more markers include a balloon marker pair or a tube marker.

5. The system of claim 3, wherein the image processing operation includes color-coded digital subtraction angiography in which contrast media is employed, and to detect an object in the image sequence, the at least one processor is further configured to cause to system to:
   detect the contrast media in the image sequence.

6. The system of claim 3, wherein the detection result includes at least one first image of the image sequence in which the object is detected, and to determine the one or more sets of images based on the detection result, the at least one processor is further configured to cause to system to:
   determine, from the image sequence, a first count of images that immediately precede the at least one first image;
   determine, from the image sequence, a second count of images that immediately follow the at least one first image; and
   determine at least one of the one or more sets of images based on the first count of images, the second count of images, and the at least one first image.

7. The system of claim 1, wherein at least two neighboring sets of the one or more sets of images are separated by at least one image of the image sequence that belongs to none of the one or more sets of images.

8. The system of claim 1, wherein to perform an image processing operation on at least one set of the one or more sets of images, the at least one processor is further configured to cause to system to:
cause images of the at least one set to be displayed on a loop;
adjust one or more display parameters for displaying the images of the at least one set, wherein the one or more display parameters includes a frame rate, an image scaling factor, or an image displaying region; or
provide enhanced visualization of one or more images of the at least one set.

9. The system of claim 1, wherein the trained neural network model is trained based on a loss function corresponding to one or more structural characters of a guidewire, the loss function includes the soft Dice loss function and the collinearity penalty function, and the one or more structural characters of the guidewire include a consistency of the guidewire and a length to width ratio.

10. The system of claim 9, wherein
the loss function further includes a weight corresponding to the collinearity penalty function, and
the weight relates to a segmenting continuity of the segmented guidewire image.

11. The system of claim 9, wherein
the loss function further includes a weight corresponding to the soft Dice loss function,
the weight relates to a segmenting precision of the segmented guidewire image; and
the higher the weight, the more precise the segmented guidewire image determined based on the trained neural network model.

12. The system of claim 1, wherein the at least one set of the one or more sets of images includes an image corresponding to an object, to perform an image processing operation on at least one set of the one or more sets of images, the at least one processor is further configured to cause to system to:
determine a coarsely segmented image based on the image; and
determine a finely segmented image from the coarsely segmented image.

13. The system of claim 12, wherein to determine a coarsely segmented image based on the image, the at least one processor is further configured to cause to system to:
determine location information of the object in the image; and
determine the coarsely segmented image based on the location information of the object.

14. The system of claim 13, wherein to determine location information of the object in the image, the at least one processor is further configured to cause to system to:
determine location information of the object based on a trained object detection model.

15. The system of claim 13, wherein to determine location information of the object in the image, the at least one processor is further configured to cause to system to:
detect a balloon marker pair in the image; and
determine location information of the object based on the balloon marker pair.

16. The system of claim 12, wherein to determine a finely segmented image from the coarsely segmented image, the at least one processor is further configured to cause to system to:
determining the finely segmented image based on a trained segmentation model.

17. The system of claim 1, wherein the one or more sets of images includes a first set of images, to perform an image processing operation on at least one set of the one or more sets of images, the at least one processor is further configured to cause to system to:
determine one or more individual balloon marker candidates in the first set of images;
determine one or more balloon marker pairs based on the one or more individual balloon marker candidates;
for each pair of the one or more balloon marker pairs, determine an occurrence frequency of the balloon marker pair in the first set of images; and
determine a target balloon marker pair from the one or more balloon marker pairs based on the occurrence frequency of each pair of the one or more balloon marker pairs.

18. A method implemented on at least one machine each of which has at least one processor and at least one storage device, the method comprising:
obtaining an image sequence;
determining one or more sets of images from the image sequence, wherein each of the one or more sets of images includes one image or a plurality of consecutive images from the image sequence; and
performing an image processing operation on at least one set of the one or more sets of images;
wherein the at least one set of the one or more sets of images includes a guidewire image, and to perform an image processing operation on at least one set of the one or more sets of images, the method further comprising:
obtaining a trained neural network model, wherein the trained neural network model is trained by a soft Dice loss function and a collinearity penalty function; and
generating a segmented guidewire image based on the guidewire image using the trained neural network model.

19. A system, comprising:
at least one storage device including a set of instructions;
at least one processor in communication with the at least one storage device, wherein when executing the set of instructions, the at least one processor is configured to cause the system to:
obtain an image sequence;
determine one or more sets of images from the image sequence, wherein each of the one or more sets of images includes one image or a plurality of consecutive images from the image sequence; and
perform an image processing operation on at least one set of the one or more sets of images, wherein the at least one set of the one or more sets of images includes a guidewire image, and to perform an image processing operation on at least one set of the one or more sets of images, the at least one processor is further configured to cause to system to:
obtain a trained neural network model, wherein the trained neural network model is trained based on a loss function corresponding to one or more structural characters of a guidewire; and generate a segmented guidewire image based on the guidewire image using the trained neural network model.

20. The system of claim 19, wherein the loss function includes a soft Dice loss function and a collinearity penalty function.

* * * * *